(12) United States Patent
Bugash et al.

(10) Patent No.: US 6,337,906 B1
(45) Date of Patent: Jan. 8, 2002

(54) APPARATUS AND METHOD FOR COUPLING AN AUTOMATED ATTENDANT TO A TELECOMMUNICATIONS SYSTEM

(75) Inventors: Robert S. Bugash, Germantown, MD (US); David L. Potts, Fairfield, PA (US); James H. Heidenreich, Mentor, OH (US)

(73) Assignee: Microlog Corporation, Germantown, MD (US)

( * ) Notice: Subject to any disclaimer, the term of this patent is extended or adjusted under 35 U.S.C. 154(b) by 0 days.

(21) Appl. No.: 08/862,390

(22) Filed: May 23, 1997

(51) Int. Cl.[7] ............................................... H04M 3/00
(52) U.S. Cl. ..................... 379/308; 379/412; 379/236
(58) Field of Search ................................. 379/308, 225, 379/260–265.01, 271, 274, 309, 388.04, 398, 399.01, 236, 156, 164, 165, 171, 412; 370/262

(56) References Cited

U.S. PATENT DOCUMENTS

| | | | | |
|---|---|---|---|---|
| 4,142,075 A | * | 2/1979 | Olschewski | 379/405 |
| 4,399,532 A | * | 8/1983 | Marschner et al. | 370/262 |
| 4,402,039 A | * | 8/1983 | Jirka | 363/21 |
| 4,626,627 A | * | 12/1986 | Van Gilluwe et al. | 379/214 |
| 4,723,271 A | * | 2/1988 | Grundtisch | 379/181 |
| 4,839,917 A | * | 6/1989 | Oliver | 379/45 |
| 4,866,767 A | * | 9/1989 | Tanimoto et al. | 379/398 |
| 5,027,387 A | * | 6/1991 | Moll | 379/112 |
| 5,265,157 A | * | 11/1993 | Jolissaint et al. | 379/386 |
| 5,303,298 A | * | 4/1994 | Morganstein et al. | 379/67.1 |
| 5,586,181 A | * | 12/1996 | Kiko | 379/399 |
| 5,608,791 A | * | 3/1997 | Grecco et al. | 379/265 |
| 5,666,401 A | * | 9/1997 | Morganstein et al. | 379/67.1 |
| 5,881,148 A | * | 3/1999 | Koenig et al. | 379/399 |
| 5,901,203 A | * | 5/1999 | Morganstein et al. | 379/88.02 |
| 5,940,476 A | * | 8/1999 | Morganstein et al. | 379/88.02 |
| 6,064,874 A | * | 5/2000 | Cox et al. | 455/404 |

* cited by examiner

Primary Examiner—Ahmad Matar
Assistant Examiner—Benny Q. Tieu
(74) Attorney, Agent, or Firm—Roylance, Abrams, Berdo & Goodman, L.L.P.

(57) ABSTRACT

An apparatus and method for coupling an automated attendant to a telecommunications system. The apparatus includes a switching device which establishes connection between a plurality of trunk lines of an existing telecommunications system and a plurality of ports of an automated attendant. A switching device of the apparatus is controllable to establish communication between any of the trunk lines and any of a plurality of station line ports that are adapted to be coupled to a plurality of telephone stations, respectively. The apparatus substantially isolates either the switching network or the automated attendant from the AC audio portion of a telecommunications signal based on whether the automated attendant or the switching network is handling the telecommunications signal, and is capable of monitoring the status of the trunk and stations lines to detect for an on-hook condition.

26 Claims, 36 Drawing Sheets

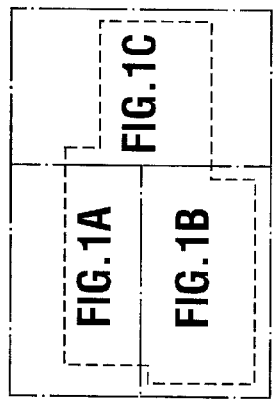
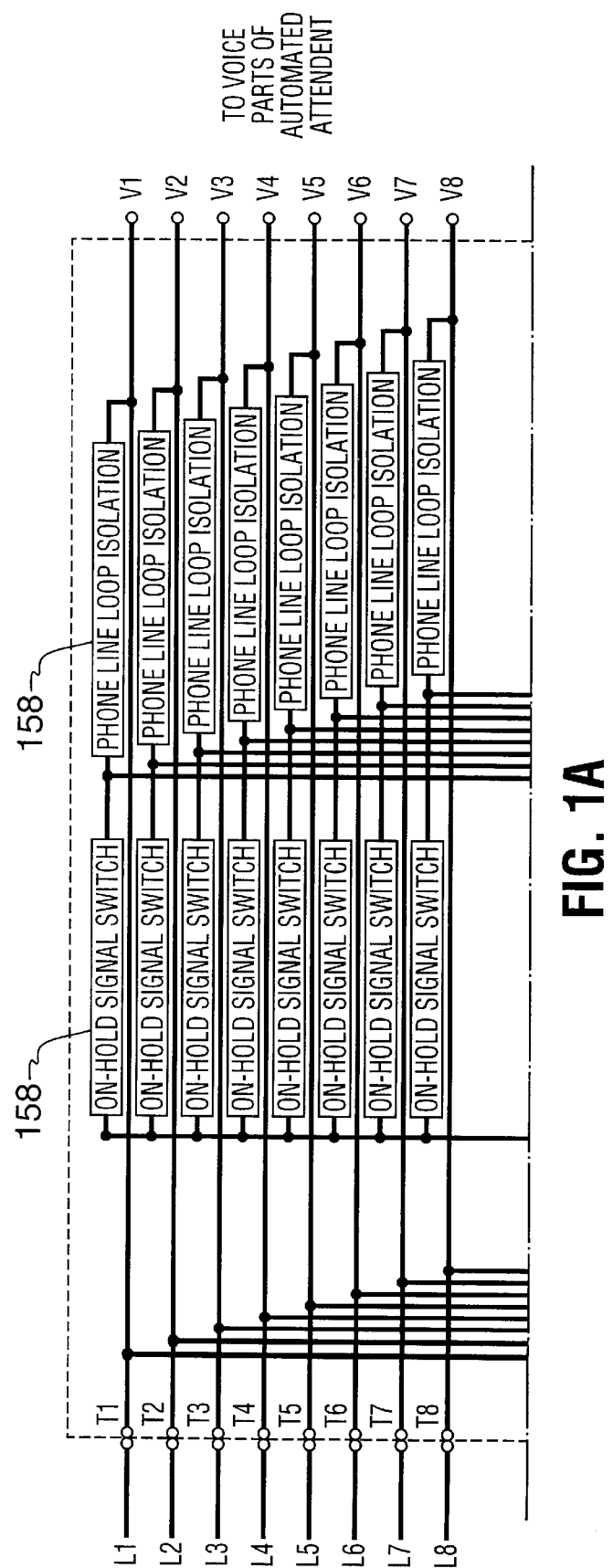

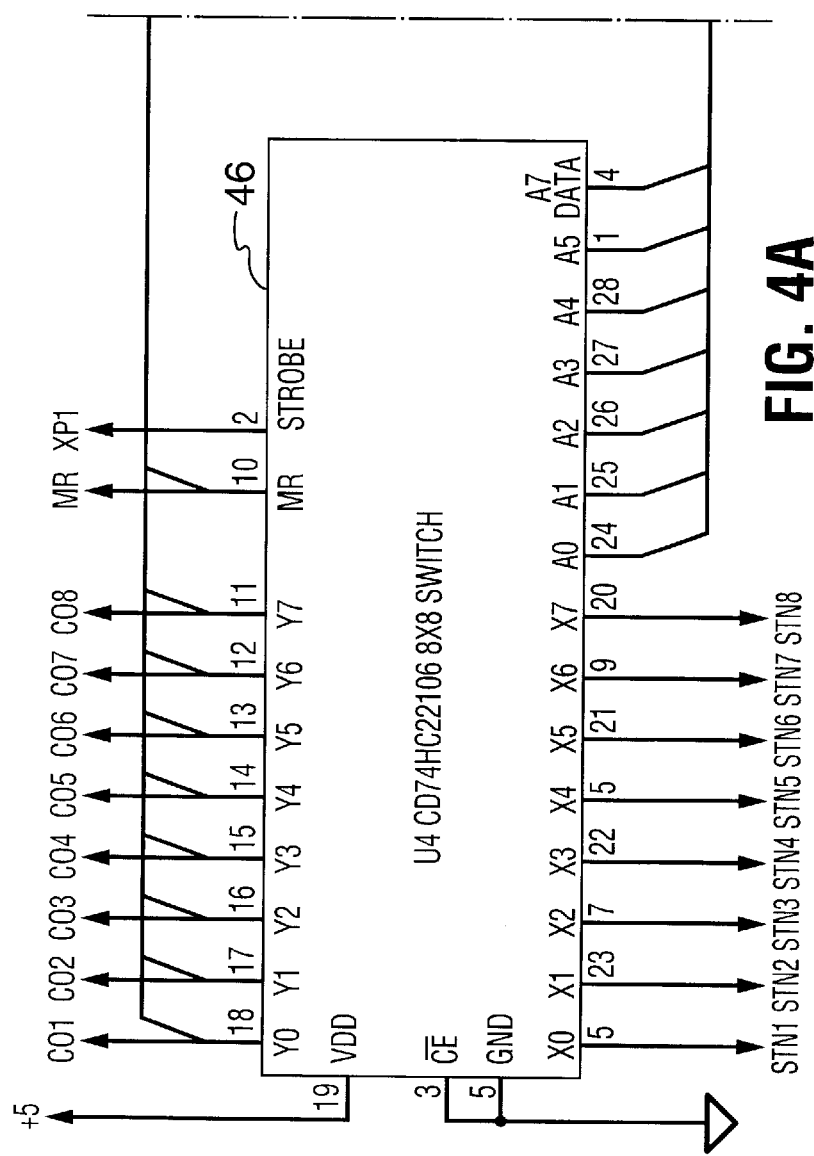

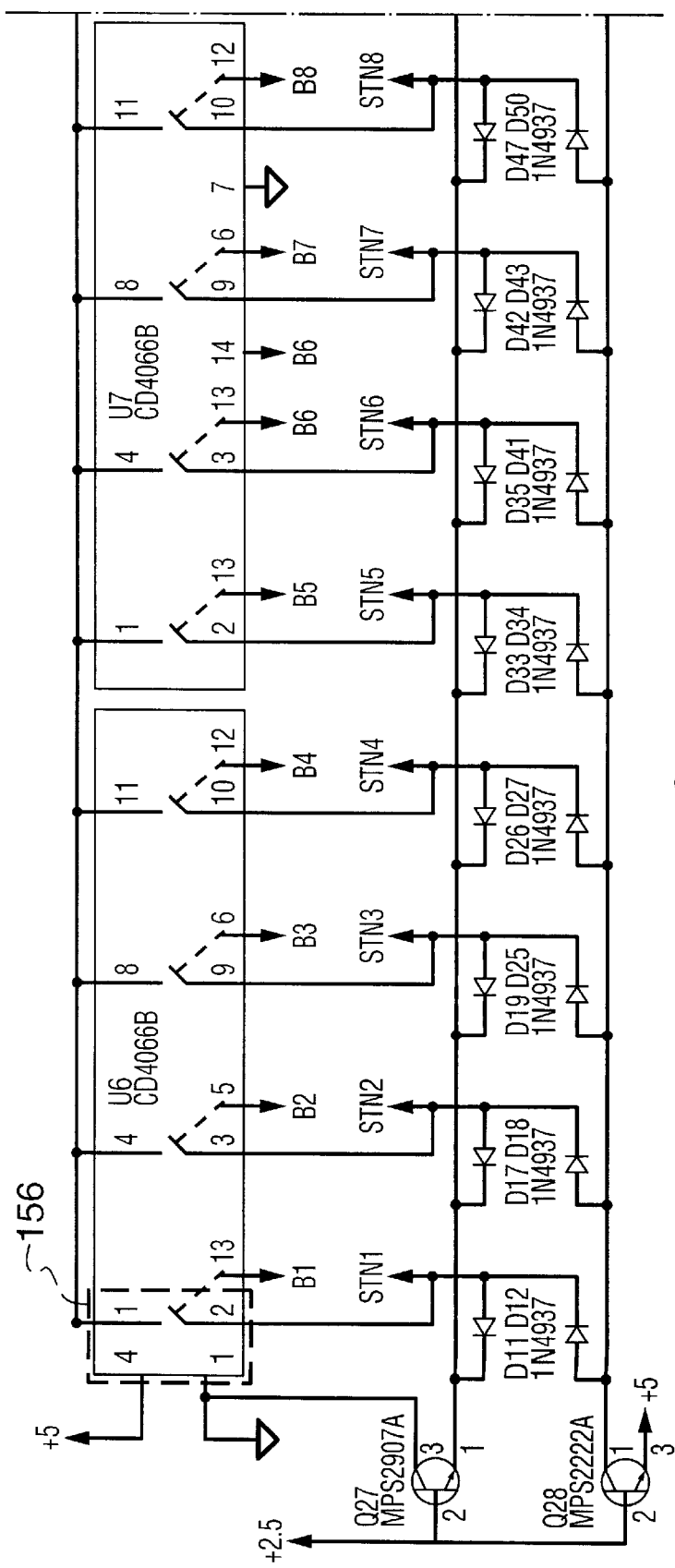

FIG. 9

| FIG. 9A | | |
|---|---|---|
| FIG. 9B | FIG. 9C | FIG. 9D |

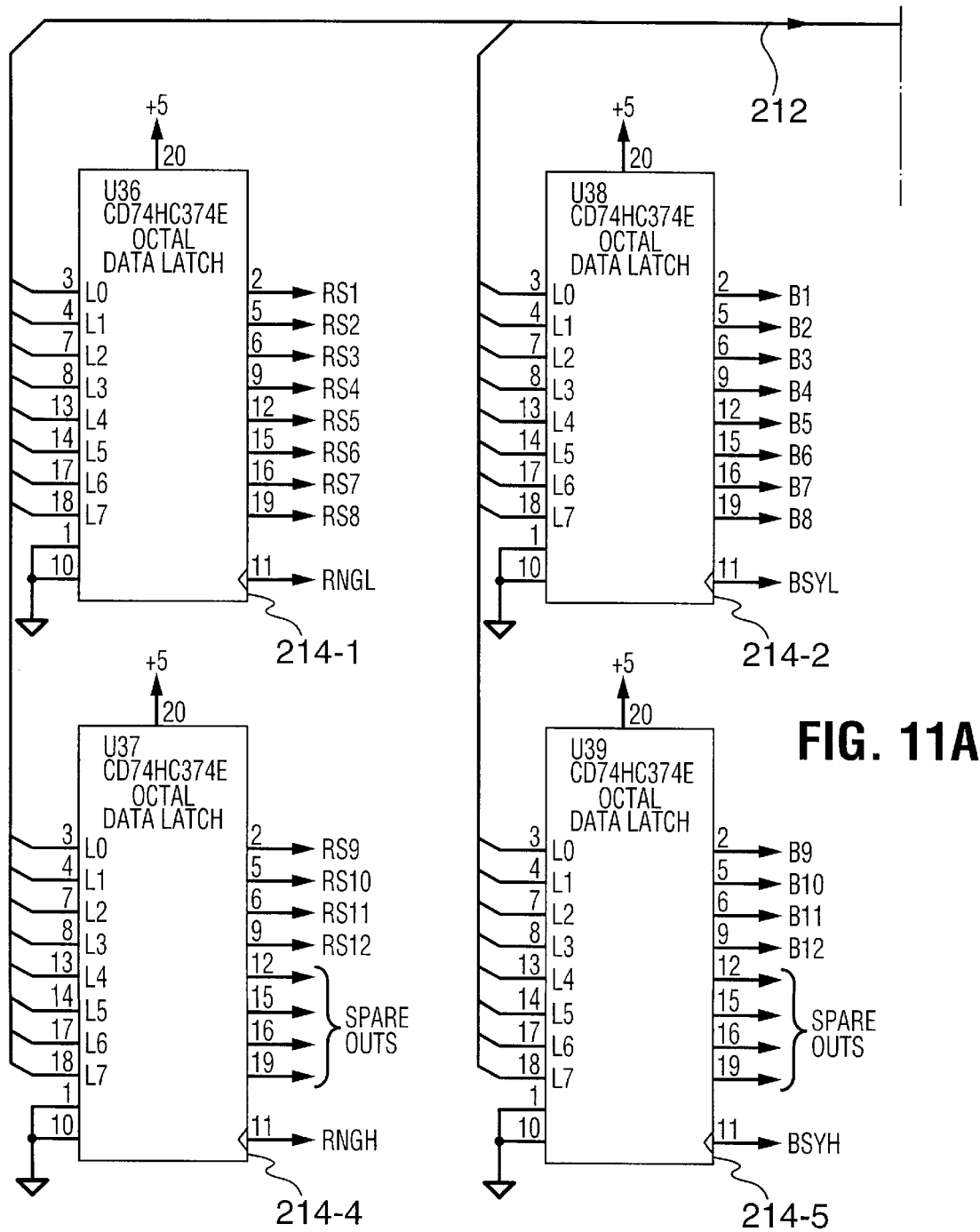

APPARATUS AND METHOD FOR COUPLING AN AUTOMATED ATTENDANT TO A TELECOMMUNICATIONS SYSTEM

BACKGROUND OF THE INVENTION

1. Field of the Invention

The present invention relates to an apparatus and method for coupling an automated attendant to a telecommunications system. More specifically, the present invention relates to a telecommunications switching apparatus that can be used in conjunction with an automated attendant and which is capable of transferring incoming telephone calls answered by the automated attendant to any of a plurality of stations while enabling the automated attendant to monitor the status of the incoming calls continuously.

2. Description of the Related Art

Many businesses subscribe to a plurality of telephone numbers in order to handle a large amount of incoming telephone calls. Typically, these multiple telephone numbers require that the business have access to several trunk or central office (CO) lines which each provide service for a specific number.

Conventionally, a business would utilize telephones that are each capable of being connected to any of the plurality of trunk lines. For example, in a drug store, bank, or any typical business, each telephone would be connected to all of the CO lines to which the business subscribes. Each telephone would have a plurality of buttons, each of which is assigned a specific telephone number corresponding to the subscriber number being handled by one of the CO lines.

Assuming, for example, that the business subscribes to five telephone numbers, five trunk lines would enter the business, and each of those trunk lines would be coupled to a button on each of the telephones in the business. Hence, if a call were to come in on line 1, the button on each of the phones corresponding to that line would light up, and all of the phones would ring. A person could then answer the call coming in on that line by depressing the lighted button and picking up the receiver.

However, a drawback of this conventional system is its inability to transfer calls to other lines. For example, if a call were to come in on line 1 that was meant for a person at telephone station 3 but was answered by a person at telephone station 1, the person at telephone station 1 would have to inform the person at telephone station 3 that person has a telephone call. Typically, this would be accomplished by a paging system in which the person answering the call would page the person for which the call was meant. The person for which the call was meant would then need to depress the button on his or her telephone corresponding to the line on which the call was being received.

Hence, this type of system would result in a disruption of the person at telephone station 1 even though the call was not meant for that person. Also, everyone in the business would constantly have to listen to the pages to ascertain whether they were meant to receive a particular call. Furthermore, this type of system afforded little or no privacy because a person at any telephone could easily eavesdrop on any of the lines.

In order to improve this type of telephone system by enabling the system to have the capability of transferring calls being received on any of the trunk lines to a particular line designated to a particular phone or station, a private branch exchange (PBX) was developed as shown, for example, in FIG. 24. A PBX is a programmable device which includes a plurality of input ports to which are coupled the plurality of trunk lines, and a plurality of output ports which are coupled to the telephone stations in the business.

The PBX can be controlled, for example, by an operator. Hence, if a call comes in on the first trunk line, for example, the PBX can answer that call and then forward that call to the operator. The operator can then control the PBX to transfer that call to another line (e.g., the third station line), so that the telephone allocated to receive calls on that third station line would ring. PBXs also afford the system the capability of servicing a number of stations different from the number of trunk lines.

For example, in a 4×8 PBX system, four trunk lines can be input to the PBX, while eight station lines can be output from the PBX. Hence, the PBX can be controlled to transfer calls being received on any one of those four trunk lines to any one of the eight station lines.

A typical PBX of the type described above can further be programmed to perform many tasks in addition to transferring incoming calls. For example, the PBX can be programmed to ring telephones at several of the station lines in response to an incoming call. Also, the PBX is capable of permitting connections between telephones at various stations. Hence, if a person at one station wishes to call a person at another station, that person can use an "inside line" which the PBX provides in order to make the connection.

Furthermore, the PBX is capable of screening a telephone number that is being dialed at one of the station phones. For example, particular stations phones may be prohibited from dialing long distance numbers. Accordingly, the PBX is capable of determining when an attempt is made to dial a long distance number from one of those stations, and will prevent such a call from being made.

It is also important to note that a PBX is typically used with a system having telephones that are incapable of performing dialing functions themselves. In such a system, the PBX performs the dialing functions in accordance with signals received by those types of telephones which are connected to the PBX.

In a further attempt to streamline a conventional telephone system, an automated attendant has been developed as shown, for example, in FIG. 25. An automated attendant is used in conjunction with a PBX to perform the tasks that would be performed by a human operator, such as taking messages and controlling the PBX to transfer calls to any number of stations.

It is noted that an automated attendant does not have the capability of transferring calls on its own. Hence, in conventional systems, an automated attendant must be used in conjunction with a PBX. Therefore, if a conventional telephone system, such as that described above which is serviced by a plurality of telephone lines, is modified to have automated attendant capabilities, a PBX must also be employed in the system even if the additional functions provided by a PBX are not used.

For example, in order to enable a conventional telephone system to be used with an automated attendant, Microlog Corporation has developed a front-end module, an example of which is shown specifically in FIG. 25. The front-end module is a standard PBX, however, the front-end module PBX is only used to give the system call transferring capabilities that are not provided by an automated attendant alone. The trunk lines (e.g., 8 trunk lines) are input to the input ports of the front-end module PBX, and 8 of the output ports are dedicated for use by the automated attendant. It is noted that in a system having 8 trunk lines which originally were connected to each of 8 station phones, an 8×16 PBX having 8 input ports and 16 output ports must be used. The 8 input ports are connected to the trunk lines and 8 of the output ports are connected to the voice ports of the automated attendant. The other 8 output ports of the PBX are connected to the 8 stations as illustrated.

A call coming in on any of the trunk lines (e.g., trunk line 1) will be answered by the PBX, which then transfers the call to the automated attendant. The automated attendant will typically play a message to the caller which gives the caller several options, such as the opportunity to leave a message or to press a key on the caller's telephone keypad in order to instruct the automated attendant to perform a certain function (e.g., to control the PBX to transfer the call to one of the station lines).

However, several problems exist with this type of front-end module PBX and automated attendant system. For example, because PBXs are capable of performing many tasks in addition to call transferring as discussed above, PBXs typically are very complex and consequently, very expensive. Therefore, a proprietor of a small business may not wish to incur such expense in order to update their telephone system to have automated attendant capabilities. In other words, if the proprietor merely wants to update the telephone system of the business to have automated attendant capabilities, the type of system described above which uses a PBX as a front end module is impractical from a cost standpoint because the proprietor is essentially paying for the additional capabilities made available by the front-end module PBX even though the proprietor has no desire to employ those features in the business.

Furthermore, due to the nature of the PBX system, the automated attendant is rendered incapable of determining the status of an incoming call. An automated attendant monitors the status of an incoming call (i.e., to detect hang-up by the caller) on a trunk line by monitoring the line status of that trunk line (i.e., the DC loop current component of the telephone signal from the caller's station). If a call is active on a trunk line, that trunk line will have a certain DC loop current. When the caller hangs up to release that trunk line, the loop current will disappear. However, because a PBX isolates the loop current of the trunk lines from the automated attendant, the automated attendant used in conjunction with a PBX cannot detect the loop current of the trunk lines to monitor the status of the incoming calls.

Hence, in the typical automated attendant and PBX system, such as the front end module type system described above, if a caller instructs the automated attendant to control the PBX to transfer a call to a particular station line and then hangs up, the automated attendant will continue its processing operations for a certain period of time after hang up. As a consequence, the automated attendant does not allow the PBX to release the trunk line on which the call was incoming, and furthermore, does not release the station line to which the call was being transferred. Hence, no calls could come in on that particular trunk line during this period, and no calls could be made on that station line.

In an attempt to eliminate this drawback, loop current detectors have been coupled to the trunk lines as shown in FIG. 25, and are configured to provide signals to the automated attendant indicating the status of the loop current on the trunk lines. The automated attendant can determine from this loop current whether the caller on the trunk line has hung up. However, this arrangement does not eliminate the need for a PBX to implement call transfers.

Furthermore, because the PBX answers the incoming call, this arrangement prevents the automated attendant from performing caller-ID functions. An automated attendant will detect a caller-ID signal that is present between the first and second ring signals of an incoming call. However, because the PBX answers the incoming call and hence, isolates the call from the automated attendant, the automated attendant does not receive this caller-ID signal.

Accordingly, a need arises for a system that is capable of enabling an existing telephone system to be used with an automated attendant and have call transferring capabilities without requiring the use of an expensive PBX. This system also should allow the automated attendant to receive the incoming calls, thereby enabling the automated attendant to detect and process the caller-ID signal. The system should further enable the automated attendant to monitor the status of an incoming call when the call is being transferred and throughout the entire period when communication is established between the caller and a called party, to thus enable the automated attendant to detect for hang-up by the calling party at any time.

SUMMARY OF THE INVENTION

An object of the present invention is to provide an apparatus for coupling an automated attendant to a telecommunications system which provides call transferring capabilities without the use of a PBX.

Another object of the present invention is to provide an apparatus which enables the automated attendant to receive and answer the incoming calls. The apparatus thus enables the automated attendant to detect and process a caller-ID signal and continuously monitor the status of a call being received on the trunk lines of the telecommunications system when the apparatus is being controlled to transfer calls and also while communication is occurring between the trunk lines and a called party line which is serviced, for example, by one of the station lines.

A further object of the present invention is to provide an apparatus that has a switching network that operates in conjunction with an automated attendant, such that the apparatus operates to essentially isolate the switching network from the audio signal component of an incoming call when the automated attendant is handling the incoming call and further, which operates to essentially isolate the automated attendant from the audio signal of the incoming call while enabling the automated attendant to monitor the loop current of the line on which the incoming call is being received when the incoming call is being routed through the switching network.

Another object of the present invention is to enable an incoming call that is being received on one of the trunk lines to be routed through the switching network and out to an external station over another one of the trunk lines.

A further object of the present invention is to enable system control capabilities from one of the stations attached to the station lines and to provide for paging capabilities from the automated attendant.

Another object of the present invention is to provide a system which is adapted to be coupled to an existing telephone system, and which monitors itself continuously for abnormalities such as loss of power, loss of control signals, and so on, so as to reestablish the original connections between the trunk lines and station lines of the existing system in the event of such an abnormality.

The above objects are substantially achieved by providing an apparatus including a plurality of line ports which are adapted to be coupled to a plurality of trunk lines, respectively, of an existing telephone system, and a plurality of ports which are adapted to be coupled to the voice ports, respectively, of an automated attendant system. The apparatus further includes a switching network which is controllable to establish communication between any of the trunk lines and any of a plurality of station line ports that are adapted to be coupled to a plurality of telephone stations, respectively. The apparatus further includes an isolation circuit which is operable to essentially isolate the switching network from the AC audio portion of a signal being received on one of the trunk lines when the signal is being handled by the automated attendant, and which is further operable to essentially isolate the automated attendant from the AC portion of the signal when the signal is routed through the switching network while allowing the automated attendant to monitor the DC loop current of the trunk line on which the signal is being received.

The apparatus further includes a plurality of detector circuits which are capable of detecting the status of the station lines prior to establishing communication between a trunk line on which a call is being received and a particular station line. The apparatus also includes a port which is adapted to be coupled to a station which is capable of providing control communication to the automated attendant via a designated station line. Furthermore, the switching network is capable of providing communication between a designated station or automated attendant port and an output port of the apparatus which adaptable to be connected to a sound system that is capable of outputting audio signals (e.g., paging) based on the signals input at the designated station.

BRIEF DESCRIPTION OF THE DRAWINGS

Referring now to the drawings, which form part of the original disclosure.

DETAILED DESCRIPTION OF THE PREFERRED EMBODIMENTS

Figure 1B:
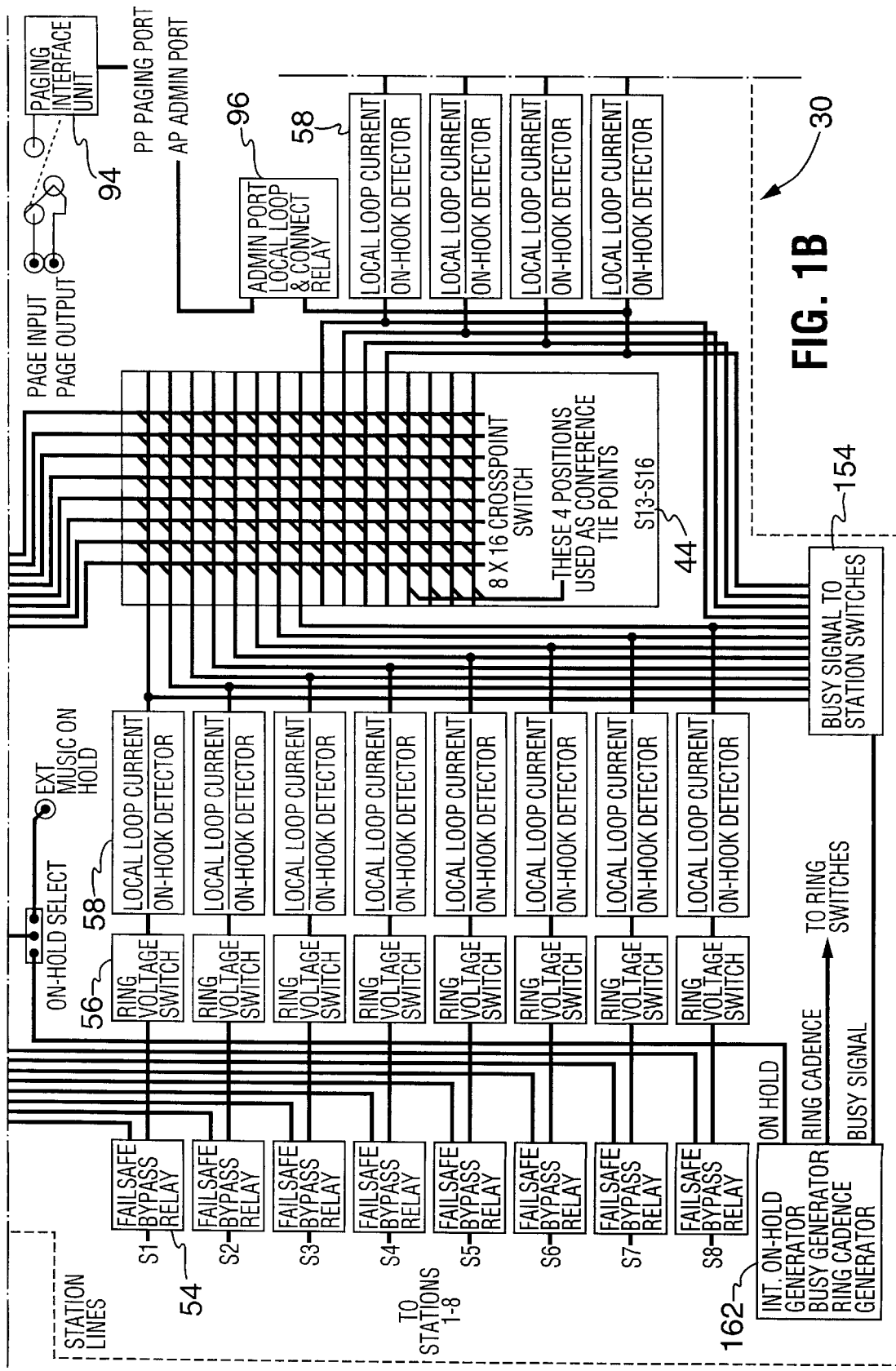
FIG. 1 is a schematic diagram of an embodiment of an apparatus according to the present invention for coupling an automated attendant to a telecommunications system.
Figure 1C:
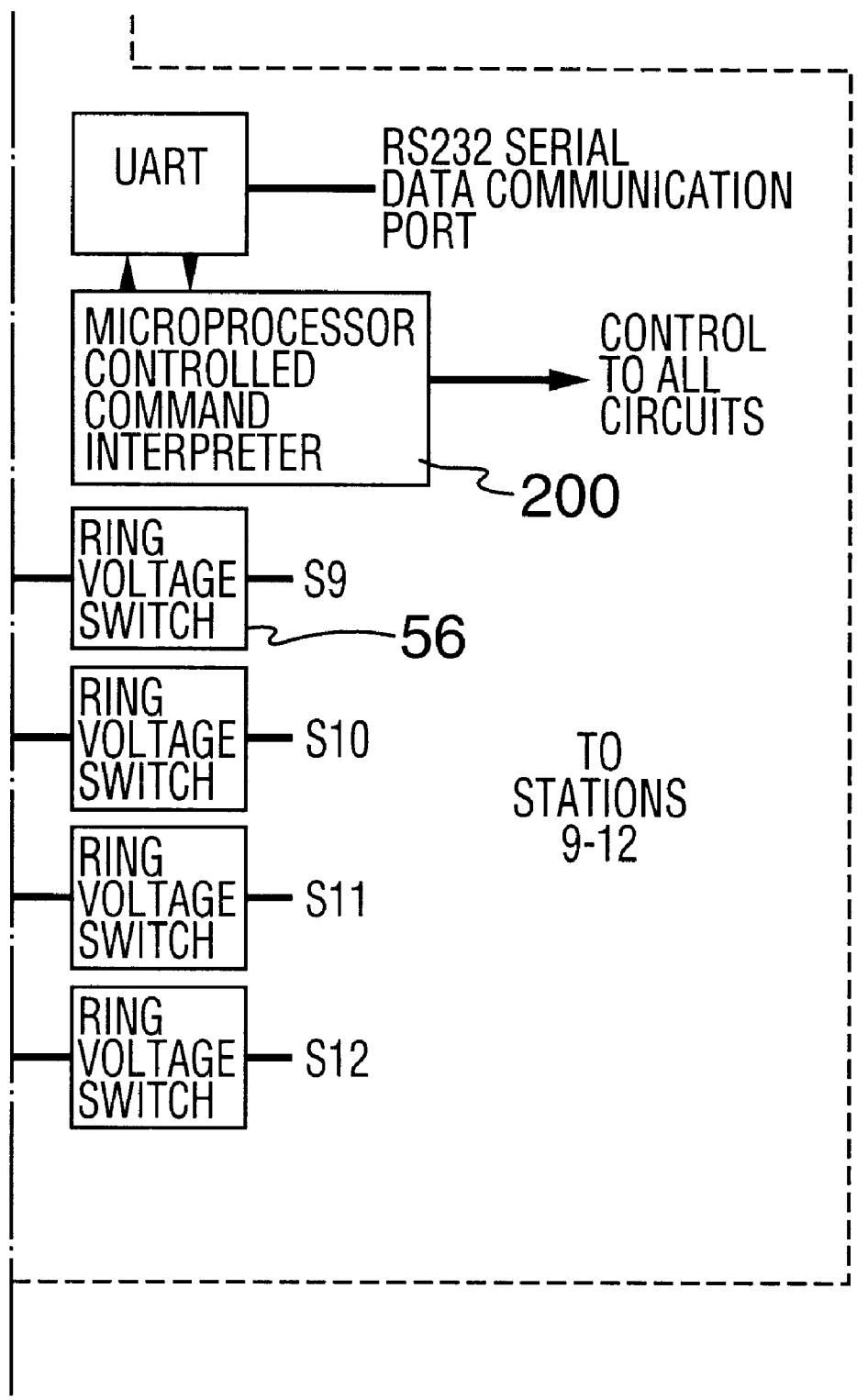

FIG. 1 illustrates an embodiment of an apparatus 30 according to the present invention for coupling an automated attendant (not shown) to a telecommunications system comprising a plurality of stations (not shown). The telecommunications system, which will be referred to as the "original system", is configured such that each of a plurality of trunk lines L1–L8 is coupled to a respective one of a plurality of station lines S1–S8. The automated attendant and apparatus 30 are added to this original system as will now be discussed.

The apparatus 30 includes a plurality of trunk line ports T1–T8 which are adapted to be coupled to a plurality of trunk lines L1–L8, respectively, by any type of conventional connector. Each of the trunk lines L1–L8 comprises two conductors (referred to as tip and ring), and hence each of the trunk line ports T1–T8 comprises two terminals.

The apparatus 30 further includes a plurality of ports V1–V8 which are each adapted to be coupled to a plurality of voice ports, respectively, of an automated attendant (not shown). The voice ports of the automated attendant each comprise two terminals, and hence each of the ports V1–V8 has two terminals which are adapted to mate with the terminals of the respective voice port to which they are coupled. Although the number of terminals T1–T8 and trunk lines L1–L8 is equal to the number of voice port terminals V1–V8 in this embodiment, the invention is not limited to this arrangement.

The automated attendant can be any type of microprocessor or computer controlled automated attendant known in the art that can be programmed to automatically answer and handle a telephone call being received on a trunk or CO line in a desired manner, and which includes a communication port or ports for outputting and receiving data signals to and from an external unit (e.g., a switching unit or PBX). For example, the automated attendant can be any of the "Callstar", VCS-3500, or "Retail Solution" models manufactured by Microlog corporation. These types of automated attendants can include Models D41/D, D41/H or D160/ESC voice boards manufactured by Dialogic Corporation. Specifically, the automated attendant should be capable of answering an incoming telephone call, providing audio messages to the caller, and handling the call based on instructions provided by the caller in response to the audio messages.

Figure 2:
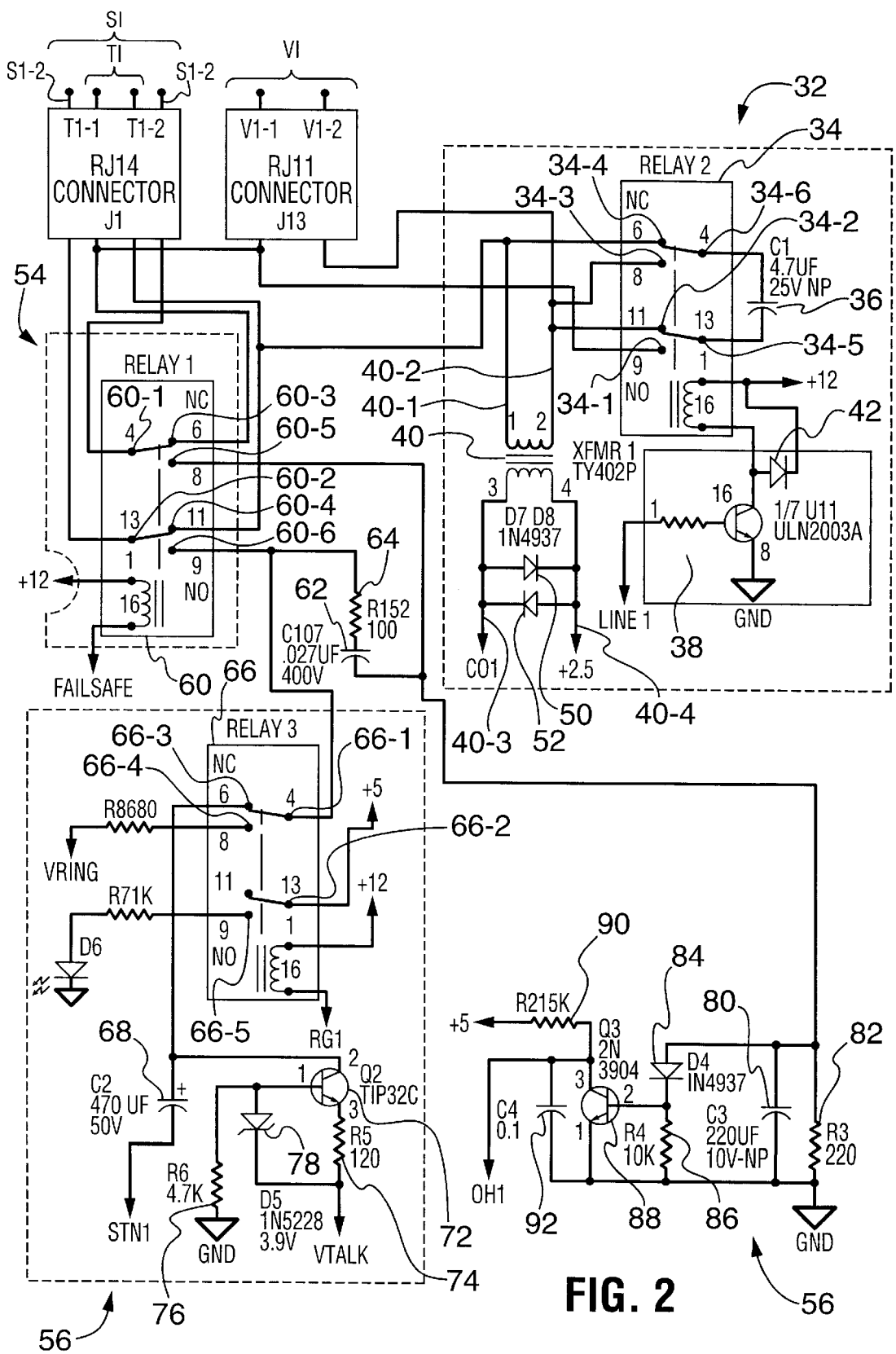
FIG. 2 is a schematic diagram of a fail-safe bypass relay, ring voltage switch, local loop current on-hook detector circuit, and phone line loop isolation circuit used in the apparatus shown in FIG. 1.

As shown in FIG. 1, the apparatus 30 further includes a plurality of phone line loop isolation circuits 32 which are each coupled to a respective trunk line port T1–T8 and a respective port V1–V8. An embodiment of the phone line loop isolation circuit 32 is shown in more detail in FIG. 2. Because all of the phone line loop isolation circuits are essentially identical, only one representative circuit 32 which is associated with ports T1 and V1 is shown in FIG. 2 and described below. However, the isolation circuits 32 need not be identical in a structural sense, but simply need to perform essentially identical functions with respect to their associated T and V ports. Hence, the structure of the isolation circuits 32 can differ from each other as would be appreciated by one skilled in the art.

The phone line loop isolation circuit 32 includes a relay 34, a capacitor 36, a transistor 38, and a coupling transformer 40. The relay 34 is shown as a double-pull/double throw type having a terminal 341 that is coupled to a terminal V1-1 of terminal V1 and a terminal T1-1 of terminal T1, which are also coupled to each other as shown. The relay can be coupled to terminals V1 and T1 via any typical connector know in the art, such as an RJ-type connector as shown. A second and third terminal 34-2 and 343, respectively, of relay 34 are coupled to each other and to a terminal V1-2 of port V1. A fourth terminal 34-4 of relay 34 is coupled to a terminal T1-2 of terminal T1. Capacitor 36 is coupled across terminals 345 and 346 of relay 34.

Figure 3A:
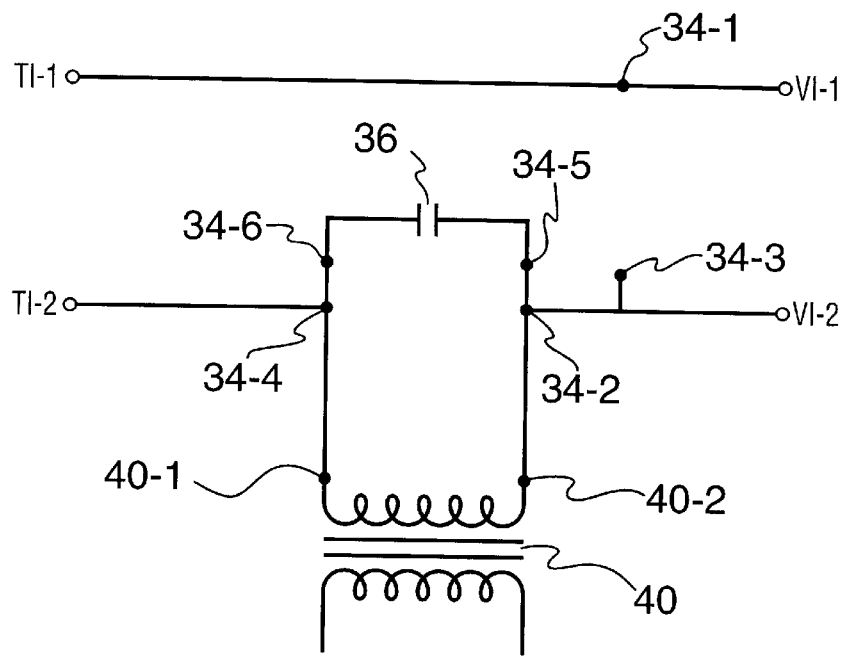
FIGS. 3A and 3B are schematic diagrams showing alternate connections of a capacitor in the phone line loop isolation circuit shown in FIG. 2.
Figure 3B:
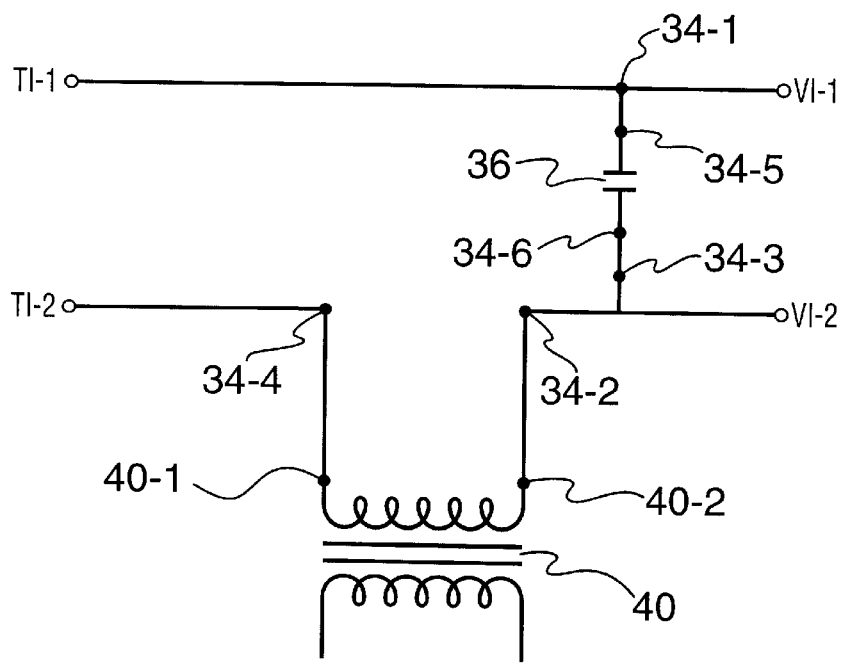

The relay is controllable by transistor 38 to switch between a first mode in which terminals 34-2 and 34-4 are coupled to terminals 34-5 and 34-6, respectively, as shown in FIG. 3A, and a second mode in which terminals 34-1 and 34-3 are coupled to terminals 345 and 34-6, respectively, as shown in FIG. 3B. As shown in FIG. 3A, when the relay is in the first mode, the capacitor 36 is coupled across the first pair of terminals 40-1 and 40-2 of coupling transformer 40. However, when the relay is in the second mode as shown in FIG. 3B, the capacitor 36 is coupled across ports V1-1 and V1-2 of port V1, as well as across ports T1-1 and T1-2 of port T1. In the preferred embodiment, the capacitor 3B has a value of 4.7 µF.

The relay is controllable to switch between the first and second modes under the control of transistor 38 whose collector is coupled to one control terminal of the relay and to the second control terminal of the relay via a diode 42. As discussed below, the transistor 38 is controlled by a control signal provided on LINE 1 by the controller 200 of the apparatus 30 (see FIGS. 1 and 10) which is described in more detail below.

Figure 4B:
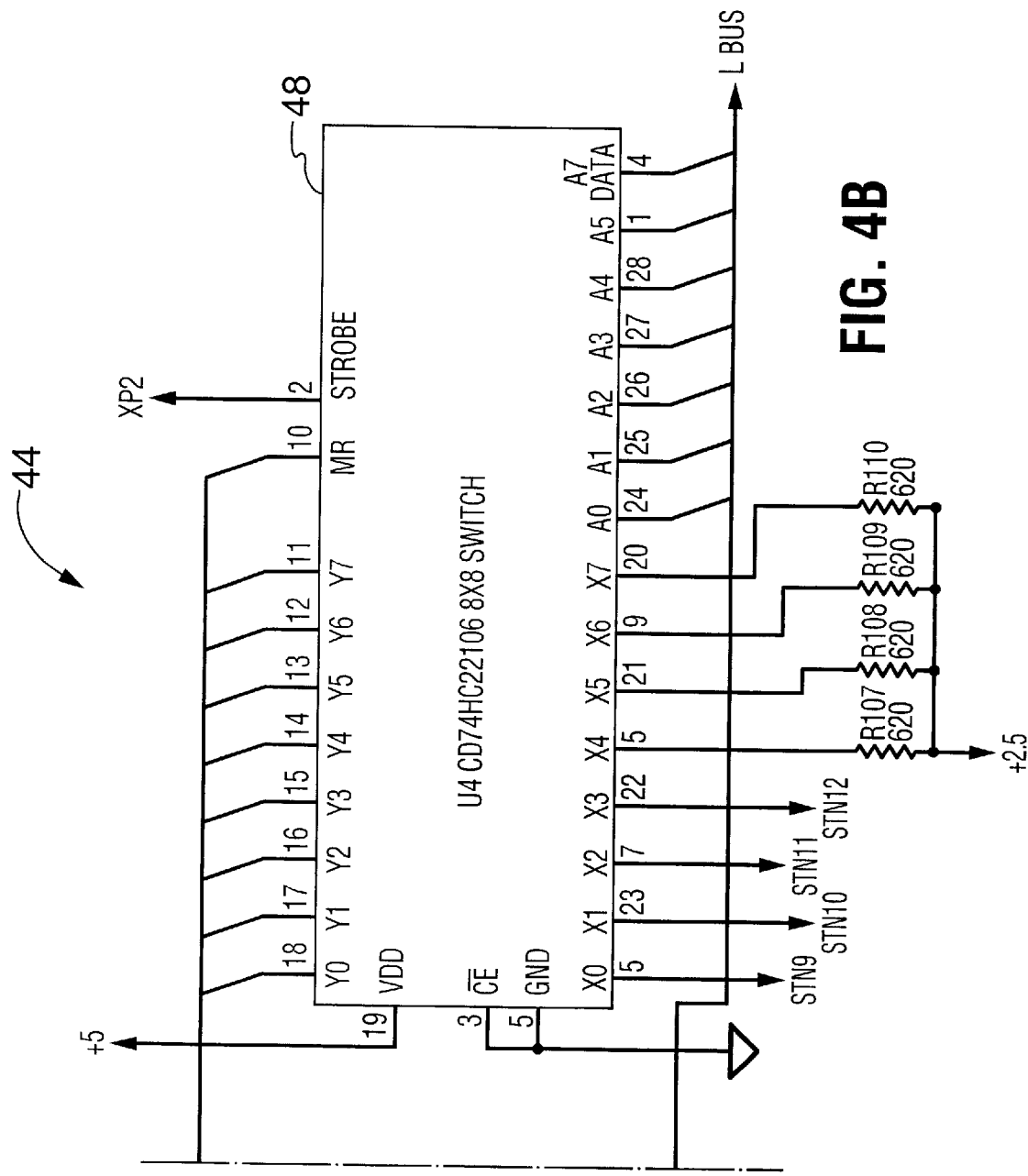
FIG. 4 is a schematic diagram of a switching circuit used in the apparatus shown in FIG. 1.

The apparatus 30 of FIG. 1 further includes a switching circuit 44 as shown in FIG. 4, which is controllable by the controller 200 as discussed in detail below. The embodiment of the switching circuit 44 shown in FIG. 4 comprises two 8×8 switching circuits 46 and 48. Each of the switching circuits includes eight terminals Y0–Y7 which are each coupled via lines CO1–CO8, respectively, to a respective one of the coupling transformers 40 of a respective phone line isolation circuit 32.

That is, as shown in FIG. 2, a terminal 40-3 of the coupling transformer 40 is coupled to line C01 (which is described in more detail below) to terminal Y0 of 8–8 switches 46 and 48. The other terminal 40-4 of coupling transistor 40 is coupled to a +2.5 volt voltage source, and terminals 40-3 and 40-4 of transformer 40 are coupled to each other by diodes 50 and 52 as illustrated.

The switching circuit 44, as described in detail below, is capable of providing communication between any trunk line L1–L8 and any of a plurality of station line ports S1–S12, as shown in FIG. 1, which each include two terminals which are adapted to be coupled to a telephone (not shown) at a respective station 1-12. Specifically, ports X0–X7 of switch 46 are each coupled to a terminal of station line ports S1–S8, respectively, and ports X0–X3 of switch 48 are each coupled to a terminal of station line ports S9–S12. As can be readily appreciated by one skilled in the art, the number of 8×8 switches can be increased as necessary to increase the amount of station line ports that are serviced by the apparatus 30. Also, since the switching circuit 44 can comprise any type of conventional switching circuit, different configurations can be made which would readily be apparent to one skilled in the art to handle different numbers of trunk and station lines.

In the embodiment shown in FIG. 1, the switching circuit 44 is coupled to station line ports S1–S8 via a plurality of local loop current/on-hook detector circuits 54 (detector circuits 54), ring voltage switch circuits 56, and failsafe bypass relay circuits 58, which are each associated with a particular station line port S1–S8. Because the detector circuit 54, ring voltage switch circuit 56 and failsafe bypass relay circuit 58 designated for each of station line ports S1–S8 are essentially identical in operation and construction, only those circuits designated for station line S1 are illustrated in FIG. 2 and described below. However, the detector circuits 54, ring voltage switch circuits 56 and failsafe bypass relay circuits 58 need not be identical in a structural sense, but simply need to perform essentially identical functions with respect to their associated S1–S8 lines. Hence, the structure of those circuits can differ from each other as would be appreciated by one skilled in the art.

As shown in FIG. 2, the failsafe bypass relay circuit 54 includes a double-pull/double-throw type relay 60 that is driven by a signal "FAILSAFE", which is described in detail below. The relay 60 can be any conventional type of relay as would be appreciated by one skilled in the art. The relay includes terminals 60-1 and 60-2 which are coupled to terminals S1-1 and S1-2, respectively, of station line port S1. The relay further includes terminals 60-3 and 60-4 which are coupled to terminals T1-1 and T1-2, respectively, of terminal T1. The terminals 60-1 through 60-4 can be coupled to the terminals S1-1, S1-2, T1-1 and T1-2, respectively, by any type of connector, such as an RJ-type connector as illustrated. Furthermore, that connector can be integral with the connector which is used to couple the terminals of relay 34 of the phone line loop isolation circuit 32 to the terminals T1-1 and T1-2 of terminal T1. The relay 60 further includes a terminal 60-5 which is coupled to detector 58, and terminal 60-6 which is coupled to ring voltage switch 56 and is coupled to detector 58 via a capacitor 62 and a resistor 64.

The relay 60 can be controlled to operate in a first mode in which terminals 60-1 and 60-2 are coupled to terminals 60-3 and 60-4, respectively, or a second mode (not shown) in which terminals 60-1 and 60-2 are coupled to terminals 60-5 and 60-6, respectively. In the first mode, which is the "failsafe" mode described below, the terminals T1-1 and T1-2 of terminal T1 are coupled to terminals S1-1 and S1-2, respectively, via the relay 60 of the failsafe bypass relay 54. As described below, this mode reestablishes the original connections between terminals T1–T8 and station lines S1–S8, respectively, as if the apparatus 30 and automated attendant were not part of the telecommunications system. Conversely, in the second mode, communication between terminals S1 and T1 is provided via the local loop current/on-hook detector 58 ring voltage switch 56 and failsafe bypass relay 54.

Specifically, the ring voltage switch 56 includes a double-pull/double-throw type relay 66 that is controlled by a signal RG1 as described in more detail below. The relay has a terminal 66-1 that is coupled to terminal 60-6 of relay 60 of failsafe bypass relay 54. The relay further includes a second terminal 66-2 that is coupled to a voltage supply, for example, a 5 volt supply. Terminal 66-3 of relay 66 is coupled to the XO terminal of switch 46 of switching device 44 by line STN1 via a capacitor 68. Terminal 66-4 of relay 66 is adapted to receive a ring voltage VRING, and terminal 66-5 is coupled to a diode 70.

The ring voltage switch 56 further includes a transistor 72 having a collector coupled to terminal 66-3, an emitter coupled to receive a voltage VTALK (described later) via a resistor 74, and a base that is coupled to ground GND via a resistor 76 and adapted to receive voltage VTALK via a zener diode 78. The relay 66 is controlled by the transistor 72 to operate in a first mode in which terminals 66-1 and 66-2 are coupled to terminals 66-3 and 66-6, respectively, as shown. In this first mode, communication is established between the XO port of switch 46 via line STN1 and terminal 60-6 of relay 60 of the failsafe bypass relay 54.

The relay 66 is further controllable by the transistor 72 to operate in a second mode in which terminal 66-1 and 66-2 are coupled to terminals 66-4 and 66-5, respectively. In this mode, the voltage at terminal 66-2 is input to diode 70 and thus lights diode 70, while the ring voltage VRING is applied to terminal 66-1 of relay 66.

Local loop current/on-hook detector 58, as shown in FIG. 2, includes a capacitor 80 and a resistor 82 that are coupled in parallel to each other between terminal 60-5 of relay 60 of the failsafe bypass relay 54 and ground. The detector 58 further includes a diode 84 and resistor 86 that are coupled in series with each other and in parallel with capacitor 80 and resistor 82. The detector 58 also includes a transistor 88 having a collector coupled to a power source, for example, a +5 volt DC power source, via a resistor 90, an emitter coupled to ground, and a base coupled to the connection point between diode 84 and resistor 86. A capacitor 92 is coupled across the collector and emitter of transistor 88, and the collector of transistor 88 provides an on-hook output signal over line OH1 to the controller 200 (FIGS. 1 and 10).

Figure 5:
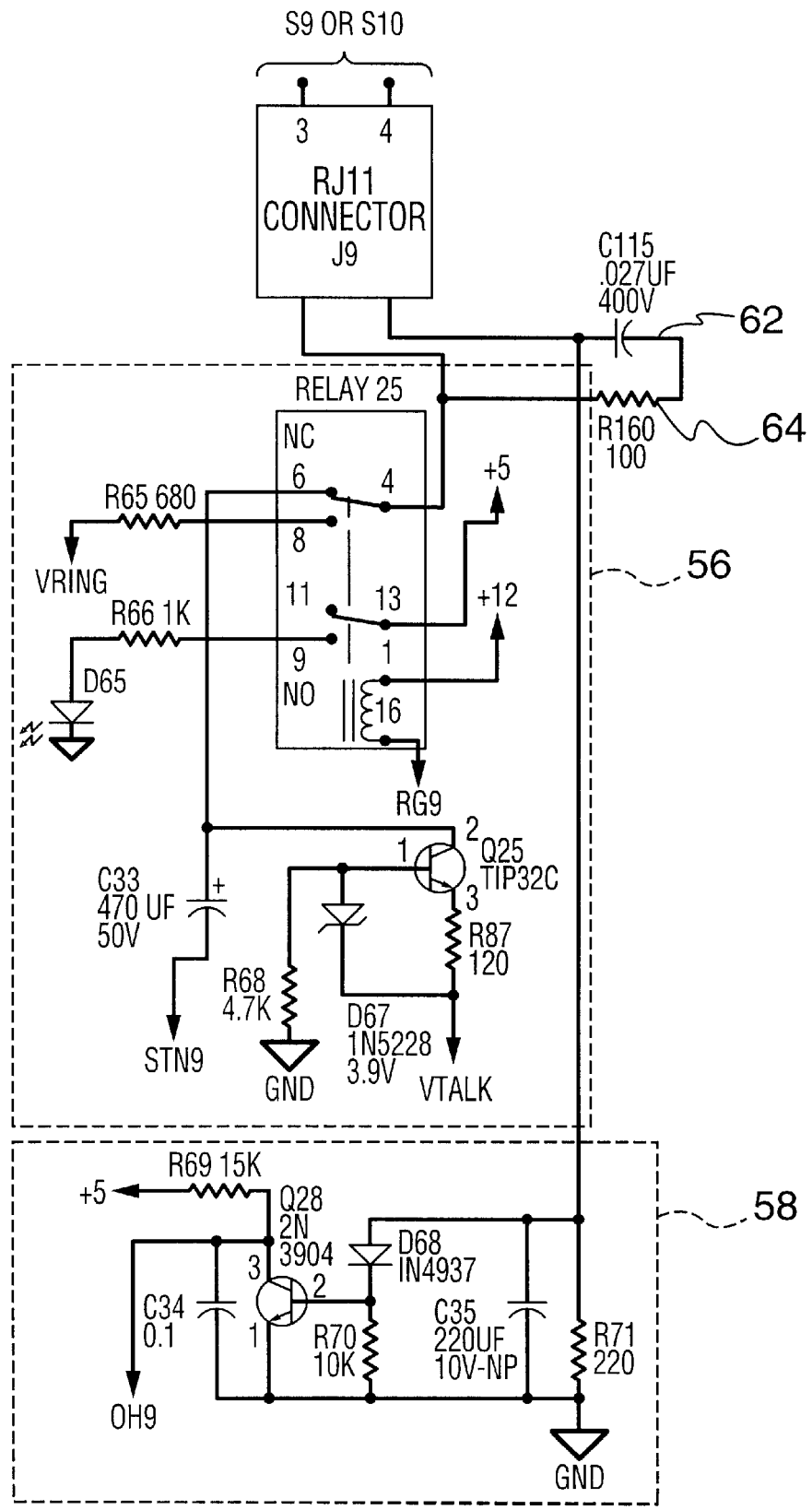
FIG. 5 is a schematic diagram of a ring voltage switch and local loop current on-hook detector circuit associated with station line ports S9 and S10 in the apparatus shown in FIG. 1.
Figure 6A:
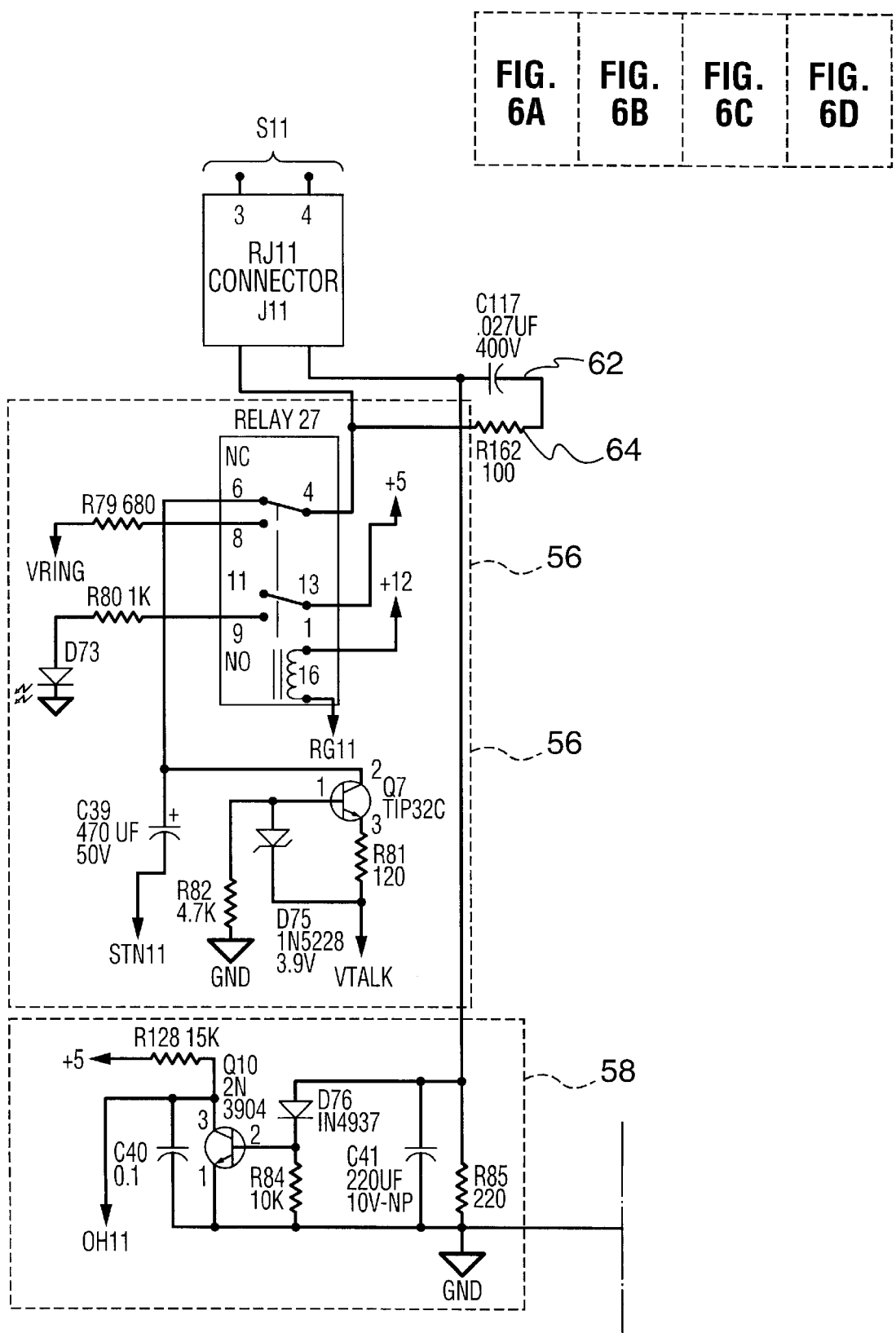
FIG. 6 is a schematic diagram of ring voltage switches and local loop current on-hook detector circuits associated with station line ports S11 and S12 of the apparatus shown in FIG. 1, along with the paging interface unit and administrative port relay in the apparatus shown in FIG. 1.
Figure 6B:
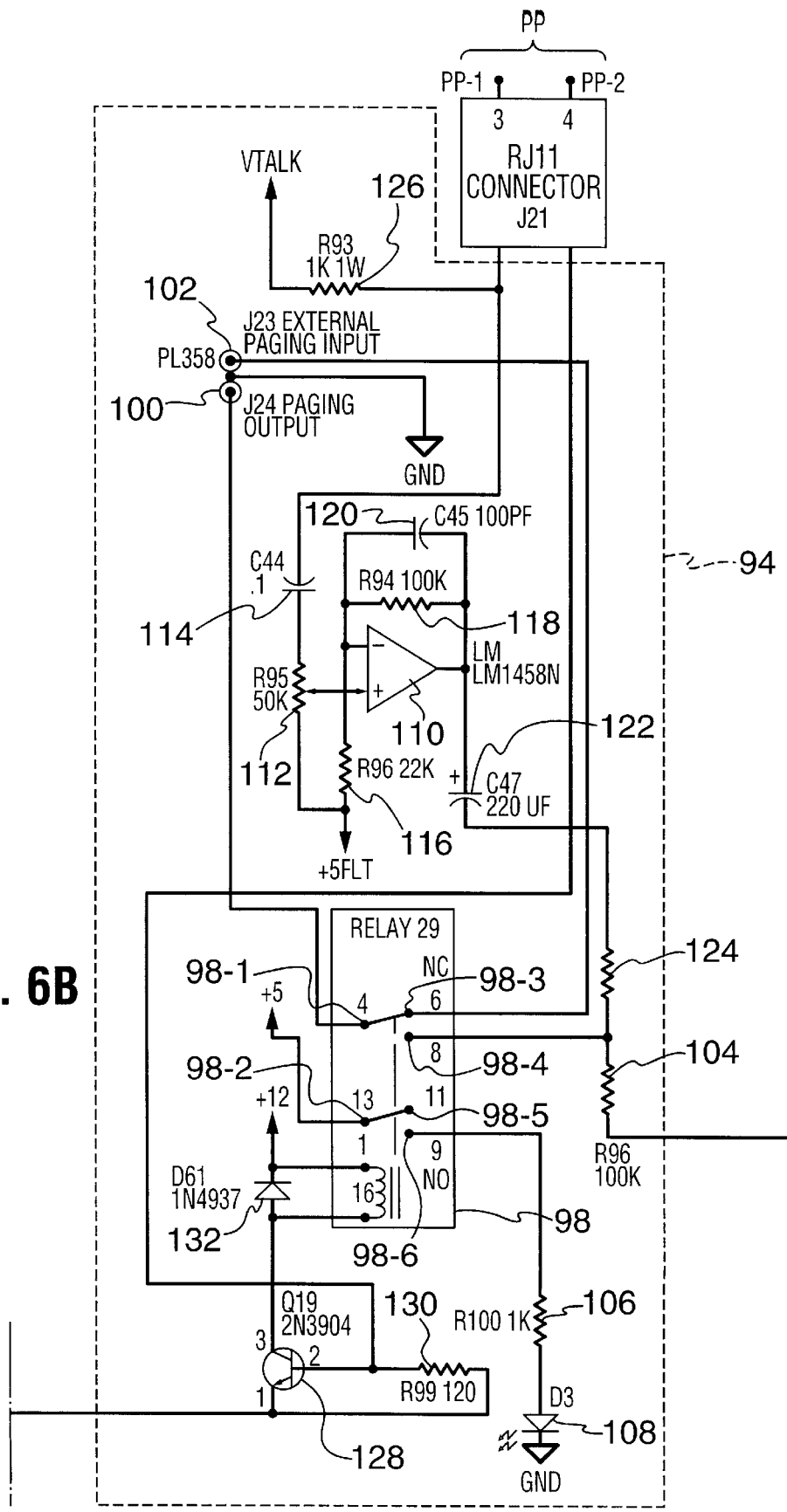
Figure 6C:
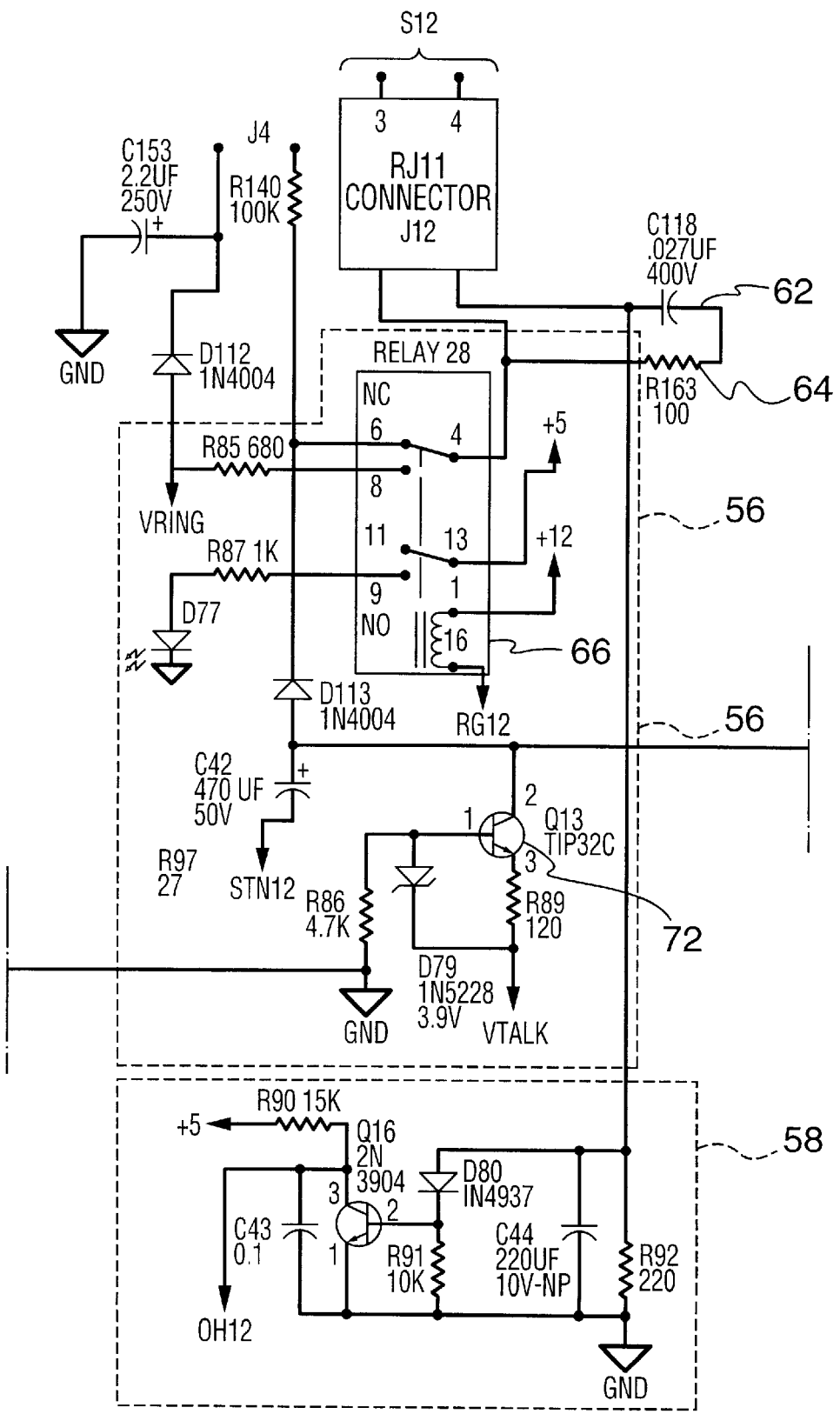
Figure 6D:
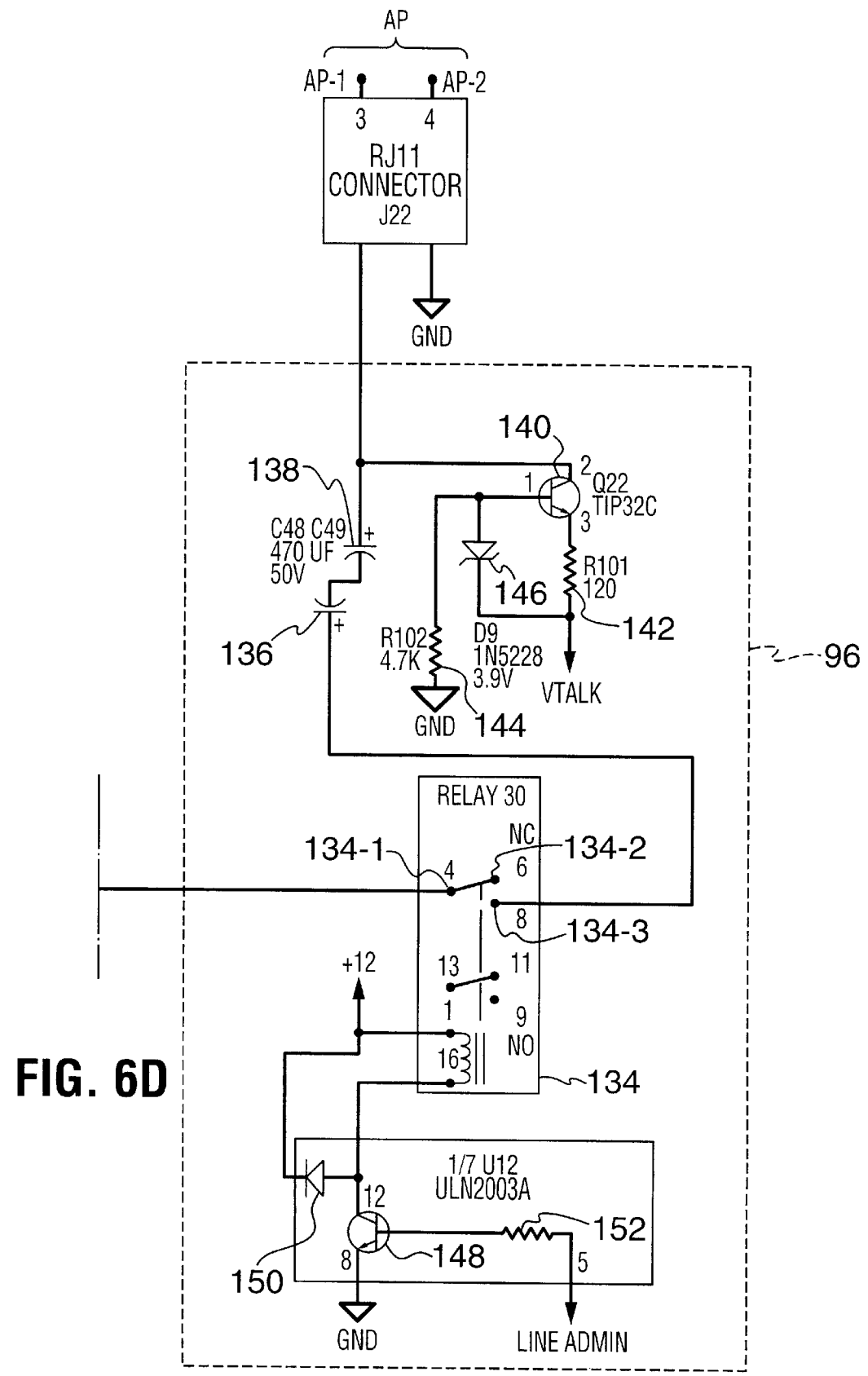

As shown in FIGS. 1, 5 and 6, the switching circuit 44 is coupled to station line ports S9–S12 via a plurality of local loop current/on-hook detector circuits 54 and ring voltage switch circuit 56, which are each associated with a particular station line S9–S12 and essentially identical to the local loop current/on-hook detector circuits 54 and ring voltage switch circuits 56 discussed above. However, it is noted that only 8 trunk lines are connected to stations 1–8 in the original system. That is, station lines 9–12 did not exist in the original system. Thus, no failsafe bypass relay circuits 54 are associated with station ports S9–S12, because no original connection existed and thus need to be reestablished between stations 9–12 in the original system.

Stations line ports S9–S12 can be used to provide four additional station line ports like those already provided by station line ports S1–S8 to which telephones can be connected. However, as discussed in detail below, station line port S12 can be used to input administration signals to the automated attendant. Also, station line port S11, or any station line port for that matter, can be connected to a modem or fax machine, for example, instead of a telephone.

As further shown in FIGS. 1 and 6, the apparatus 30 includes a paging interface unit 94 and an administrative port local loop and connect relay 96. The paging interface unit 94 includes a double-pull/double-throw type relay 98 having a first terminal 98-1 that is connected to a paging output port 100. The relay 98 further includes a second terminal 98-2 that is connected to a power source which, in this case, is a +5 volt power source. The relay 98 further includes a terminal 98-3 that is coupled to an external paging input port 102, and a terminal 98-4 that is connected to ground via a resistor 104. The relay 98 also includes a terminal 98-5 which has no connection, and a terminal 98-6 which is connected to ground via a resistor 106 and diode 108.

The paging interface unit 94 further includes an amplifier 110 having a positive input terminal coupled to a terminal PP-1 of paging port PP via a variable resistor 112 and a capacitor 114. The amplifier 110 has a negative input terminal that is coupled to a voltage supply, in this case, a +5 volt voltage supply, via a resistor 116. The variable resistor 112 is also connected to the negative terminal of amplifier 110 via resistor 116. The negative input terminal of amplifier 110 is connected to the output terminal of amplifier 110 via a resistor 18 and capacitor 120 that are coupled in parallel with each other. The output terminal of amplifier 110 is further connected to terminal 98-4 of relay 98 via capacitor 122 and resistor 124. A voltage VTALK is coupled to the capacitor 114 via a resistor 126.

The other terminal PP-2 of paging port VP is coupled to the base of a transistor 128 which controls switching of the relay 98. That is, the transistor 128 has an emitter coupled to ground, a base coupled to ground via resistor 130 and to terminal PP-2 of port PP, and a collector coupled to an activation terminal of relay 98. A diode 132 is coupled across the activation terminals of relay 98, and a voltage source which, in this case, is a +12 voltage supply is coupled to the collector of transistor 128 via diode 132.

As will be described in more detail below, the relay 98 is operable in a first mode in which terminals 98-1 and 98-2 are coupled to terminals 98-3 and 98-5, respectively, and a second mode in which terminals 98-1 and 98-2 are coupled to terminals 984 and 98-6, respectively. In the first mode, the external paging input 102 is coupled to the paging output 100 via terminals 98-1 and 98-3. Conversely, in the second mode, terminal PP-1 of paging port PP is coupled to the paging output terminal 100 via terminals 98-1 and 984, amplifier 110 and its associated resistors and capacitors discussed above so as to provide communication between, for example, a telephone (not shown) coupled to paging port PP and the paging output 100. Also, in the second mode, the +5 volt DC power source coupled to terminal 98-2 is supplied to diode 108 via terminal 98-6 and resistor 106 so as to illuminate diode 108.

As further shown in FIG. 6, administrative port local loop and connector relay 96 includes a double-pull/double-throw type relay 134 having a terminal 134-1 that is coupled to collector of transistor 72 of the ring voltage switch 56 associated with station line S12. Relay 134 further includes a terminal 134-2 that has no connection, and a terminal 134-3 that is coupled to terminal AP-1 of administrative port AP via capacitors 136 and 138 which are coupled in series with each other. The administrative port local loop and connect relay 96 further includes a transistor 140 having a collector coupled to terminal AP-1 of administrative port AP, an emitter coupled to a voltage VTALK via a resistor 142, and a base coupled to ground via a resistor 144 and which is adapted to receive a voltage VTALK via a zener diode 146. The circuit including transistors 140, resistors 142 and 144, and zener diode 146 is similar to the arrangement in ring voltage switch 56.

The administrative port local loop and connect relay 96 further includes a transistor 148 that has a collector coupled to an activation terminal of relay 134 and to a power supply voltage, that is, +12 volts, via a diode 150. The diode 150 is further coupled across the activation terminals of relay 134. The transistor further includes an emitter coupled to ground and a base that receives a signal on LINE ADMIN from controller 200 via a resistor 152.

As discussed in detail below, the LINE ADMIN signal controls the relay 134 to operate in a first mode and a second mode. In a first mode, terminal 134-1 is coupled to terminal 134-2, which is not coupled to any further circuitry. However, in the second mode, the terminal 134-1 is coupled to terminal 1343 which thus couples the terminal AP-1 of administrative port AP to the collector of transistor 72 of ring voltage switch 56 associated with line port S12, thereby establishing communication between line port S12 and administrative port AP.

Additionally, the jumper arrangement J4 shown in FIG. 6 can be coupled to the relay contact terminals J5 (FIG. 9), so that a DC voltage signal can be provided to the ring voltage switch 56 associated with station line port S12 via relay 183 (FIG. 9) under the control of a signal provided on line RELAY CNTL by controller 200 (FIG. 10) when the controller 200 receives a signal from the automated attendant that a caller has left a message for station 12. The relay 56 of ring voltage switch 56 provides that DC signal to the telephone at station S12 to thereby light a "message" light of that telephone when that telephone is on-hook.

As illustrated in FIG. 1, the apparatus 30 further includes a busy signal circuit 154 that is capable of providing a busy tone to any of the signal line ports S1–S12 and any of the trunk line ports T1–T8 as controlled by the controller 200 of the apparatus 30 in the manner discussed in detail below. As shown in detail in FIG. 7, the busy signal circuit 154 includes a plurality of switches 156 which are each associated with one of the station line ports S1–S12 and coupled to their respective station line ports S1–S12 via the respective ring voltage switch 56 associated with that particular line port as illustrated, for example, in FIG. 2.

Figure 7B:
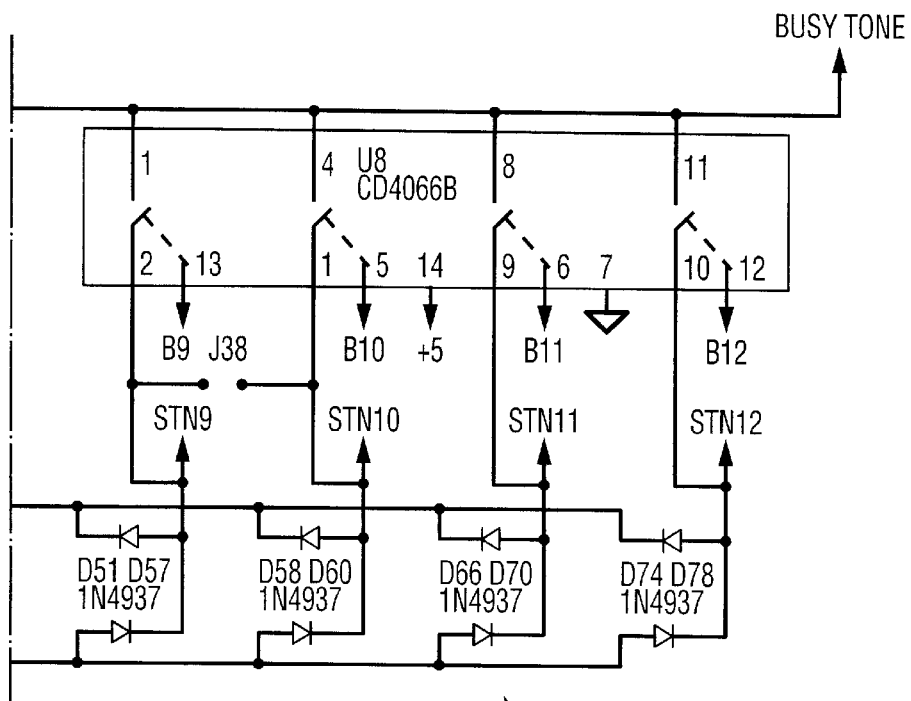
FIG. 7 is a schematic diagram of a busy signal switch used in the apparatus of FIG. 1.

As is now explained with regard to station line port S1 for exemplary purposes, the BUSY TONE signal can be provided to the ring voltage switch 56 via line STN1 as shown in FIG. 7, and subsequently provided to the terminal S1-2 of the station port S1 via relay 66 of ring voltage switch 56 and relay 60 of failsafe bypass relay 54. Specifically, as discussed below, switch 156 would receive a signal from the controller 200 via line B1 which would cause the switch 156 to close so as to provide the BUSY TONE signal to line STN1. The BUSY TONE signal can be then provided to the station port S1 or the trunk line port T1, as appropriate.

Figure 8:
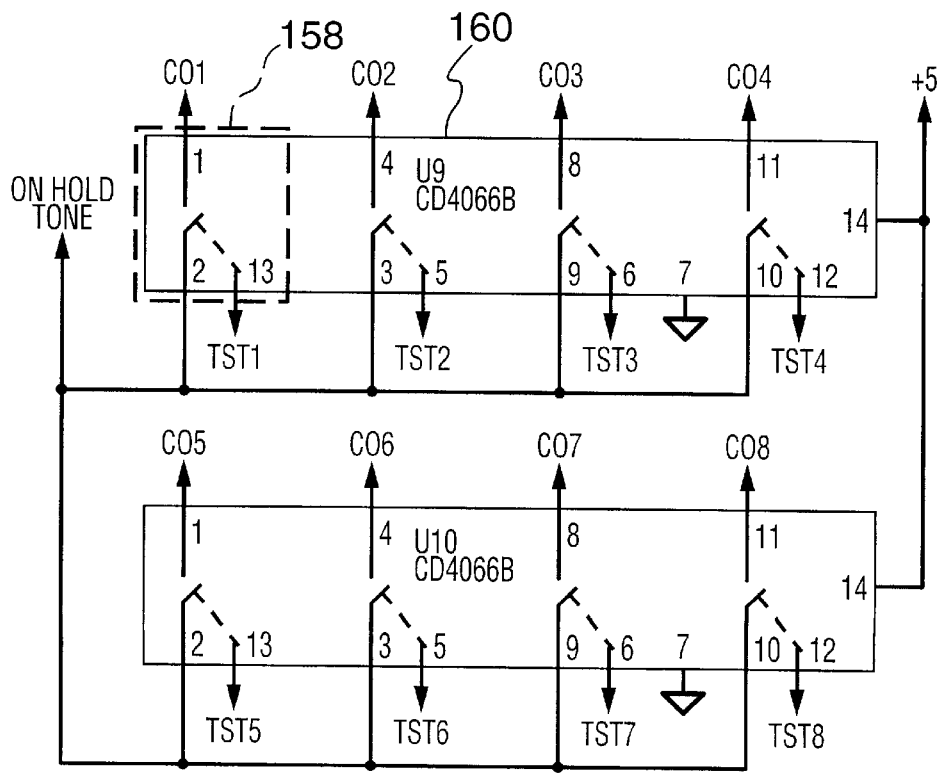
FIG. 8 is a schematic diagram of the on-hold signal switches used in the apparatus shown in FIG. 1.
Figure 9A:
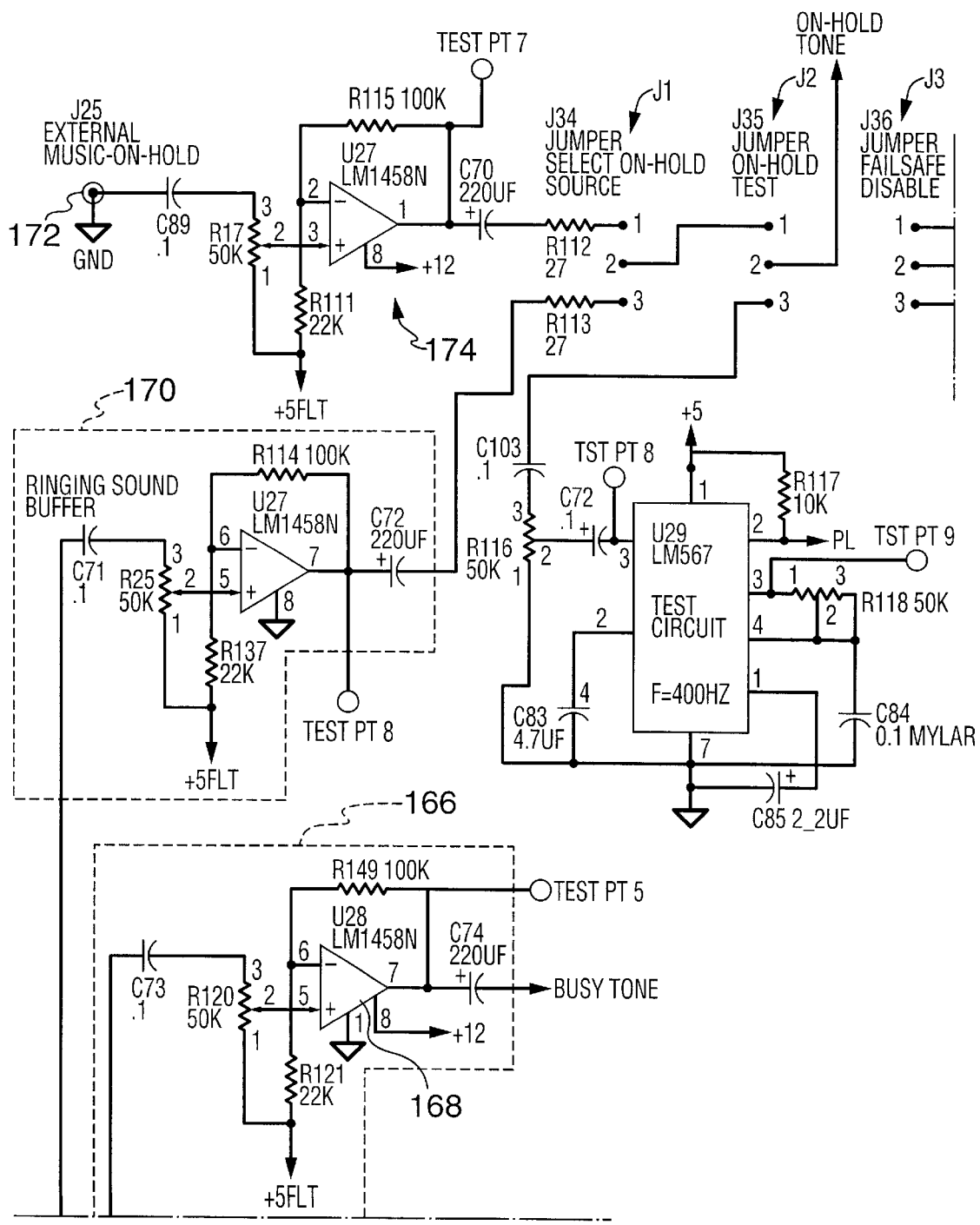
FIG. 9 is a schematic diagram of the on-hold, busy and ring signal generating circuit used in the apparatus shown in FIG. 1.
Figure 9B:
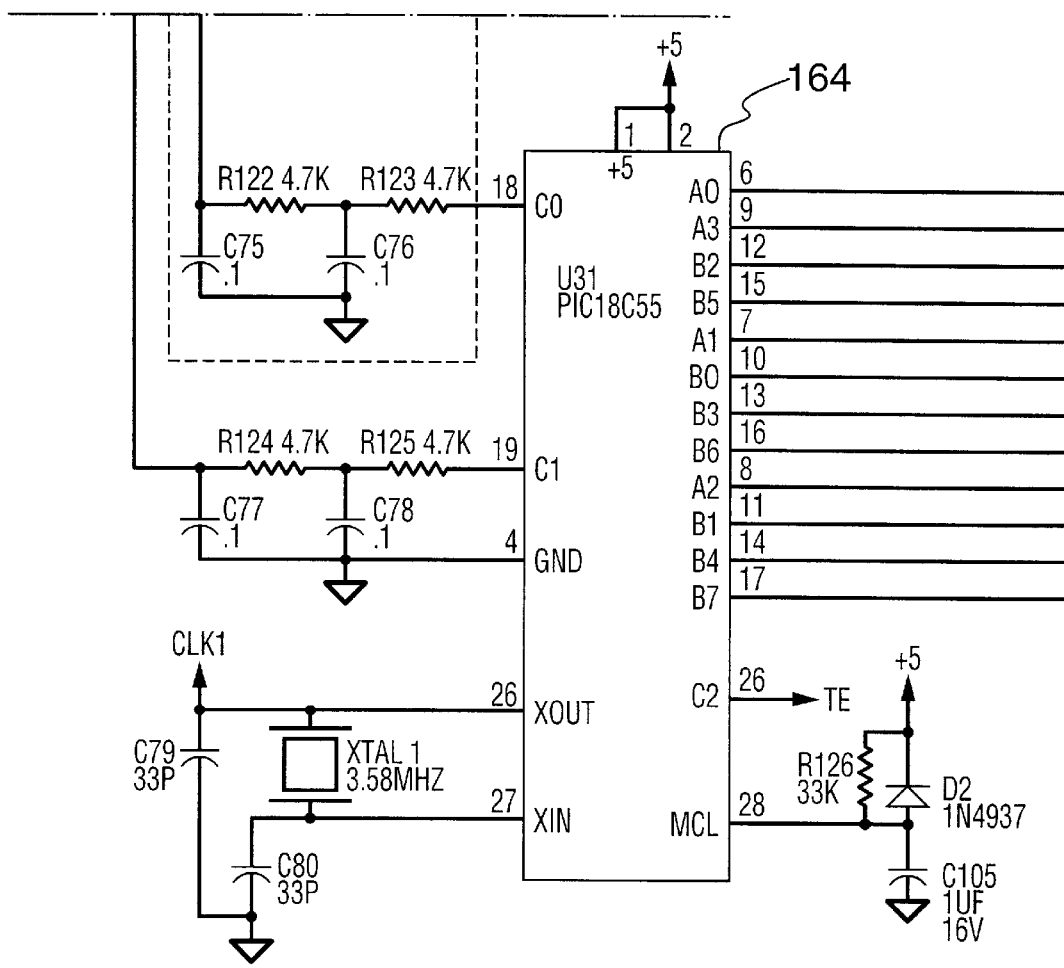
Figure 9C:
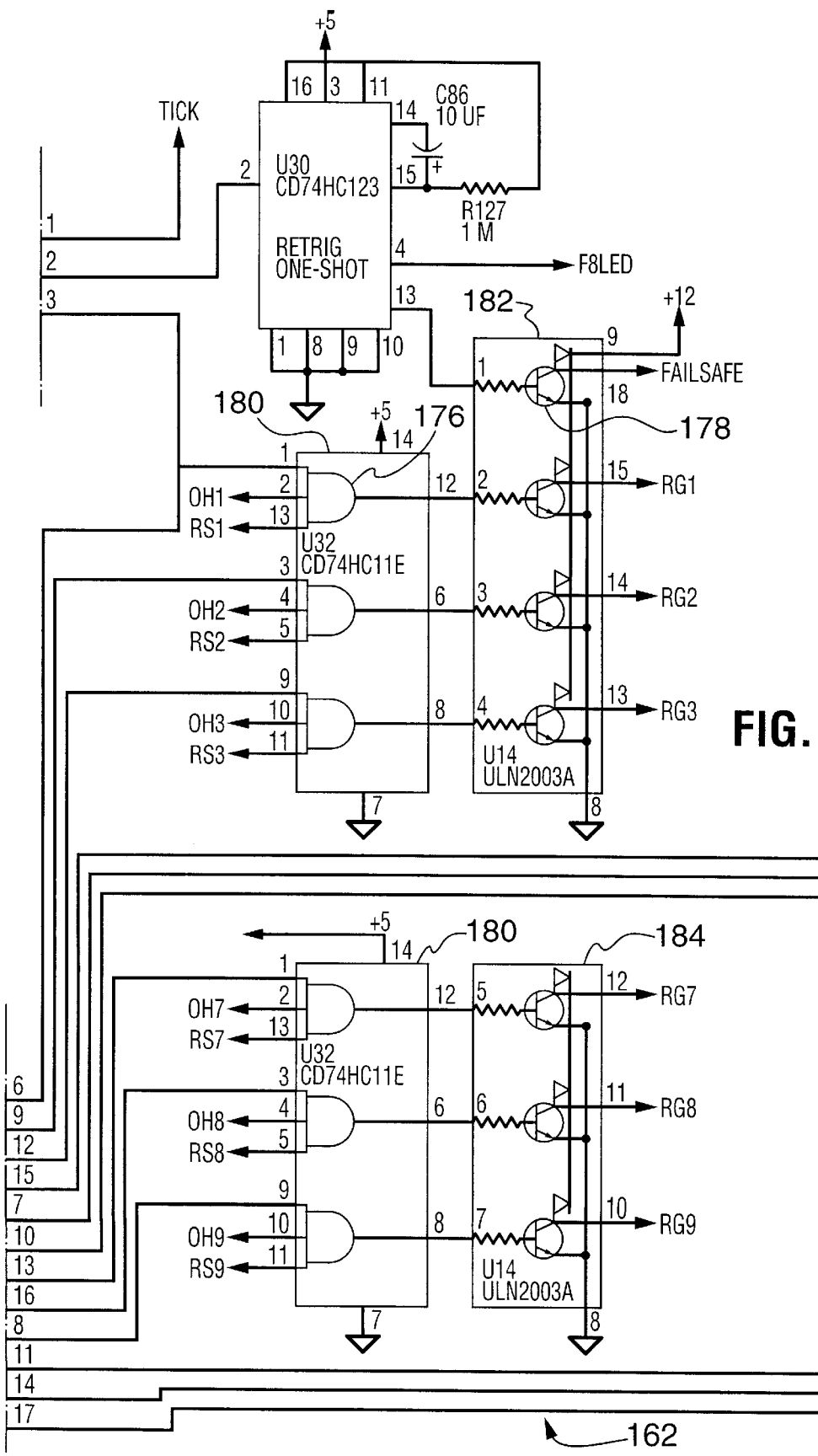
Figure 9D:
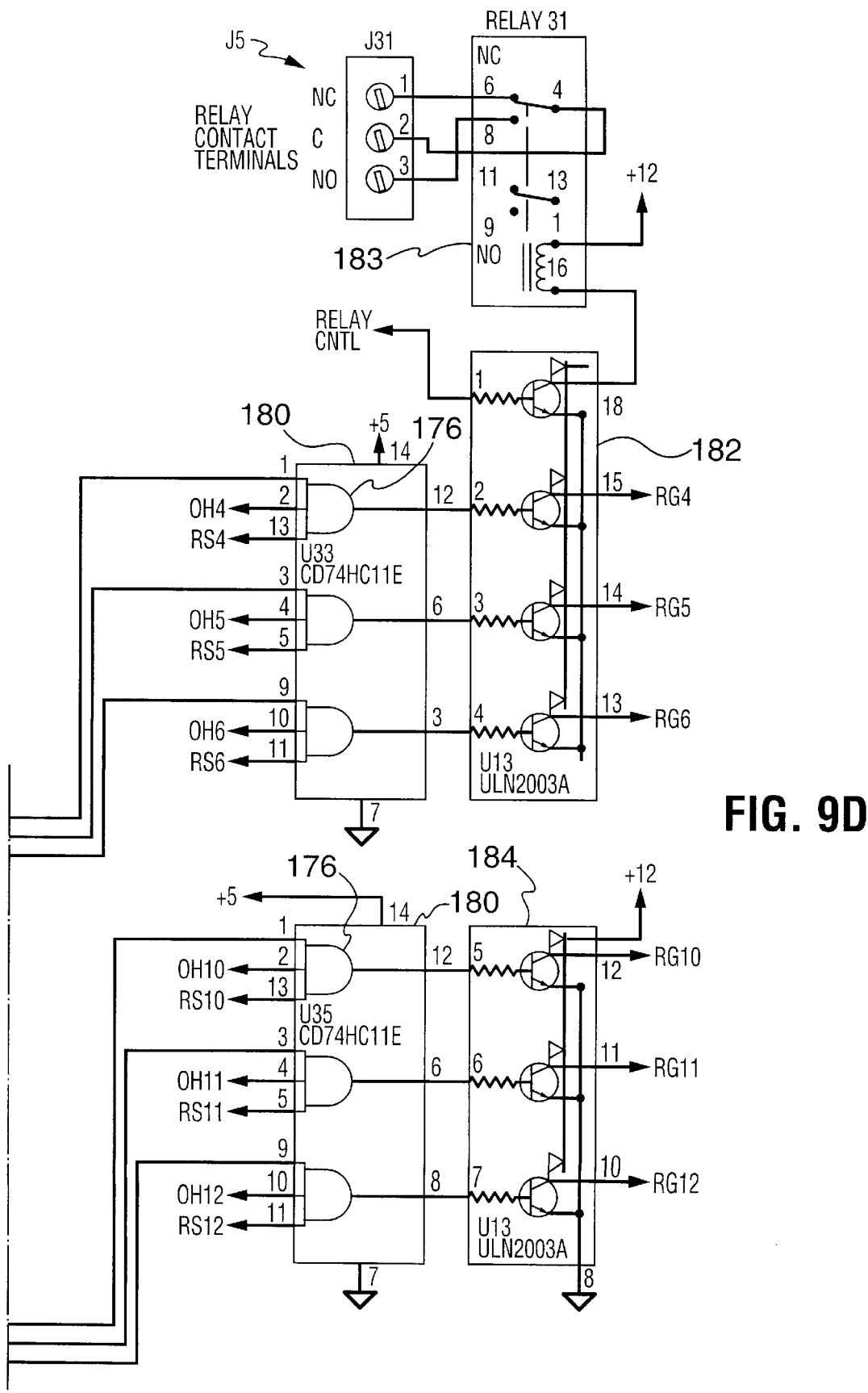
Figure 10A:
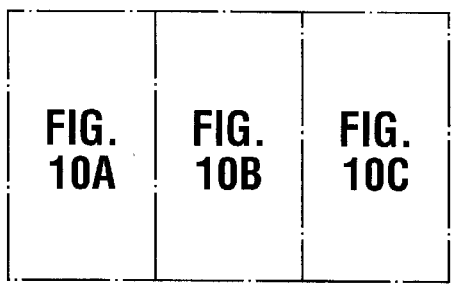
FIG. 10 is a schematic diagram of the controller used in the apparatus shown in FIG. 1.
Figure 10A:
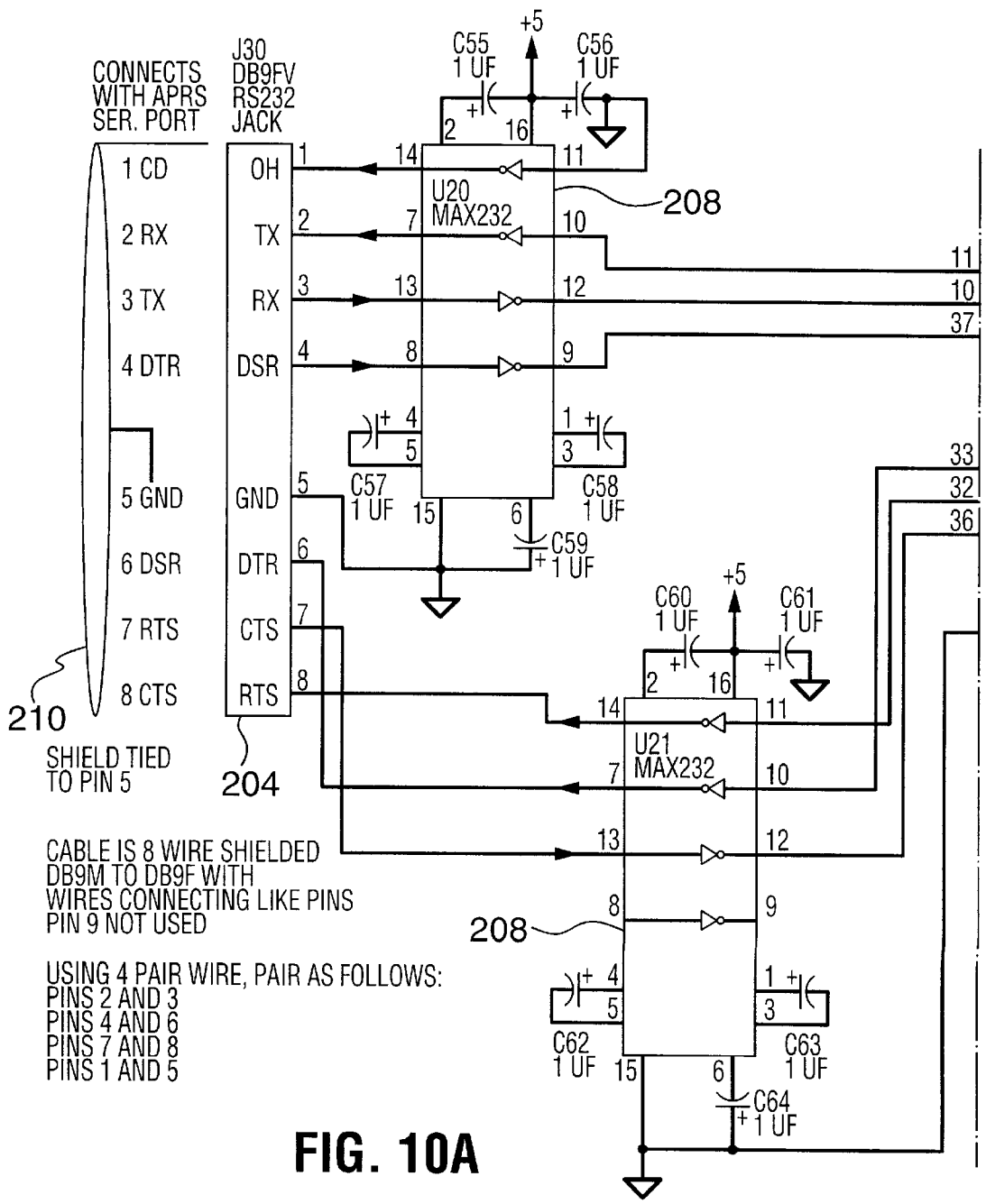
Figure 10B:
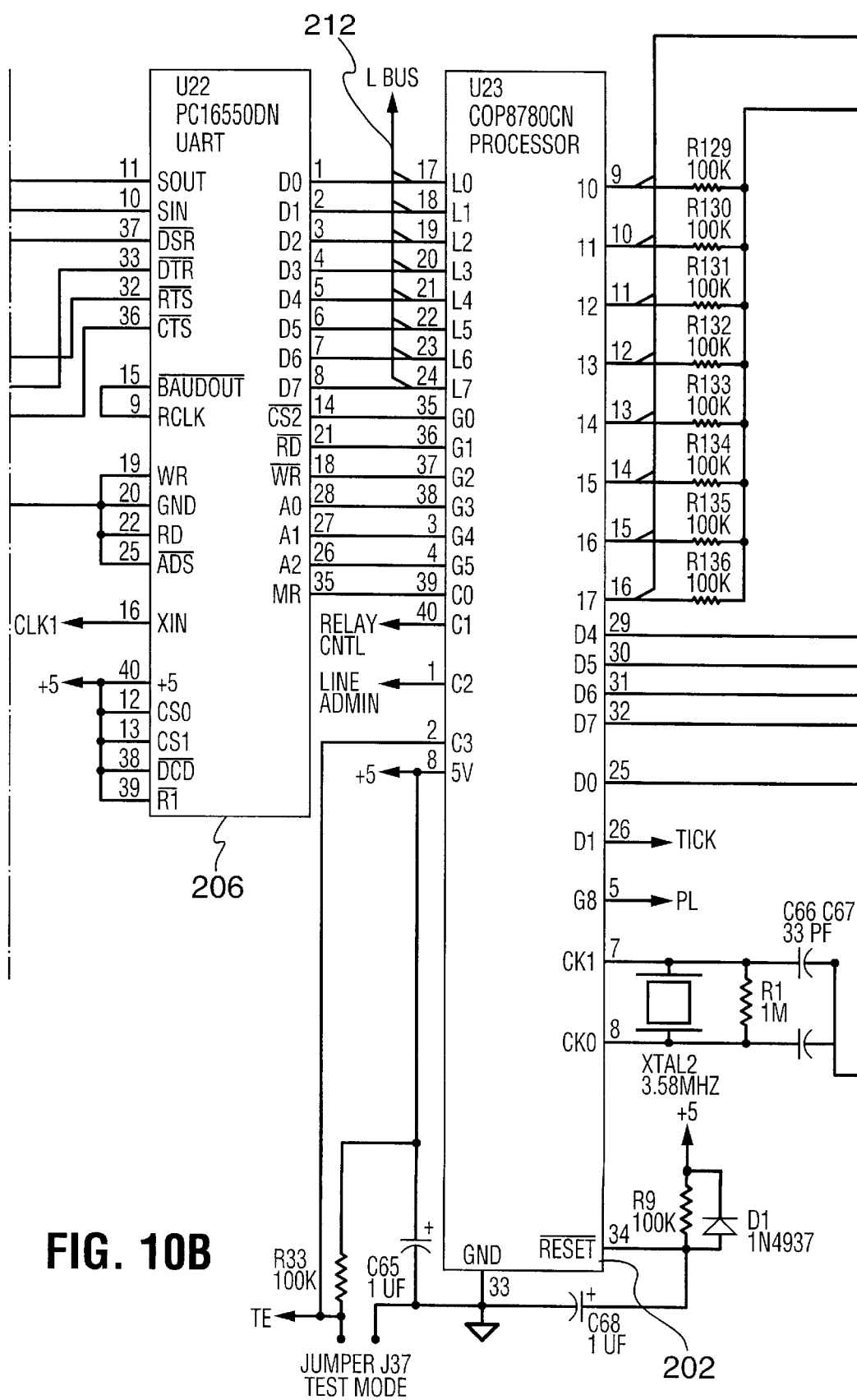
Figure 10C:
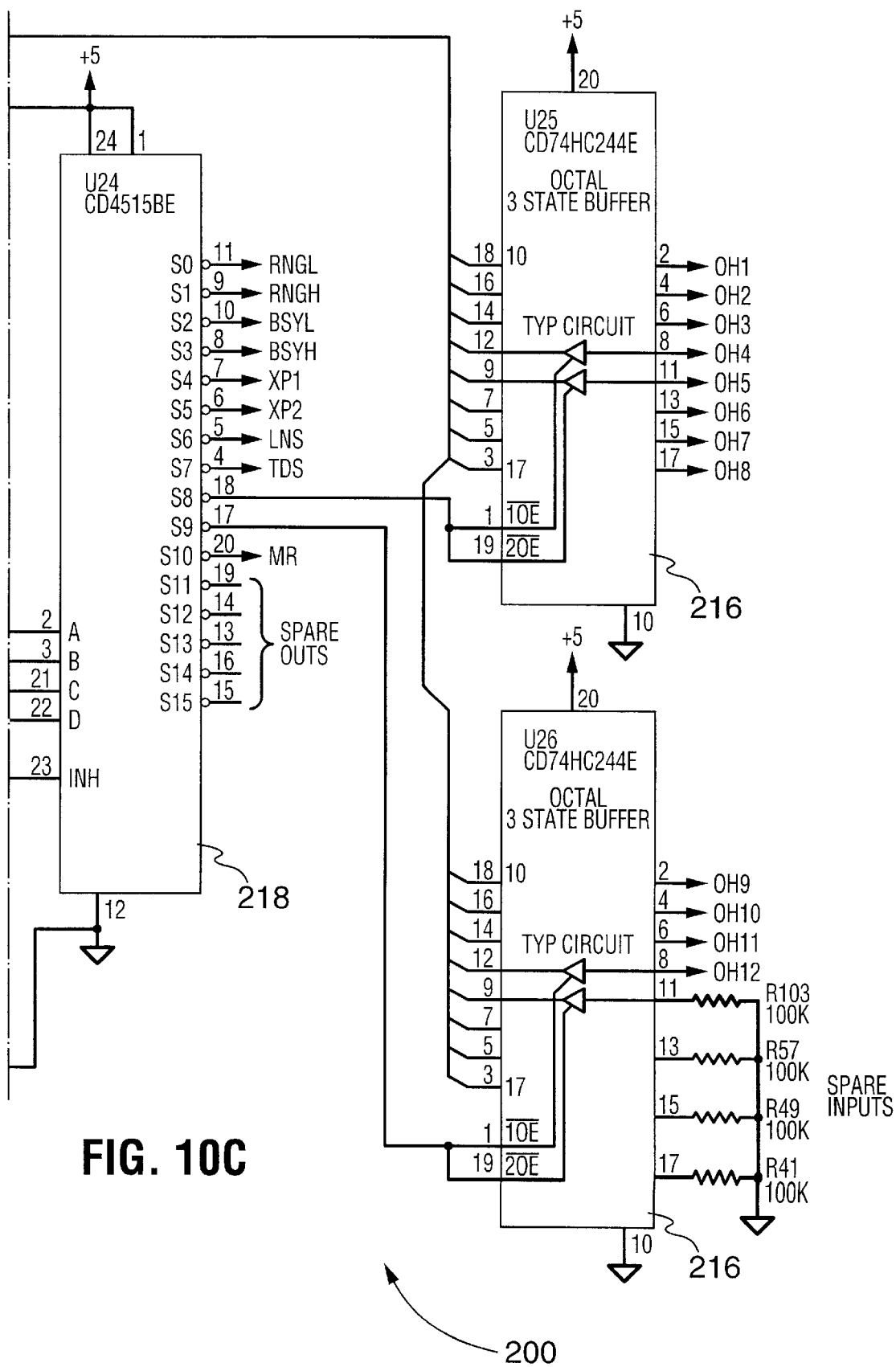

As further shown in FIG. 1, the apparatus 30 includes a plurality of on-hold signal switches 158 which, as discussed in detail below, provide an ON-HOLD TONE signal to any of the respective lines L1–L8. That is, as shown in FIG. 8, four on-hold signal switches 158 are constituted by a switch circuit 160, and two switch circuits 160 are present in the apparatus 30. Each of the on-hold signal switches 158 operate in essentially an identical manner. For example, the on-hold signal switch 158 associated with trunk line port T1 (and thus line L1) is controlled via a control signal provided on line TST1 by the controller 200 as described in detail below. Thus, the ON-HOLD TONE signal can be provided to line L1 via line CO1 and the coupling transformer 40 of phone line loop isolation circuit 32, as shown, for example, in FIG. 2.

The apparatus 30 further includes a signal generator circuit 162 that is capable of generating the BUSY TONE signal that is provided to busy signal circuit 154, ring signals RG1–RG12 that are provided to ring voltage switches 56 associated with lines S1–S12, respectively, and the ON-HOLD TONE that is provided to the lines L1–L8 via the on-hold signal switches 158. Specifically, as shown in FIG. 9, the signal generating circuit 162 includes a signal processing unit 164 that operates in accordance with a clock signal CLK1 which is provided from the controller 200 of the apparatus 30.

The signal processing unit 164 provides a signal at an output C0 that is input to an amplifier circuit 166 which includes an operational amplifier 168 and a plurality of capacitors and resistors. The amplifier circuit 166 thus operates to provide the BUSY TONE signal to busy signal circuit 154.

The signal processing unit further operates to provide a signal at terminal C1 to an amplifier circuit 170 whose output (i.e., a ringing signal) can be alternately coupled via jumpers J1 and J2 to act as the ON-HOLD TONE that is provided to trunk line ports T1–T8 as discussed in detail below. Alternatively, the jumpers J1 and J2 can be configured so that the ON-HOLD TONE is provided from an external source via terminal 172 and amplifier circuit 174.

The signal processing circuit 164 further outputs a plurality of signals at terminals A0 through B7. Those signals are each input to a respective one of a plurality of AND gates 176 whose outputs are coupled to respective transistors 178 which provide ring signals in the manner discussed in detail below on lines RG1–RG12 which are coupled to their collectors respectively. As described in more detail below, the signal processing circuit outputs the signals at terminals A0 through B7 so as to achieve a staggered ring effect. The AND gates 176 are constituted by AND circuit microchips 180 which, in this embodiment, each comprise three AND gates 176. The transistors 178 are constituted by transistor circuits 182 which each comprise four transistors 178, and transistor circuits 184 which each comprise three transistors 178. Of course, the AND gates 176 and transistors 178 are conventional circuits which could be configured in any manner as would be appreciated by one skilled in the art.

As illustrated and described in more detail below, each AND gate receives a signal provided from the signal processing circuit 164, along with a respective on-hook signal provided by a respective on-hook detector 58 on a respective line OH1–OH12 and a respective signal provided at a respective line RS1–RS12 by controller 200. Based on the status of those three signals, each AND-gate will control the status of the ring signal output at the collector of its respective transistor 182.

Controller 200 of the apparatus 30 is shown in detail in FIG. 10. The controller 200 includes a processor 202, a serial data communication port 204 and a UART circuit 206. The processor 202 can be any type of programmable microprocessor known in the art, and is programmed to control the circuitry of the apparatus 30 in the manner discussed below. The processor 202 is coupled to the serial data communication port 204 via UART circuit 206 and line level converters 208. In this embodiment, the serial data communication port 204 is an RS232 serial data communication port which can be coupled to the serial port 210 of the automated attendant. Of course, the controller 200 and automated attendant can be configured to transmit data to and from each other via any type of serial or parallel data port connections.

Figure 11B:
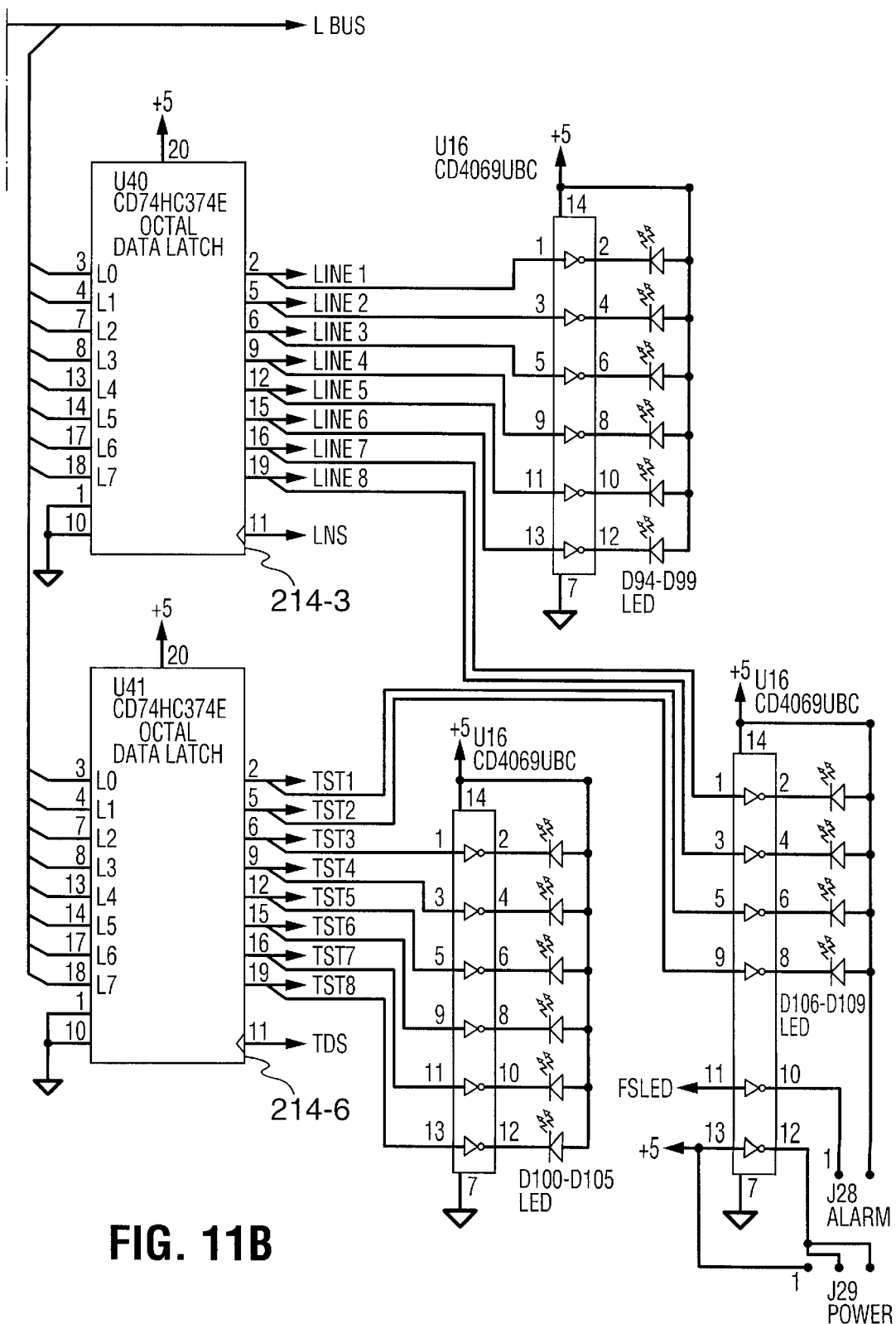
FIG. 11 is a schematic diagram of data latch circuitry used in the apparatus shown in FIG. 1.

As will be described in more detail below, the controller 200 and automated attendant provide data and control signals to each other, while the controller 200 provides control signals to all of the circuitry of apparatus 30 as necessary. Specifically, a plurality of signals are output at terminals L0–L7 of the processor 202 and provided to the respective circuits via a data bus 212 and a plurality of latch circuits 214-1 through 214-6 as shown, for example, in FIG. 11. The microprocessor 202 also receives, via buffer circuits 216, signals from the on-hook detector circuits 58 associated with each of the station line ports S1–S12. The controller 200 further includes a data interface circuit 218 which is coupled to and controlled by the microprocessor 202 to output additional control signals to the circuitry of the apparatus 30 as discussed in detail below.

Figure 12:
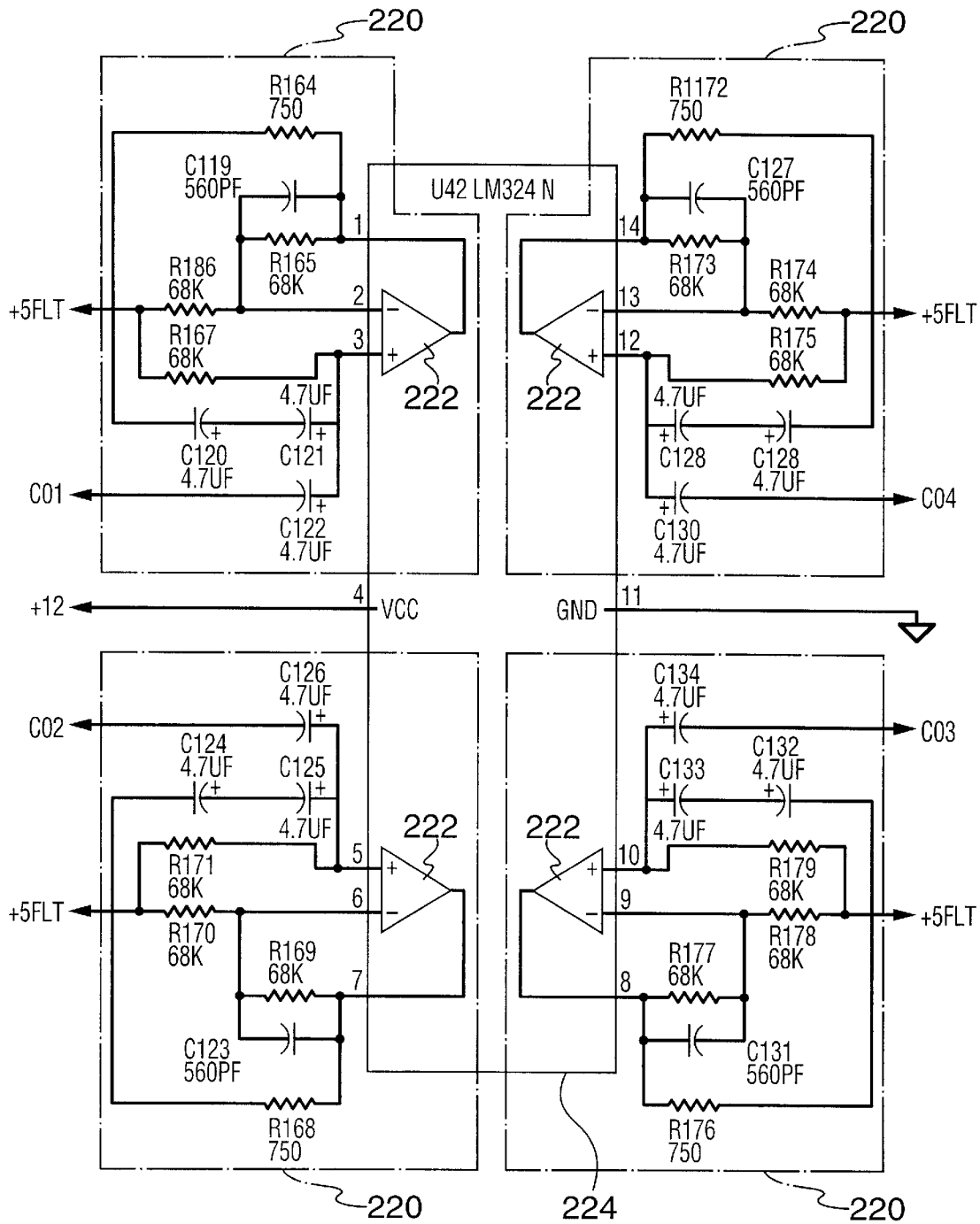
FIG. 12 is a schematic diagram of negative impedance circuits used in the apparatus shown in FIG. 1.

The apparatus 30 further includes negative impedance converter circuits 220, as shown in FIG. 12, which each include an amplifier 222 and a plurality of capacitors and resistors. However, these converter circuits 220 can be arranged in any manner as would be appreciated by one skilled in the art. Each converter circuit 220 is coupled via a respective line CO1–CO8 to a respective one of the coupling transistors 40 of the phone line loop isolation circuits 32 to change the apparent impedance of the load of transformer 40 so as to reduce loss that may be introduced into the lines CO1–CO8 and their corresponding trunk lines L1–L8 by the presence of transformer 40.

Figure 13:
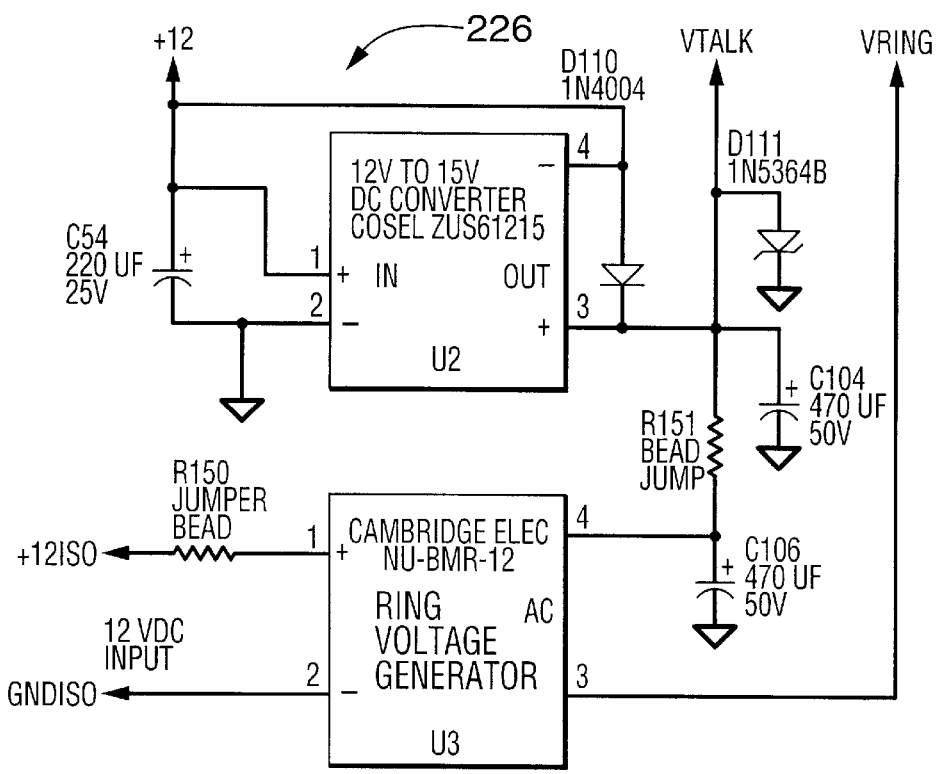
FIG. 13 is a schematic diagram of a voltage generating circuit used in the apparatus shown in FIG. 1.
Figure 14:
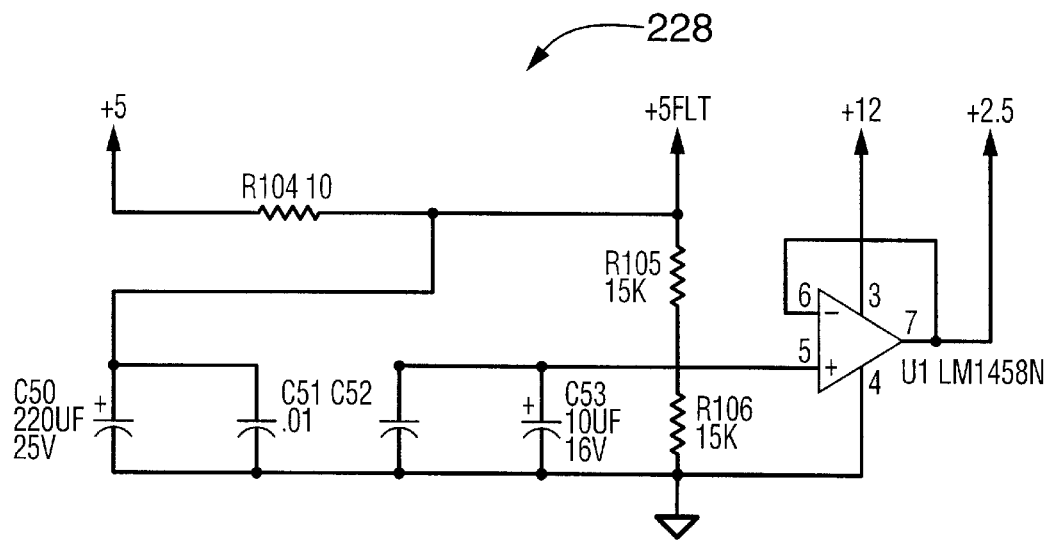
FIG. 14 is a schematic diagram of a voltage circuit used in the apparatus shown in FIG. 1.

Additionally, as shown in FIGS. 13 and 14, the apparatus includes a voltage supply circuit 226 which supplies the voltages VTALK and VRING, and a circuit 228 which supplies +2.5, +5 and +5FLT DC voltages to the various circuitry. Of course, these circuits could be configured in any manner as would be appreciated by one skilled in the art to provide any voltage necessary to enable the apparatus 30 to perform its desired operations.

The operation of the apparatus 30 in conjunction with the automated attendant (not shown) will now be described.

As shown in FIG. 1, the apparatus 30 is coupled to an existing telephone system having trunk lines L1–L8 which were originally coupled to station line ports S1–S8, respectively. However, with the connection of apparatus 30, the lines L1–L8 are placed in communication with the voice ports V1–V8, respectively, of an automated attendant, and with original station lines S1–S8 and additional station lines S9–S12.

Figure 15:
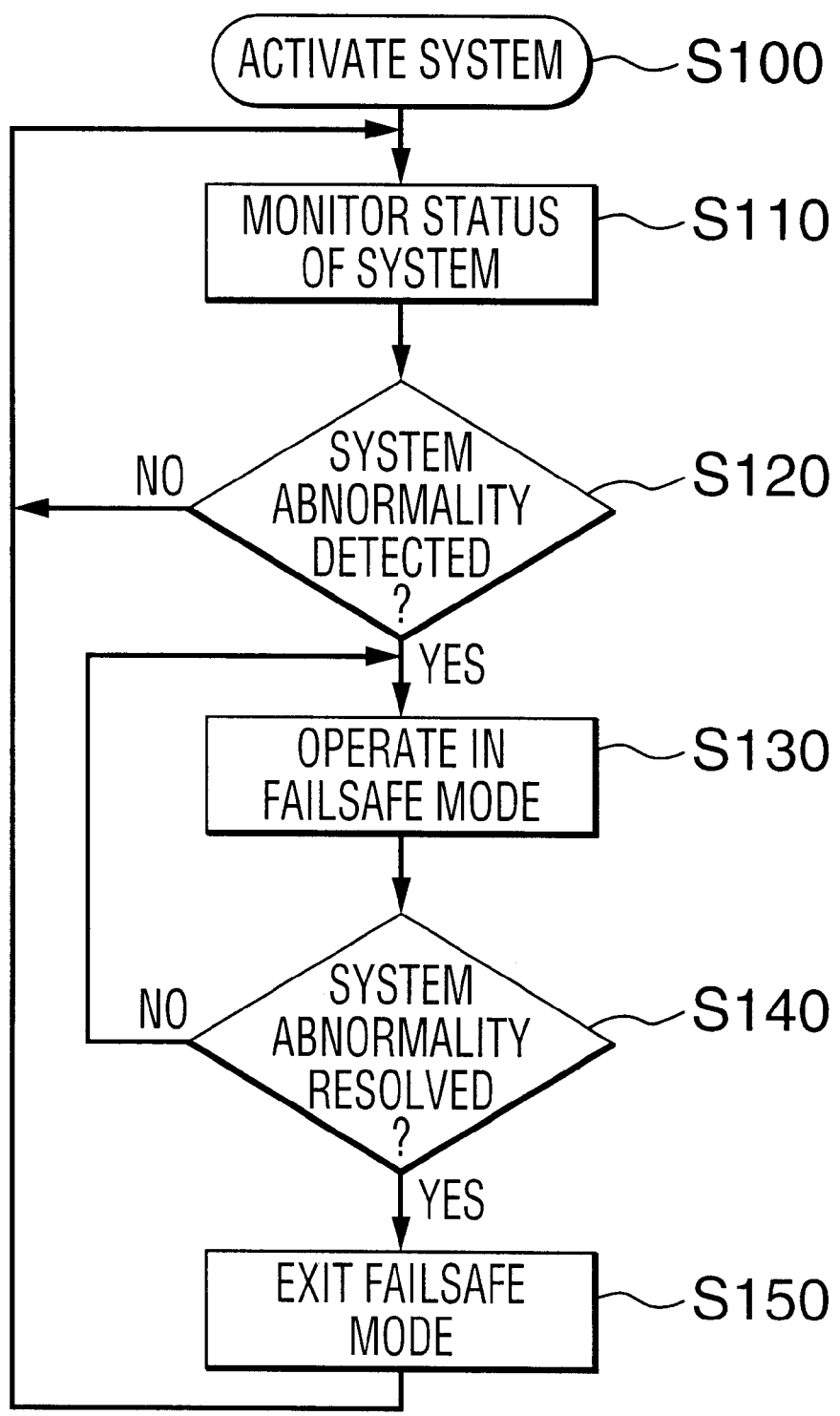
FIG. 15 is a flowchart illustrating a sequence of steps of a failsafe monitoring process performed by the apparatus shown in FIG. 1.

As shown in FIG. 15, the system is activated at step S100. The controller 200 is programmed to continuously monitor the system in step S110 to determine whether the system is operating properly. In particular, the controller 200 is programmed to output a "heartbeat" signal TICK every time it receives data from the automated attendant. Hence, if controller 200 receives data from the automated attendant which the controller 200 will process so as to control the apparatus 30 to perform a certain function, the controller will output a TICK signal. Furthermore, the automated attendant is programmed to output a "null" command to the controller 200 at certain intervals (e.g., every 5 seconds) even during the periods when no instructional data is being transmitted.

The controller 200 is also capable of monitoring the apparatus 30 for an abnormality such as a power loss. As long as the controller 200 receives either actual instructional data or a null command from the automated attendant, and does not sense any abnormality in the apparatus 30, the controller 200 will output a TICK signal. As shown in step S120, the flow of operation returns back to step S110, where the controller 200 monitors the status of the system and the data being received from the automated attendant and continues to output a TICK signal having a certain status (e.g., "high") indicating that the automated attendant and apparatus 30 are operational. It is noted that this monitoring occurs contemporaneously with other processing that is performed in the system and controlled by the controller 200.

As shown in FIG. 9, the TICK signal is provided via a jumper arrangement J3 to a retriggerable one-shot timer 177 which will control a transistor 182 to output a FAILSAFE signal having a certain status (e.g., "high") which is based on the status of the TICK signal. This FAILSAFE signal is received by each of the failsafe bypass relays 54 associated with trunk line ports T1–T8 and system line ports S1–S8 and, depending on its status, will cause the failsafe bypass relays 54 to operate either in the first or second mode.

For example, when the status of the FAILSAFE signal indicates that the apparatus 30 and automated attendant are operating properly, the FAILSAFE signal will cause the failsafe bypass relays to operate in the second mode in which the terminals 60-1 and 60-2 of relay 60 will be connected to terminals 60-5 and 60-6, respectively, thereby coupling the trunk line ports T1–T8 to their respective phone line loop isolation circuits 32 and hence through the apparatus 30. However, if the controller 200 detects an abnormality in the apparatus 30, or if the automated attendant fails to provide a null signal or data signal to the controller 200 within the designated period of time (e.g., 5 seconds), the controller will change the status of the FAILSAFE signal and thus control the apparatus 30 to enter a failsafe mode as shown in step S130.

That is, the controller 200 will output a TICK signal having a certain status (e.g., "low") which, as shown in FIG. 9, will be input to the retriggerable one-shot timer 177 via the jumper arrangement J3. The timer 177 will control the transistor 182 to output the FAILSAFE signal having the failsafe mode status (e.g., "low").

As shown in FIG. 2, the FAILSAFE signal is received by each of the failsafe bypass relays 54 associated with trunk line ports T1–T8 and system line ports S1–S8. The FAILSAFE signal having the failsafe status will thus cause the failsafe bypass relays to enter the first mode of operation in which the terminals 60-1 and 60-2 of relay 60 will be connected to terminals 60-3 and 604, respectively, thereby directly coupling the terminals of trunk line ports T1–T8 to their corresponding terminals of system line ports S1–S8, respectively. In this event, the telephone system will function as if the apparatus 30 and automated attendant were not present.

As shown in step S140 of FIG. 15, the controller 200 will monitor whether the abnormality in the apparatus 30 and/or the automated attendant has been resolved. If the abnormality has not been resolved (e.g., the automated attendant has failed to provide either a data or null signal to the controller 200 or the controller 200 detects an abnormality in the apparatus 30), the controller will continue to control the apparatus 30 to operate in the failsafe mode. However, once the controller determines that the automated attendant and apparatus 30 is again functioning properly, it will control the apparatus 30 to return to the normal operating mode.

In exiting the failsafe mode in step S150, the controller 200 changes the status of the FAILSAFE signal (e.g., the Failsafe signal goes from low to high) so that each of the failsafe relays 54 associated with trunk line ports L1–L8 and station line ports S1–S8 switch from the first mode to the second mode in which terminals 60-1 and 60-2 are coupled to terminals 60-5 and 60-6 of relay 60. In this event, communication is again provided between the trunk line ports T1–T8 and station line ports S1–S12 as controller by the apparatus 30.

The operations of the apparatus 30 and automated attendant that are performed during the normal operation mode (i.e., when a system abnormality has not been detected) are described with reference to FIGS. 16–22 below. Again, it is noted that the process illustrated in FIG. 14 is continuously performed by the controller 200 contemporaneously with the processes described below. In the event that the controller 200 determines that the system must enter the failsafe mode, the failsafe mode is entered notwithstanding the status of the other processes being performed.

Figure 16:
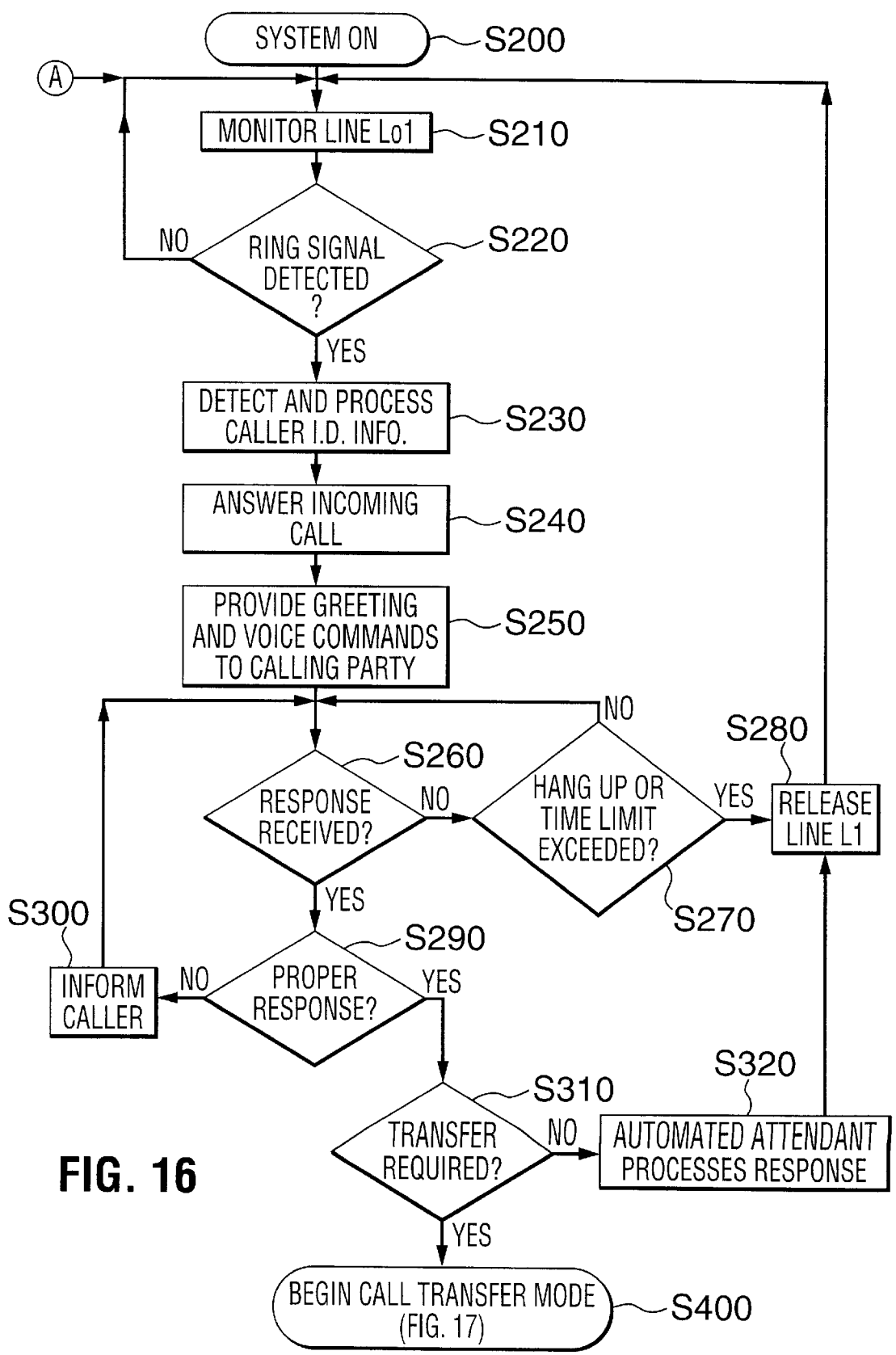
FIG. 16 is a flowchart illustrating a sequence of steps of a call answering process performed by the apparatus shown in FIG. 1.

With the system being activated in step S200 in FIG. 16, the voice ports of the automated attendant will monitor lines L1–L8 in steps S210 and S220 for the presence of a ring signal on any of those lines. As stated above, those lines are directly coupled to the voice ports by trunk line ports T1–T8, respectively, and ports V1–V8, respectively, of the apparatus 30. Because the apparatus 30 and automated attendant will operate in essentially the same manner when a telephone call is being received on any of lines L1–L8, the processing of a call received on trunk line L1 will be described below for exemplary purposes.

When the automated attendant is monitoring the status of a particular trunk line L1–L8 for an incoming call, the automated attendant will provide a signal to the controller 200 of the apparatus 30 which causes the controller 200 to output a switching signal on LINE 1 to the phone line loop isolation circuit 32 associated with that trunk line. The switching signal will have a particular status (e.g., low) which will maintain the relay 34 of the phone line loop isolation circuit 32 in the first mode of operation in which the capacitor 36 is coupled across the terminals 40-1 and 40-2 of the coupling transformer 40 as shown in FIG. 3A.

That is, with regard to trunk line L1, for example, the controller 200 will output a switching signal over line bus 212 that is output by one of the data latches 214-3 (FIG. 11) on LINE 1 as controlled by signal LNS which is also output by the controller 200. This switching signal on LINE 1 controls the transistor 38 which in turn controls the relay 34 of phone line loop isolation circuit 32 to maintain the relay 34 in the first mode where the terminals 34-2 and 34-4 are coupled to terminals 34-5 and 34-6 so that capacitor 36 is coupled as shown in FIG. 3A.

As shown in step S220, if the automated attendant senses a ring signal on trunk line L1, the automated attendant will check for a caller identification (caller ID) signal present on trunk line L1 between the first ring signal and a second ring signal in step S230. If such caller ID information is present, the automated attendant will process that information as appropriate to, for example, display the telephone number of the calling party. The automated attendant will then answer the incoming call upon detection of the second ring signal in step S240.

Upon answering the incoming call, the automated attendant will provide, for example, a greeting to the caller calling in on trunk line L1, and provide various audio prompt information requesting a response by the calling party as shown in step S250. The automated attendant will also indicate that the voice port coupled to trunk line L1 has assumed and off-hook condition. Hence, the voice port will not receive any further calls on trunk line L1 during this time.

As shown in step S260, the automated attendant will then await receipt of a response to the audio commands by the caller. From the time beginning when the automated attendant has answered the incoming call, and continuing while the automated attendant is awaiting receipt of a response to the audio command, the automated attendant will monitor the status of the incoming call as indicated, for example, in step S270 to ascertain whether the caller has hung up.

If the caller has hung up, the automated attendant will release trunk line L1 as shown S280 and allow the voice port to monitor trunk line L1 for another telephone call. If a response is received, however, the automated attendant will analyze that response in step S290.

For example, if the response is an incorrect or unrecognizable response, the automated attendant will inform the caller that the response is improper or unascertainable as shown in step S300. The operation of the automated attendant then returns to step S260 to monitor for another response. If, on the other hand, the response is proper, the automated attendant will handle the response as appropriate.

Specifically, as shown in step S310, if the response is of the type that can be handled by the automated attendant, such as a request by the caller to leave a message or any other type of response which does not require transfer to any station S1–S12 or to an outside line as discussed below, the automated attendant will process the call as indicated in step S320. Upon handling the call, the automated attendant will release trunk line 1 as indicated in step S280 and return to monitoring trunk line 1 for a ring signal as in step S210. It is again noted that the automated attendant can monitor and handle calls coming in on any or all trunk lines L1–L8 simultaneously or in any order in which they are received.

Figure 17:
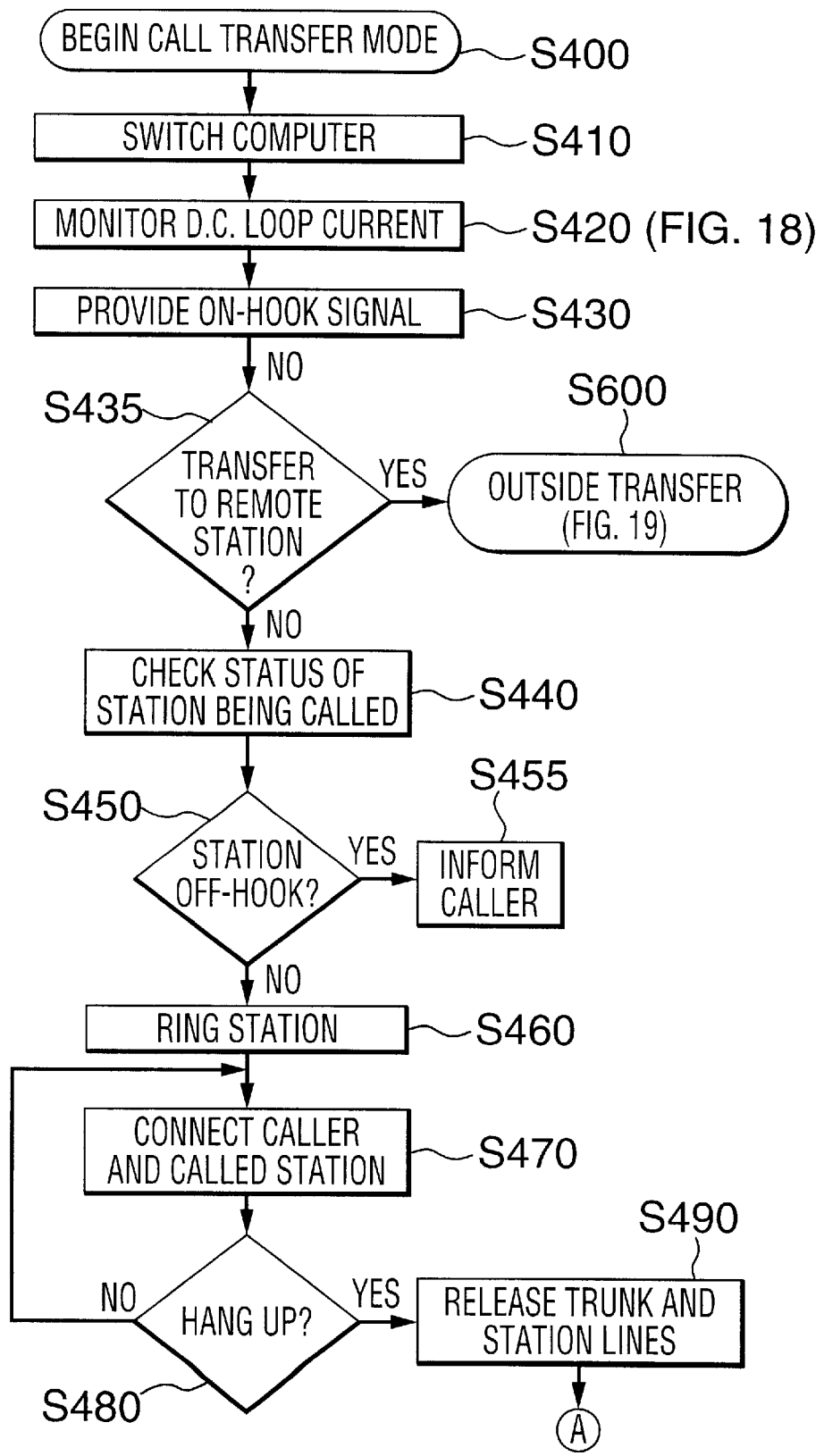
FIG. 17 is a flowchart illustrating a sequence of steps of an exemplary call transferring process performed by the apparatus shown in FIG. 1.

If, however, the automated attendant determines in step S310 that a transfer is desired to a particular station being serviced by station line ports S1–S12, or to an outside line, the automated attendant will enter the call transfer mode as shown in step S400. Specifically, as shown in FIG. 17, upon beginning the caller transfer mode, the automated attendant will provide an instruction signal to the controller 200 of the apparatus 30 in order to place the call on hold. As discussed above, for exemplary purposes, the handling of a call coming in on trunk line L1 is discussed. However, a call coming in on any of the other trunk lines L2–L8 would be handled in a similar manner by the automated attendant and apparatus 30.

As indicated in step S410, the controller 200 will change the status (e.g., from "low" to "high") of the switching signal being provided on LINE 1 to the phone line loop isolation circuit 32 associated with trunk line port T1 in order to shunt capacitor 36 across the terminals V1-1 and V1-2 of voice port terminal V1 as shown in FIG. 3B. That is, the switching signal that is output by the controller 200 over the data bus 212 and through data latch 214-3 as controlled by signal LNS is provided on LINE 1 to the base of transistor 38, which causes relay 34 of the phone line loop isolation circuit 32 to switch from the first mode shown in FIG. 3A to the second mode shown in FIG. 3B.

In the mode shown in FIG. 3B, the AC audio component of the telephone signal being received on trunk line L1 is essentially isolated from the terminals V1-1 and V1-2 of port V1 and hence, essentially isolated from the voice port of the automated attendant that is coupled to terminal V1. However, the AC audio component portion of the telephone signal, however, can pass through the capacitor 36 and be delivered to the switching unit 44 through coupling transformer 40 and over line CO1 as shown in FIG. 2.

Furthermore, because the capacitor 36 causes the DC "loop current" portion of the telephone call being received on trunk line L1 to appear across terminals V1-1 and V1-2 of terminal V1, the voice port of the automated attendant connected to terminal V1 is capable of continuously monitoring that DC portion of the signal during the call transferring operation. That is, in step S420, the automated attendant will perform a DC current monitoring process as shown in detail in FIG. 18.

Specifically, in step S500, the automated attendant will monitor the DC portion of the current continuously. If the DC current is determined to be present in step S510, the monitoring will continue as illustrated. However, if the DC current is not present, then the automated attendant will determine in step S520 that the caller has hung up and will release trunk line L1 as shown in step S530. The operation of the automated attendant with regard to trunk line L1 will then return to step S210 in FIG. 15, and the line will again be monitored for an incoming call.

It is noted that although the process of monitoring the DC current is shown as being performed at step S420 in FIG. 16, that process is performed continuously throughout the call transferring process and continuously while communication is occurring between trunk line L1 and any of the station lines S1–S12 or other the trunk lines L2–L8. If at any time, the automated attendant determines that the caller on trunk line L1 has hung up, the automated attendant will release the calling line L1 and instruct the controller 200 to cause the apparatus 30 to release the particular called line S1–S12. If the called line is another one of the lines L2–L8, the automated attendant will release that line as well.

Returning now to the process shown in FIG. 17, in step S430, the controller 200 will provide a control signal having a particular status (e.g., "high") over bus 212, which is output through latch 214-6 on line TST1 as controlled by signal TDS also provided by the controller 200. That signal is provided over line TST1 from latch 214-6 to the on-hold signal switch 158 associated with line CO1 and hence, trunk line port T1 as shown in FIG. 8. That signal on line TST1 will activate the switch 158 associated with line CO1 and provide the ON-HOLD TONE signal overline CO1. The ON-HOLD TONE signal will then be transmitted through the coupling transformer 40 and to the terminal T1-2 of terminal T1, and hence, out trunk line L1 to the caller. Therefore, the caller will receive this ON-HOLD tone signal as the transferring process is occurring.

As shown in FIG. 9, the jumper arrangement J1 and J2 are set to provide either external music input at terminal 172 as the ON-HOLD TONE signal, or a ringing signal provided from ringing sound buffer 170. That is, if the terminals 1 and 2 of jumper J1 and terminals 1 and 2 jumper J2 are coupled together, the external music will be provided as the ON-HOLD TONE signal. However, if the jumpers 2 and 3 of jumper J1 are coupled together while the jumpers 1 and 2 of jumper J2 are coupled together, the ringing sound provided by ringing sound buffer 170 will be provided as the ON-HOLD TONE signal.

Alternatively, the operation which places the caller on hold can be performed exclusively by the automated attendant. In this event, the automated attendant does not send a signal to controller 200 indicating that the above process for placing a caller on hold is to be performed by the apparatus 30. Hence, steps S410–S430 shown in FIG. 17 are not performed.

Rather, the caller is placed on hold by the automated attendant while the transferring process is being performed. Also, the switching of capacitor 36 as shown in FIG. 3B does not occur, so the capacitor 36 remains coupled as shown in FIG. 3A. Hence, the voice port of the automated attendant that is coupled to line L1 will continue to receive both the AC audio signal portion and the DC loop current portion of the incoming telephone signal.

Figure 19:
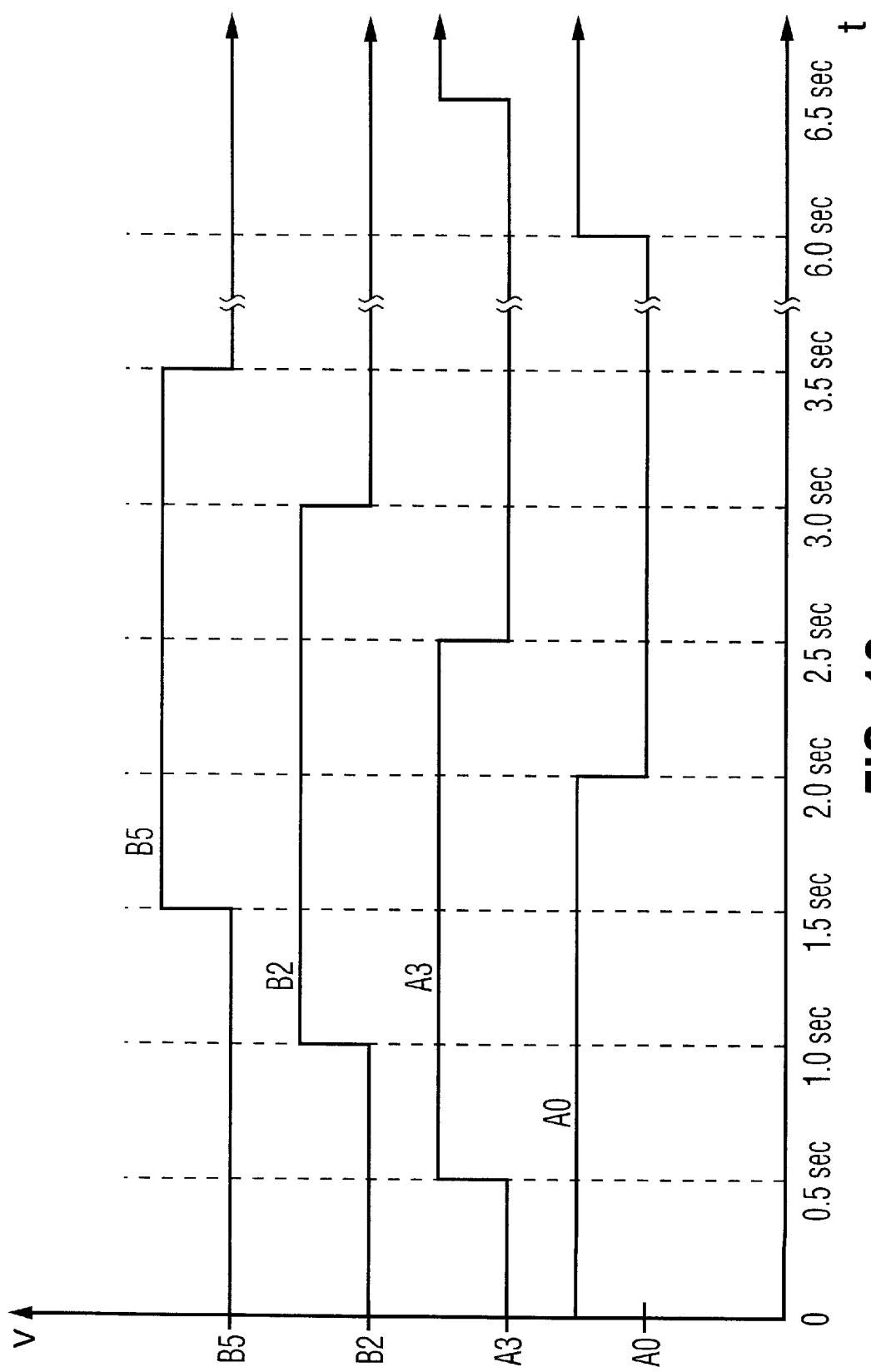
FIG. 19 is a timeline diagram showing an example of the staggered ring process for ringing the station phones.
Figure 20:
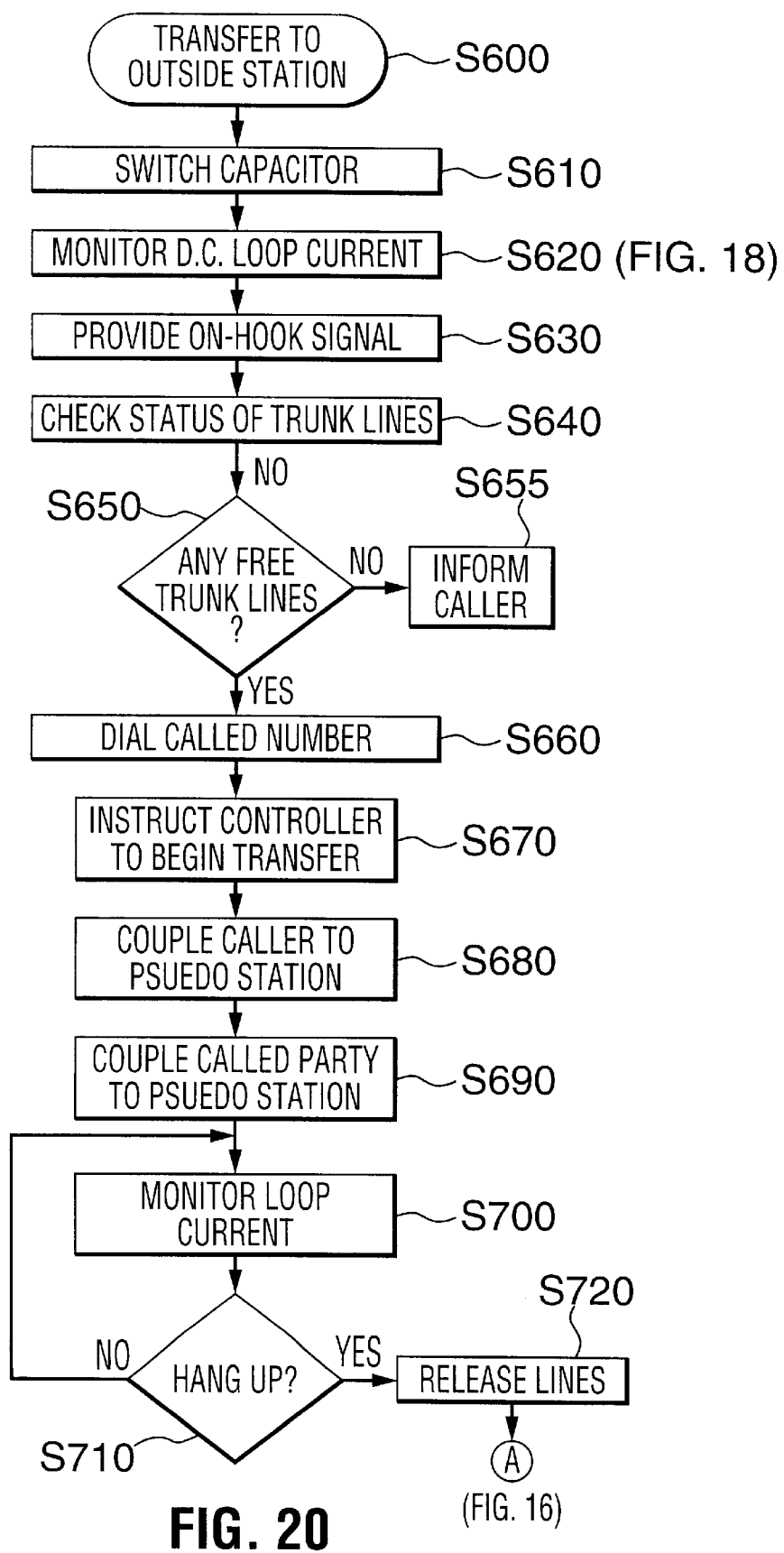
FIG. 20 is a flowchart illustrating a sequence of steps of a trunk conferencing process performed by the apparatus shown in FIG. 1.

Returning again to FIG. 17, step S435 is performed to determine whether the caller wishes to connect to any of stations 1–12 being handled by station line ports S1–S12, or whether the caller wishes to connect to a remote station (i.e., via another trunk line). If the caller wishes to connect to a remote station, the process shown in FIG. 19 is performed.

However, if the caller wishes to connect to any of stations 1–12, the step S440 is performed in which the status of the station line which is connected to the station to be called is checked. That is, the controller 200 will receive over lines OH1–OH12 on-hook signals from stations 1–12, respectively, indicating whether a particular station is on or off-hook.

For example, assuming that the caller on trunk line L1 wishes to have the call connected with station 1 which is coupled to station line port S1, the controller 200 will check the status of signal OH1 provided by the on-hook detector 58 (FIG. 2) associated with station line port S1. The on-hook detector 58 outputs an on-hook signal having a particular status (e.g., "high") on line OH1 when the telephone being serviced by station line port S1 is on-hook, and provides an on-hook signal OH1 having a different status (e.g., "low") when the phone is off-hook.

If the controller determines in step S450 that the station being called is off-hook, the caller calling on trunk line L1 will be informed of this in step S455 either via a busy signal or a message provided by the automated attendant. For example, if the controller 200 determines that the phone at station S1 is off-hook, the controller will provide a signal having a particular status (e.g., "high") over data bus 212, which is thus transmitted on line B1 by data latch 214-2 as controlled by signal BSYL which is also provided by the controller 200. The signal is transmitted on line B1 to the busy signal switch 156 associated with line STN1 as shown in FIG. 7. Of course, if the caller chose to be connected to any of stations 9–12, which are serviced by station line ports S9–S12, and the called station was off-hook, the signal would be output by latch 214-5 over the appropriate one of lines B9–B12 as controlled by signal BSYH provided by the controller 200.

The signal on line B1 will cause the switch 154 to provide the BUSY TONE signal to line STN1 which, as shown in FIG. 4, is provided to the XO terminal of switch 46 of the switching network 44. The controller also provides a signal via bus 212 to switching network 44 which causes the switching network to couple line STN1 to line CO1. Therefore, the BUSY TONE signal will be provided from line STN1, through switch 46 to line CO1, and subsequently through the coupling transformer 40 of phone line loop isolation circuit 32 associated with trunk line port T1 where it is sent over trunk line L1 to the caller.

The system can also be configured to take appropriate action in the event of a busy station. For example, the capacitor 36 can be controlled to switch back to the position shown in FIG. 3A, and the voice port of the automated attendant can provide an audio prompt message to the caller which, for example, could give the caller an opportunity to leave a message or transfer to another telephone station or outside telephone (e.g., the processing can return to step S260 in FIG. 15 where the automated attendant will wait to receive another response from the caller).

In the event that the controller 200 determines in step S450 that the station serviced by station line port S1 is not off-hook, the telephone at the called station (station 1) is rung in step S460. To do this, the controller provides a control signal over bus 212 having a particular status (e.g., "high"). That signal is transmitted to line RS1 via latch 214-1 as controlled in accordance with signal RNGL which is also provided by the controller 200. Of course, if the caller chose to be connected to any of stations 9–12 which are serviced by station line ports S9–S12, the signal would be output over the appropriate one of lines RS9–RS12 by data latch 214-4 as controlled by signal RNGH provided by the controller 200.

Presuming that the caller on trunk line L1 selected station 1 which is serviced by station line port S1, the signal will be provided over line RS1 to the AND-gate 178 of the signal generator 162 (FIG. 9) that is associated with station line port S1. The on-hook signal provided on line OH1 as discussed above is also input to an input terminal of that particular AND-gate 178.

Hence, if the signals being provided on lines OH1 and RS1 have the appropriate status indicating that the phone serviced by station line port S1 is on-hook and is to be rung, the signals provided by signal processor 164 to a third input terminal of the AND-gate 178 will cause the AND-gate 178 to control transistor 182 to output a ring signal having a particular status (e.g., "high") over line RG1 to the ring voltage switch 56 associated with station line port S1 (see FIG. 2). The ring voltage signal on line RG1 will cause the relay 66 to switch to its second mode in which terminals 66-4 and 66-5 are coupled to terminal 66-1 and 66-2, respectively. In this event, the ring voltage VRING is provided to the phone connected to station line S1 via failsafe bypass relay 54 (assuming that the system is operating in the normal mode and not in the failsafe mode) and the telephone at station 1 rings.

It is noted that the signal processor 164 is a programmable device that is programmed to provide the signals at its output terminals A0–B7 at different time intervals in a "staggered" fashion if a plurality of telephones are to be rung at a particular time. This is done so that the voltage supply circuit 226 need not be capable of providing a current large enough to ring all 12 station phones at once. Hence, the cost of the ring voltage generator of the voltage supply circuit 226 can be reduced, because it can be of the type which provides current sufficient to ring, for example, only five telephones.

In order to perform this staggered ring process, the signal processor 164 will output the signals at its terminals A0–B7 to control the ringing of each telephone in a six second ring cycle during which the phone is rung for two seconds and is silent for four seconds. Accordingly, the signal output at terminal A0 will control the AND gate so that the ring signal provided over line RG1 to the ring voltage switch 56 associated with station line port S1 causes the ring voltage VRING to be provided to the telephone serviced by station line port S1 for two seconds during each six second ring cycle.

If, for example, a plurality of phones are to be rung at the same time, the signals output at the appropriate terminals A0 through B7 will be output in a staggered fashion as shown in the timeline of FIG. 19. That is, assuming that the telephones at stations 1–4 are to be rung at the same time, the signal processor 164 will provide the signal at output A0 to effect the ringing of the phone at station 1 in the manner described above for two seconds beginning at time t0. Then, the processor will provide a signal at output A3 which will lag the signal output at A0 by 0.5 seconds. Hence, the telephone at station 2 will begin ringing 0.5 seconds later than the telephone at station 1 has begun ringing, and will continue to ring 0.5 seconds after the telephone at station 1 has become silent for that six second ring cycle. Of course, a telephone will stop ringing when it is answered.

The signal processor 164 will then output a signal at terminal B2 like those output at terminals A0 and A3 but which will lag the signal output at terminal A3 by 0.5 seconds and hence lag the signal output at terminal A0 by one second. Accordingly, the telephone at station 3 will not begin to ring until the telephone at station 1 has been ringing for one second and the telephone at station 2 has been ringing for 0.5 seconds. The signal processor 164 will then output a signal at output B5 which lags the signal provided at output A0 by 1.5 seconds (and thus lags the signal at output A3 by one second and the signal at output B2 by 0.5 seconds). Accordingly, the telephone at station 4 will not begin to ring until the telephone at station 1 has been ringing for 1.5 seconds, the telephone at station 2 has been ringing for 1 second, and the telephone at station 3 has been ringing for 0.5 seconds.

If five phones are rung at once, four phones are rung in the manner described above, and the fifth phone is controlled to ring two seconds after the first phone has begun ringing. As stated above, because each ringing period during a ring cycle lasts for only two seconds, the first phone being rung will stop ringing at the time the fifth phone begins to ring. Also, the fifth phone will have stopped ringing for two seconds before the first phone is signaled to ring again.

As demonstrated above, only four telephones are being rung by the voltage VRING at any given moment. Hence, the voltage supply circuit 226 need only provide a current sufficient to ring four telephones. Of course, the signal processing circuit 164 can be configured to be compatible with any type of voltage supply circuit that provides a ring voltage VRING to ring the telephones serviced by the station line ports S1–S12. The voltage supply circuit can be of the type which will provide current sufficient to ring any practical number of telephones (e.g., 6, 8, etc.) at one time.

Turning back to the flowchart shown in FIG. 17, when the person at station 1 answers the telephone, communication is thus established between station 1 and the caller on trunk line L1 in step S470. Specifically, when the person at station 1 answers the telephone, the on-hook signal generator 58 will generate on line OH1 an on-hook signal having a different status (e.g., "low") indicating that the phone is now off the hook. This change in status will cause AND-gate 178 of the signal generator circuit 162 shown in FIG. 9 to cause the transistor 182 to provide a ring signal having a different status (e.g., low) on line RG1, which causes the ring voltage switch 56 to return to the first mode. As described above, in this first mode, the station line STN1 is coupled to the station line port S1 via terminals 66-3 and 66-1 of relay 66, and failsafe bypass relay 54.

Accordingly, because the switch 44 is being controlled by the controller 200 to couple line CO1 to line STN1, communication is established between station 1 and the caller on trunk line L1 through station line port S1, failsafe bypass relay 54, ring voltage switch 56, switching network 44, and phone line loop isolation circuit 32. As stated above, the automated attendant will continue to monitor the DC portion of the telephone signal being received on trunk line L1 as set forth in the process shown in FIG. 18, while the controller 200 will continue to monitor the status of the on-hook signal being provided on line OH1 which is associated with station line port S1.

If either the automated attendant or controller 200 determines that either party has hung up in step S480, the automated attendant and controller will release their respective lines in steps S490. That is, the voice port of the automated attendant connected to terminal V1 which is coupled to line L1 via trunk line port T1 will assume an on-hook condition, while the controller 200 will allow station 1 serviced by station line port S1 free to receive another call. In doing so, the controller 200 will send a signal having a particular status (e.g., "low") over the data bus 212 that will be output by the data latch 214-3 on line LINE 1 as controlled by signal LNS that is also provided by the controller 200. The signal one LINE 1 will control the transistor 38 of the phone line loop isolation circuit 32 associated with station line port S1 and port V1 to cause the relay 34 to enter the first mode. As a result, the capacitor 36 will again be coupled across terminals 40-1 and 40-2 of the coupling transformer 40, as shown in FIG. 3A, so that the voice port of the automated attendant attached to terminals V1-1 and V1-2 of terminal V1 will be free to receive both the AC and DC portion of any signal incoming on trunk line L1. Hence, the process can return to step S210 in FIG. 16.

As stated, the process described above is performed essentially identically for calls coming in on any of lines L1–L8. Furthermore, the automated attendant and apparatus 30 is of course capable of handling multiple calls simultaneously. Therefore, if calls come in on more than one of lines L1–L8, or, for that matter, on all of the lines L1–L8 simultaneously, the automated attendant and apparatus 30 is capable of handling all of those calls. In the event that two callers are attempting to transfer to the same station (e.g., station 1), the first caller to request transfer to that station will be transferred to that station (provided that the station is on-hook) in the manner described above, and the second caller will be informed that the station is busy in the manner described above.

As indicated in step S435, the apparatus 30 and automated attendant are capable of routing a call coming in on any of lines L1–L8 back out another of the lines L1–L8 so as to establish communication between two remote sites. This process is shown beginning in step S600 in FIG. 20 with regard to a call being received on trunk line L1. Of course, the apparatus 30 and automated attendant are capable routing a call coming in on any of lines L1–L8 back out over any other of the lines L1–L8 to a remote location by performing a similar process.

Specifically, in step S610, the call incoming on line L1 is answered by the voice port of the automated attendant, and the calling party is placed on hold in the manner discussed above (e.g., steps S610 to S630 which essentially correspond to steps S510 to S530). Of course, as discussed above, the automated attendant can handle the on-hold process without invoking the assistance of the apparatus 30 as discussed above.

In step S640, the automated attendant determines which, if any, of the other lines L2–L8 are available. The automated attendant can be programmed to check the status of lines L2–L8 in any priority. If all of the lines L2–L8 are being used, the voice port coupled to trunk line L1 will provide either a busy signal or a message to the caller on line L1 informing the caller that no free lines are available, as indicated in step S650. The automated attendant can also be programmed to provide audio prompts to the caller to give the caller other options, such as transferring to one of stations 1–12.

If, however, one of trunk lines L2–L8 is available (e.g., line L2), the automated attendant will dial the telephone number of the outside party on that trunk line L2 in step S660. If the automated attendant receives a busy signal, however, it can either transfer that busy signal to the caller or inform the caller that the would-be called party is not available and provide the caller with additional options as would any conventional automated attendant.

In step S670, the automated attendant provides a signal to controller 200 indicating which of lines L2–L8 is available and is to be used, and a process similar to that described above in which a caller on trunk line L1 is connected to a telephone at station 1 is performed. However, instead of controlling the switch 44 to couple line CO1 to line STN1 or, for that matter, any of the other lines STN2–STN12 which are associated with station line ports S2–S12, the controller 200 will control switch 44 to couple line CO1 to one of the "pseudo station lines" S13–S16 within switch 44 as shown in FIG. 1.

Hence, in step S680, the controller 200 will control the isolation circuit 32 associated with terminal T1 FIG. 2) and the switch 44 to couple terminal T1 to one of the available pseudo stations S13–S16. The controller 200 controls the isolation circuit 32 associated with the available line L1 by a signal provided over LINE 1 to couple line CO1 to trunk line port T1 to which trunk line L1 is coupled. The signal is provided on LINE 1 in a manner similar to that described above in which a signal is provided on LINE 1 to couple line CO1 to trunk line port T1 in order to establish connection between a caller on trunk line L1 and station 1. It is noted that controller 200 will not need to output any signals to effect ringing of a telephone at a particular pseudo station, because no actual telephones are present at those pseudo stations.

It is further noted that while the above processes are being performed, the automated attendant will monitor the status of the call on line L1. If the automated attendant determines that the caller has hung up, the transferring process will be terminated. Furthermore, the controller 30 will continue to perform the failsafe monitoring process shown in FIG. 15. If the controller 200 determines that it is necessary for the system to enter the failsafe mode, the above process for entering that mode will be performed notwithstanding the status of the transferring process.

In step S690, the controller 200 will control the isolation circuit 32 associated with the available line L2 by a signal provided over LINE 2 to couple line CO2 to trunk line port T2 to which trunk line L2 is coupled, and will control the switch 44 to couple line CO2 to the pseudo station to which line CO1 has been coupled. The signal is provided on LINE 2 in a manner similar to that described above in which a signal is provided on LINE 1 to couple line CO1 to trunk line port T1 in order to establish connection between a caller on trunk line L1 and station 1. Accordingly, communication is established between trunk lines L1 and L2 via trunk line port T1, the isolation circuits 32 associated with trunk line ports T1 and T2, and a selected pseudo terminal (e.g., pseudo terminal S13) of switch 44.

Figure 18:
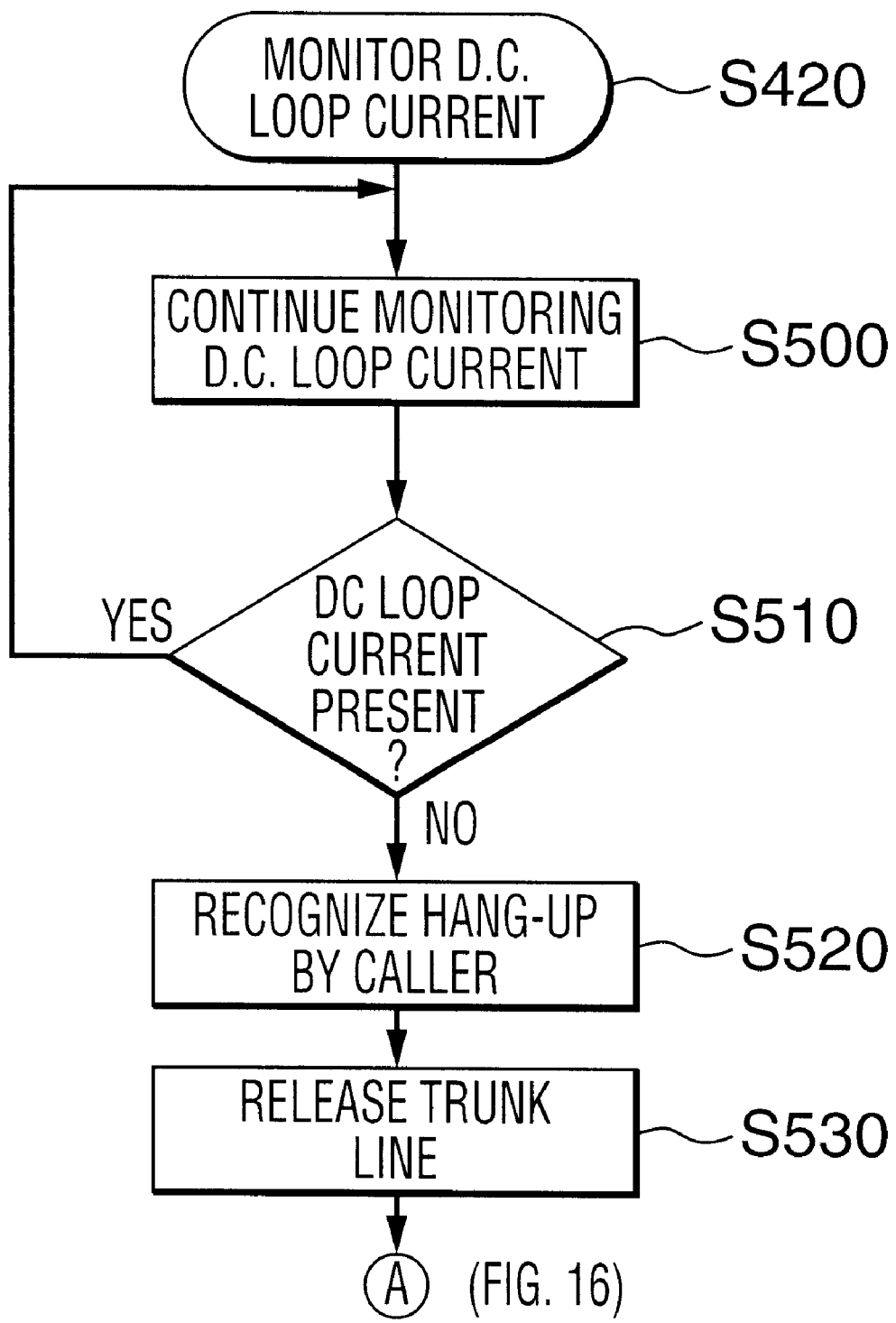
FIG. 18 is a flowchart illustrating a sequence of steps of a loop current monitoring process performed by the apparatus shown in FIG. 1.

In step S700, the automated attendant will monitor the DC loop current present on lines L1 and L2 in a manner similar to that set forth in FIG. 18. If, in step S710, the automated attendant determines that either party has hung up, it will release lines L1 and L2 in step S720. In doing so, the automated attendant will provide a signal to controller 200 indicating that the call has been terminated. Hence, in step S730, the controller 200 will cause the switch 44 and the isolation circuits 32 associated with trunk line ports T1 and T2 to make those ports again available to receive calls. In particular, as in step S590 discussed above, the capacitor 36 in each of those isolation circuits will be switched back across the terminals of the coupling transformer 40 in those isolation circuits as shown in FIG. 3A.

The apparatus 30 and automated attendant are also capable of allowing a person at one of the stations 1–12 serviced by one of the station line ports S1–S12 to place an outside call over one of the trunk lines L1–L8. The process will now be described with regard to station S1. However, the process is essentially identical for all stations S1–S12.

Figure 21:
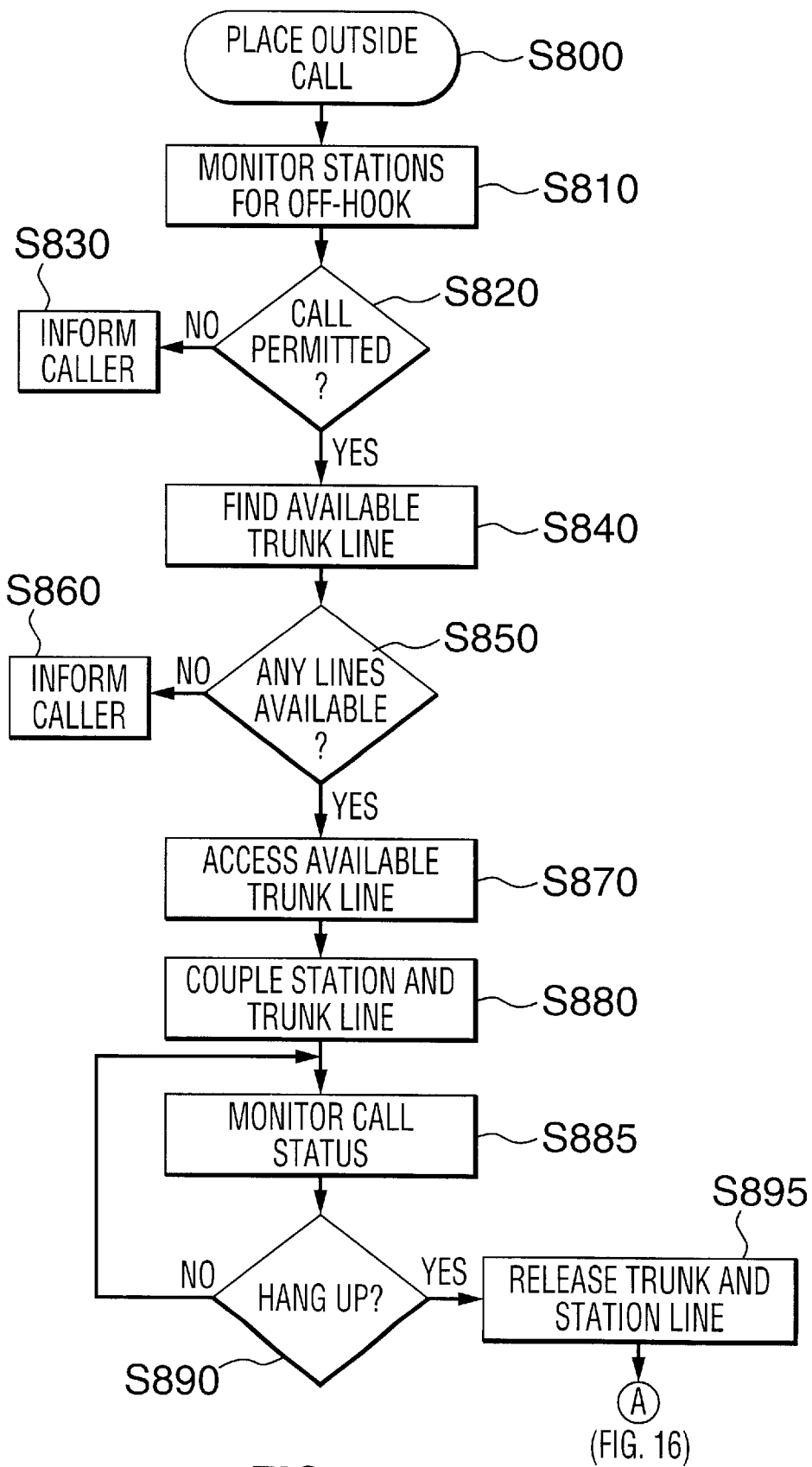
FIG. 21 is a flowchart illustrating a sequence of steps of an outdialing process performed by the apparatus shown in FIG. 1.
Figure 22:
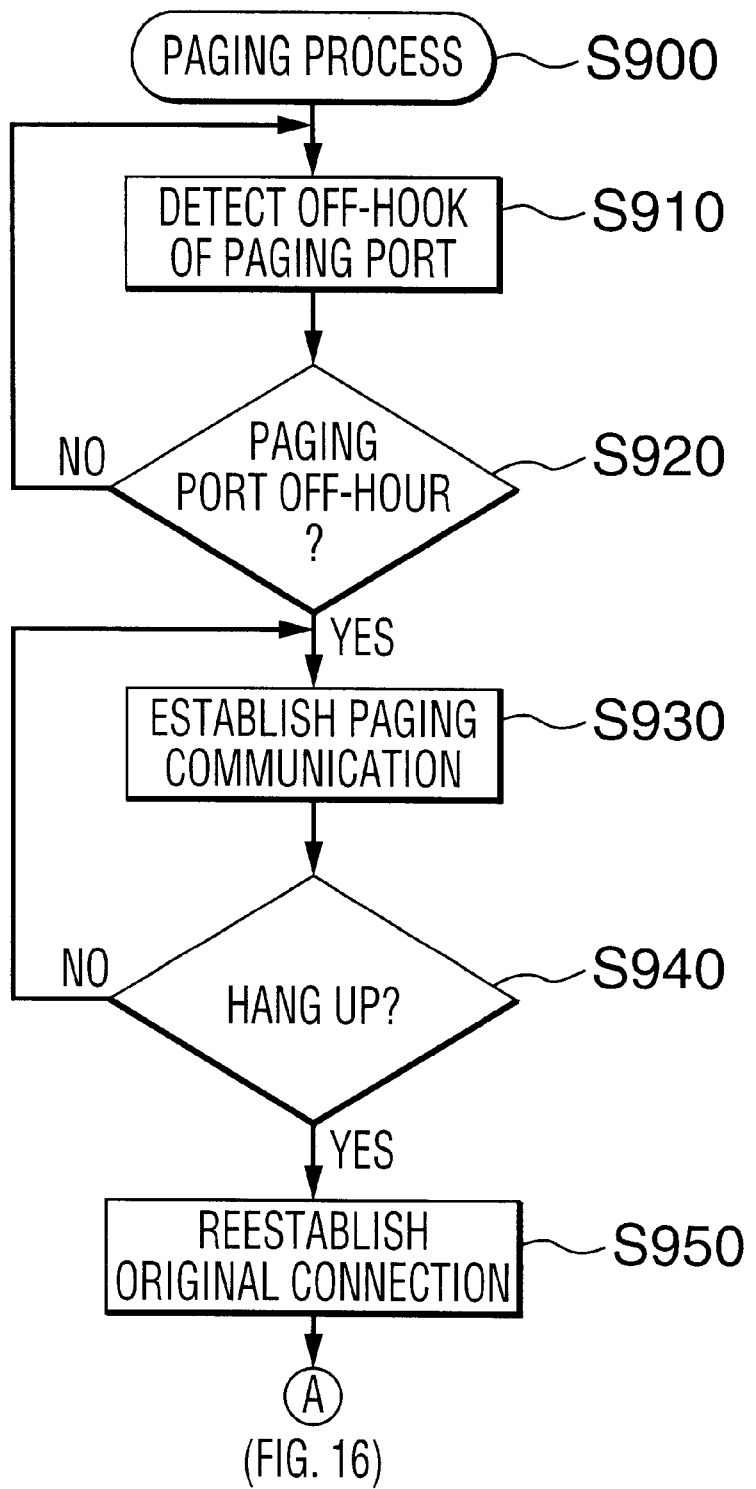
FIG. 22 is a flowchart illustrating a sequence of steps of a paging process performed by apparatus shown in FIG. 1.

As shown beginning in step S800 in FIG. 21, the controller 200 monitors signals OH1–OH12 in step S810 to determine whether any of the telephones serviced by station line ports S1–12 have been taken off the hook. When the telephone at station 1 is taken off-hook as in step S810, the on-hook detector 58 associated with the station line port S1 (FIG. 2) will output over line OH1 an on-hook signal having a status (e.g., "low") indicating that the phone is off-hook. The controller 200 will thus ascertain that a caller at station S1 wishes to be connected to one of the outside lines L1–L8.

The controller 200, however, may be programmed to deny access to outside lines by certain stations. Hence, if the controller 200 determines in step S820 that station 1 is not permitted to access an outside line, the processor 202 in step S830 will provide a signal over data bus 212, which is in turn provided via latch 214-2 (FIG. 11) over line B1 as controlled by signal BSYL which is also provided by processor 202. The signal is provided on line B1 to the busy signal switch 154 (FIG. 7) associated with station line port S1 so as to provide the BUSY TONE signal to line STN1. Line STN1 provides the BUSY TONE signal through the ring voltage switch 56 and failsafe bypass relay 54 associated with station line port S1 to that station line port where it is provided to the telephone at station 1. Of course, this operation assumes that the system is operating in normal mode and not in the failsafe mode.

However, if the station is permitted to access an outside line, the controller 200 will instruct the automated attendant in step S840 to select one of the available lines L1–L8 to output the call. Typically, as discussed above, the automated attendant is programmed to select the lines in a particular priority order (e.g., numerically from L1 to L8).

The automated attendant will check the status of the voice ports associated with the trunk lines L1–L8 and provide data to the controller 200 informing the controller whether any of the trunk lines is available. If the controller ascertains in step S850 from the data provided by the automated attendant that no trunk lines are available, the controller in step S860 will provide a busy signal to the would-be caller as discussed above with regard to step S830. However, if a trunk line is available, the controller 200 will control the apparatus 30 to access that particular available trunk line designated for use by the automated attendant.

Specifically, the automated attendant will place the voice port coupled to that trunk line (e.g., trunk line L1) in an off-hook status in step S870. In step S880, the processor 202 will output a signal having a particular status that will be provided to LINE 1 to couple the capacitor 36 across the terminals V1-1 and V1-2 of the port V1 as shown in FIG. 3B. The signal is provided on line LINE 1 in a manner similar to that described above which enables the trunk line port T1 to be coupled to line CO1. That is, the signal on LINE 1 will cause the transistor 38 to switch the relay 34 of the phone line loop isolation circuit 32 associated with line L1 to operate in the second mode shown in FIG. 3B. In this event, the voice port coupled to terminal V1 will be essentially isolated by capacitor 36 from the AC audio portion of the signal to be transmitted over line L1. However, the voice port will be able to monitor the DC line signal of line L1 in a manner similar to that shown in FIG. 17 to determine if the called party has hung up.

In step S880, the processor 202 will further provide control signals to the switch 44, and the failsafe bypass relay 54 and ring voltage switch 56 associated with station line port S1 in a manner similar to that described above, to thus establish communication between station line port S1 and trunk line port T1. Specifically, communication is thus established between station 1 and the outside party via station line port S1 and its associated failsafe bypass relay 54 and ring voltage switch 56, switch 44, and the phone line loop isolation circuit 32 associated with trunk line port T1.

In step S885, the controller 200 will monitor the status of on-hook signal OH1 to determine whether the caller at station S1 has terminated the call, while as described above, the automated attendant will monitor the DC voltage of line L1 to determine whether the called party has terminated the call. If either party has terminated the call, the controller will detect hang-up in step S890 and in step S895 will change the status of signal on LINE 1 to allow the relay 34 if the isolation circuit 32 to enter into the first mode where the capacitor is coupled across terminals 40-1 and 40-2 of coupling transformer 40 as shown in FIG. 3A, while also making the station line port S1 available for another call in a manner similar to that described above.

As shown in FIGS. 1 and 6, the apparatus 30 also has a paging port PP and an administrative port AP. The paging port is typically connected to a telephone and enables a paging signal to be output from the paging output via that telephone by the by the paging process beginning at step S900 illustrated in FIG. 22.

Specifically, when a telephone at the paging port station is taken off hook as detected in steps S910 and S920, the signal incoming at terminal PP-1 from the telephone will be input to the base of transistor 128 which will cause the relay 98 to switch from the first mode to the second mode. In the second mode, terminals 98-1 and 98-2 of relay 98 are coupled to terminals 98-4 and 98-6 of relay 98. Hence, in step S930, a voltage is provided to photo diode 108 which causes that diode to illuminate, and a communication is established between terminal PP-2 and the paging output terminal 100 via terminals 98-1 and 98-4 of relay 98. Accordingly, a user of the phone at paging port PP can page over a paging system (not shown) coupled to paging output

100. When the user hangs up the paging phone as detected in step S940, the original connection between the external paging input port 102 and the paging output port 100 is reestablished in step S950 with the relay 98 resuming operation in the first mode in which terminals 98-1 and 98-3 are coupled together.

Figure 23:
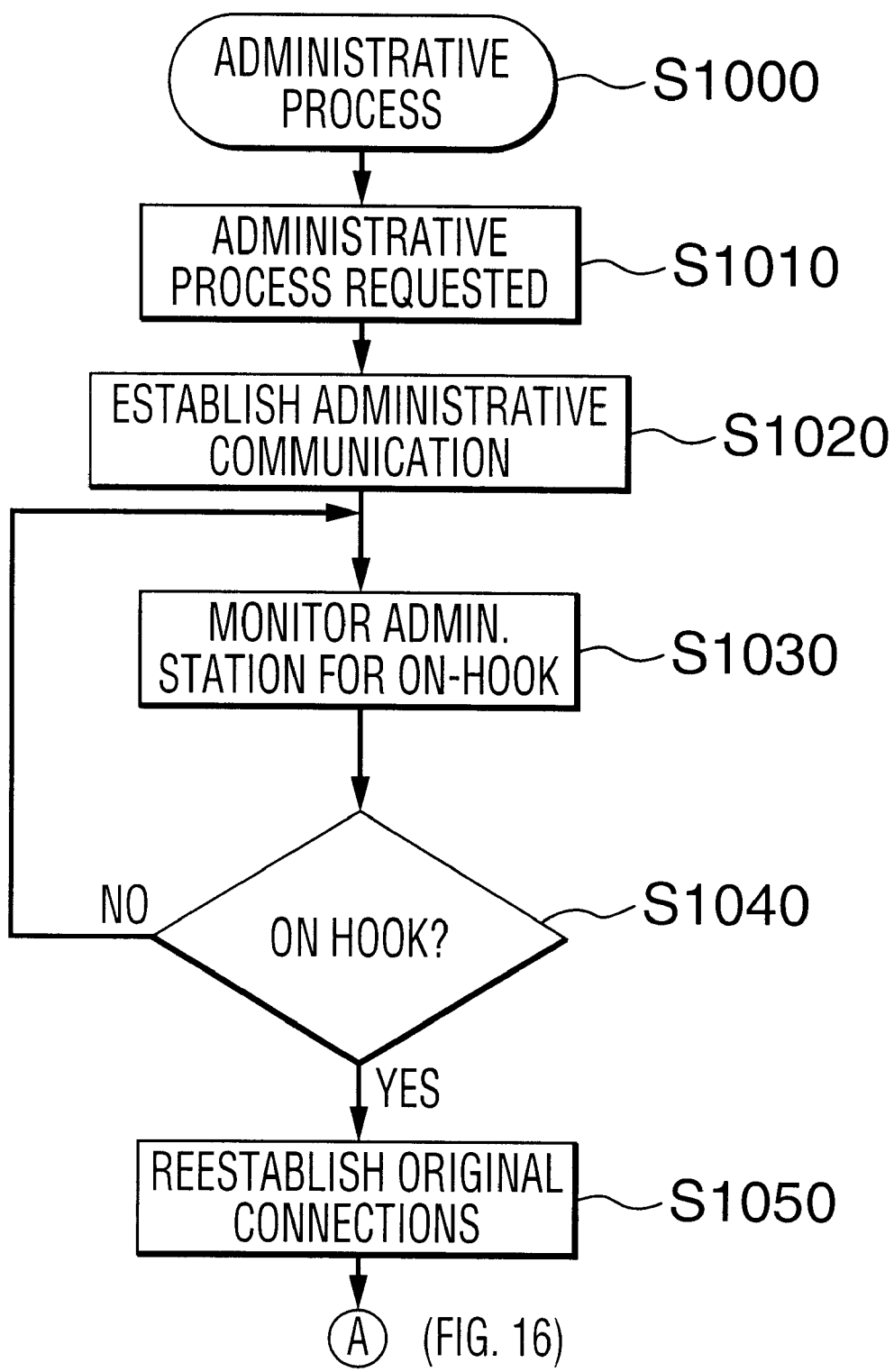
FIG. 23 is a flowchart illustrating a sequence of steps of an administrative controlling process performed by the apparatus shown in FIG. 1.
Figure 24:
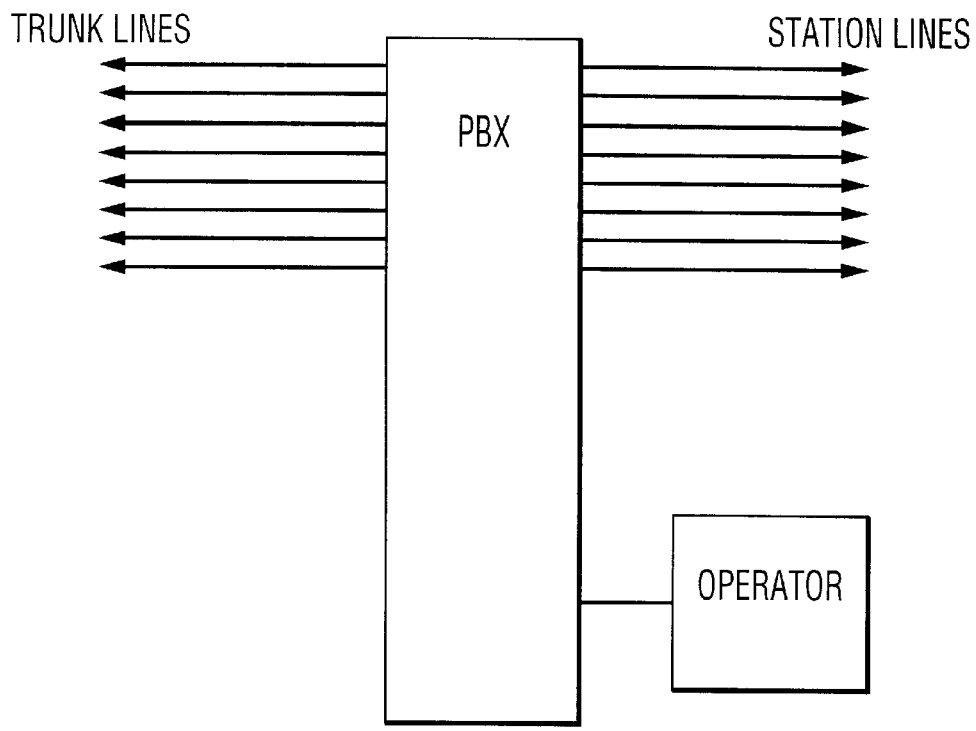
FIG. 24 is a block diagram of a conventional telecommunications system which includes a PBX.
Figure 25:
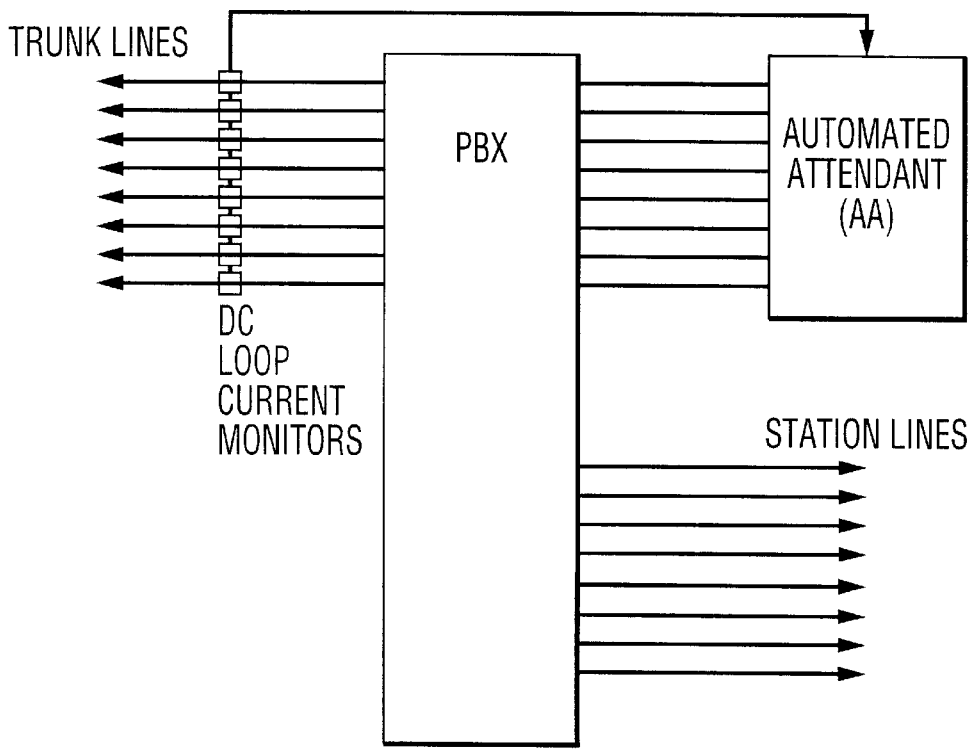
FIG. 25 is a block diagram of a conventional telecommunications system which includes a PBX and an automated attendant.

The telephone at station 12, which is serviced by station line port S12, can also be used to input control information to an administrative port AP that is coupled to the automated attendant according to the process beginning at step S1000 shown in FIG. 23. If the controller 200 is controlled, for example, via a command that a person enters via a telephone at station 12 in step S1010, the controller 200 in step S1020 will output a signal having a particular status (e.g., "high") over the LINE ADMIN line to administrative port relay 96. The controller 200 can also be programmed to interpret an off-hook status of signal OH12 provided by the on-hook detector 58 associated with line S12 as indicating that the station S12 is to be coupled to administrative port AP.

The signal provided over LINE ADMIN line controls transistor 148 to cause relay 134 to enter a second mode of operation where terminal 134-1 is connected to terminal 134-3. This connection establishes communication between the terminal S12 and the administrative port AP as shown in FIG. 6. The user of the telephone at station 12 can therefore enter control commands, for example, via the pushbuttons on the telephone, which are input to administrative port AP of the automated attendant to control the automated attendant and the apparatus 30 in the manner designated.

When the telephone at station S12 is placed back on hook as detected in step S1040, status of on-hook signal provided on line OH12 will change. Hence, in step S1050, the controller 200 will change the status of the signal being provided over LINE ADMIN line, such that signal causes the transistor 148 to control the relay 134 to operate in the first mode in which the station line port S12 is not coupled to the administrative port AP.

Although only one exemplary embodiment of the invention has been described in detail above, those skilled in the art will readily appreciate that many modifications are possible in the exemplary embodiment without materially departing from the novel teachings and advantages of the invention. Accordingly, all such modifications are intended to be included within the scope of the invention as defined in the following claims.

What is claimed is:

1. A telecommunications apparatus, adaptable to be coupled to a telecommunication signal processing apparatus, for establishing bi-directional communication between at least one incoming line and at least one station line, comprising:

an input port adapted to be directly coupled to a first one of the at least one incoming line so as to receive a communication signal being transmitted thereon, the communication signal having an AC component and a DC component;

a switching apparatus, coupled to the input port and being adapted to establish bi-directional communication between the first incoming line and any of the at least one station line in response to a control signal provided by the processing apparatus; and a coupling device which is adaptable to substantially isolate the switching apparatus from at least the AC component of the communication signal when the processing apparatus is receiving the AC component, and which is adaptable to input the AC component into the switching apparatus so as to enable the switching apparatus to establish said bi-directional communication while substantially isolating the processing apparatus from the AC component and enabling the processing apparatus to receive and monitor the DC component.

2. A telecommunications apparatus as claimed in claim 1, wherein the switching apparatus includes an input port, and the coupling device comprises a switch and a capacitive element, the switch being adapted to couple the capacitive element across the input port of the switching apparatus to substantially isolate the switching apparatus from the AC component while enabling the processing apparatus to receive the AC component, and being adapted to couple the capacitive element across the input port of the processing apparatus to substantially isolate the processing apparatus from the AC component while enabling the AC component to be input to the switching apparatus.

3. A telecommunications apparatus as claimed in claim 1, wherein the switching apparatus is adaptable to discontinue establishing the bi-directional communication in response to a signal from the processing apparatus indicating an absence of the DC component of the communication signal.

4. A telecommunications apparatus as claimed in claim 1, comprising a plurality of input ports, each of which is adapted to be directly coupled to one of a plurality of incoming lines so as to receive a respective communication signal being transmitted thereon, each communication signal having an AC component and a DC component, and wherein:

the switching apparatus is adapted to establish bi-directional communication between each of the incoming lines and any one of a plurality of station lines in response to control signals provided by the processing apparatus; and when the communication signal is being transmitted on any of the incoming lines, the coupling device is adaptable to substantially isolate the switching apparatus from at least the AC component of that communication signal when the processing apparatus is receiving the AC component of that communication signal, and is adaptable to input the AC component of that communication signal into the switching apparatus while substantially isolating the processing apparatus from the AC component of that communication signal so as to enable the switching apparatus to establish said bi-directional communication between the incoming line on which that communication signal is being transmitted and said any one of the station lines while enabling the processing apparatus to receive and monitor the DC component of that communication signal.

5. A telecommunications apparatus as claimed in claim 1, wherein the switching apparatus is adapted to establish bi-directional communication between any of the at least one incoming line and a site remote from the telecommunications apparatus via any other of the at least one incoming line.

6. A telecommunications apparatus as claimed in claim 1, further comprising a bypass switching device which is adapted to establish bi-directional communication between each of the at least one incoming line and a respective at least one station line while substantially isolating the processing apparatus and the switching apparatus from any communication signal being transmitted on the at least one incoming line.

7. A telecommunications apparatus as claimed in claim 1, wherein the switching apparatus is adaptable to establish control communication between one of the at least one station line and the processing apparatus so that the processing apparatus is controllable via the one station line.

8. A telecommunications apparatus as claimed in claim 1, wherein the telecommunications apparatus comprises the processing apparatus, and the processing apparatus further comprises an identification device adaptable to evaluate identification information present in the signal identifying an origin of the signal.

9. A telecommunications apparatus as claimed in claim 1, further comprising a port that is adaptable to be coupled to a signal broadcasting device, and wherein the switching apparatus is adaptable to couple any of the at least one station line to the port so as to establish communication between the any station line and the signal broadcasting device.

10. A coupling device, adaptable for use in a telecommunications system comprising a processing apparatus having an input port adapted to be directly coupled to an incoming line so as to receive a communication signal having an AC component and a DC component being transmitted thereon, and a switching apparatus, adapted to establish bi-directional communication between the incoming line and any of at least one station line in response to a control signal provided by the processing apparatus, the coupling device comprising:

a capacitive element; and a switch, adapted to couple the capacitive element across the input port of the switching apparatus to substantially isolate the switching apparatus from the AC component while enabling the processing apparatus to receive the AC component, and adapted to couple the capacitive element across the input port of the processing apparatus to substantially isolate the processing apparatus from the AC component while enabling the AC component to be input to the switching apparatus and enabling the processing apparatus to monitor the DC component.

11. A coupling device as claimed in claim 10, wherein the telecommunications system includes a coupling transformer having a first winding having input terminals and a second winding coupled across the input port of the switching apparatus, and wherein the switch is adapted to couple the capacitive element across the input port of the switching apparatus by coupling the capacitive element across the input terminals of the coupling transformer.

12. A coupling device as claimed in claim 10, wherein the switch functions to couple the capacitive element alternately to the input port of the processing apparatus and the input port of the switching apparatus based on a control signal received from the telecommunications system.

13. A method for using a telecommunications apparatus, comprising a switching apparatus and communication signal processing apparatus, to establish bi-directional communication between at least one incoming line coupled to the telecommunications apparatus and at least one station line coupled to the telecommunications apparatus and a communication station, comprising the steps of:

receiving a communication signal being transmitted on a first of the at least one incoming line, the communication signal having an AC component and a DC component;

substantially isolating the switching apparatus from at least the AC component of the communication signal when the processing apparatus is receiving the AC component; and establishing bi-directional communication between the first incoming line and any of the at least one station line in response to a control signal provided by the processing apparatus while substantially isolating the processing apparatus from the AC component and enabling the processing apparatus to receive and monitor the DC component.

14. A method as claimed in claim 13, wherein:

the isolating step comprises the step of coupling a capacitive element across the input port of the switching apparatus to substantially isolate the switching apparatus from the AC component while enabling the processing apparatus to receive the AC component; and the communication establishing step comprises the step of coupling the capacitive element across the input port of the processing apparatus to substantially isolate the processing apparatus from the AC component while enabling the AC component to be input to the switching apparatus.

15. A method as claimed in claim 13, further comprising the step of discontinuing establishing the bi-directional communication in response to a signal from the processing apparatus indicating an absence of the DC component of the communication signal.

16. A method as claimed in claim 13, further comprising the step of establishing bi-directional communication between any of the at least one incoming line and a site remote from the telecommunications apparatus via any other of the at least one incoming line.

17. A method as claimed in claim 13, further comprising the step of essentially isolating the switching apparatus and signal processing apparatus from the communication signal while establishing bi-directional communication between each of the at least one incoming line and a respective at least one station line.

18. A method as claimed in claim 13, further comprising the step of establishing control communication between one of the at least one station line and the processing apparatus so that the processing apparatus is controllable via the one station line.

19. A method as claimed in claim 13, further comprising the step of coupling any of the at least one station line to an output port so as to establish communication between the any station line and a signal broadcasting device coupled to the output port.

20. A switching apparatus for use in a telecommunications system comprising a telecommunications signal processing apparatus adapted to be coupled to a plurality of incoming lines and a plurality of station lines, said switching apparatus comprising:

a plurality of incoming line ports, each adapted to be coupled to one of the incoming lines so as to receive a telecommunication signal being transmitted thereon, the telecommunication signal having an AC component and a DC component;

a plurality of station line ports, each adapted to be coupled to one of the station lines; and a switch which is adapted to operate in a first mode, which is adapted to establish communication of said AC component of said telecommunication signal between the incoming lines and the telecommunication signal processing apparatus, and in a second mode, which is adapted to establish communication of said AC component of said telecommunication signal between the incoming lines and the station lines while preventing communication of said AC component of said telecommunication signal between the incoming lines and the telecommunication signal processing apparatus, while allowing communication of said DC component of said telecommunication signal between the incoming lines and the telecommunication signal processing apparatus.

21. A switching apparatus as claimed in claim 20, wherein:
the telecommunication signal processing apparatus includes an automated attendant; and
the switch is adapted to establish communication between the incoming lines and the automated attendant during the first mode, and is adapted to establish communication between the incoming lines and the station lines while preventing communication between the incoming lines and the automated attendant during the second mode.

22. A method for using a telecommunication signal processing apparatus in a telecommunications system comprising a plurality of telecommunication lines which are coupled to the telecommunication signal processing apparatus, comprising the steps of:
coupling a capacitive element across the input port of the telecommunication signal processing apparatus coupled to one of the telecommunication lines on which a telecommunication signal is propagating to essentially isolate the telecommunication signal processing apparatus from an AC component of the telecommunication signal while allowing a DC component of the signal to be received by the telecommunication signal processing apparatus; and
removing the capacitive element from across the input port to enable the telecommunication signal processing apparatus to receive the AC component of the telecommunication signal.

23. A method as claimed in claim 22, wherein the coupling step couples the capacitive element across the input port such that the telecommunication signal processing apparatus receives the DC components.

24. A method as claimed in claim 22, wherein:
the telecommunication signal processing apparatus includes an automated attendant; and
the coupling step couples the capacitive element across the input port of the automated attendant and the removing step removes the capacitive element from across the input port of the automated attendant.

25. A method for coupling a telecommunication signal processing apparatus to a telecommunication system having a plurality of incoming lines for carrying a telecommunication signal having an AC component and a DC component, and a plurality of outgoing lines, comprising the steps of:
establishing communication between the incoming lines and the telecommunication signal processing apparatus during a first state of the telecommunication signal processing apparatus; and
establishing communication between the incoming lines and the outgoing lines while preventing communication of said AC component and allowing communication of said DC component of said telecommunication signal between the incoming lines and the telecommunication signal processing apparatus during a second state of the telecommunication signal processing apparatus.

26. A method as claimed in claim 25, wherein:
the telecommunication signal processing apparatus includes an automated attendant; and
the first communication establishing step establishes communication between the incoming lines and the automated attendant during the first state, and the second communication establishing step establishes communication between the incoming lines and the outgoing lines while preventing communication between the incoming lines and the automated attendant during the second state.

* * * * *